United States Patent
Shiga et al.

(10) Patent No.: US 7,853,994 B2
(45) Date of Patent: Dec. 14, 2010

(54) COMPUTER SYSTEM AND METHOD OF UPDATING AUTHENTICATION INFORMATION OF COMPUTER SYSTEM

(75) Inventors: Kenta Shiga, Yokohama (JP); Toshihiko Murakami, Fujisawa (JP); Daiki Nakatsuka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1148 days.

(21) Appl. No.: 11/508,201

(22) Filed: Aug. 23, 2006

(65) Prior Publication Data

US 2008/0005565 A1    Jan. 3, 2008

(30) Foreign Application Priority Data

Jun. 29, 2006  (JP)  .............................. 2006-180388

(51) Int. Cl.
    *G06F 21/00*      (2006.01)
    *H04L 9/32*       (2006.01)
(52) U.S. Cl. ........................................... 726/6; 726/18
(58) Field of Classification Search ................... None
    See application file for complete search history.

(56) References Cited

U.S. PATENT DOCUMENTS

| | | | | |
|---|---|---|---|---|
| 5,611,048 A * | 3/1997 | Jacobs et al. | .................... | 726/5 |
| 6,044,471 A * | 3/2000 | Colvin | .......................... | 726/28 |
| 6,167,567 A * | 12/2000 | Chiles et al. | ................. | 717/173 |
| 6,292,833 B1 * | 9/2001 | Liao et al. | .................... | 709/229 |
| 6,484,264 B1 * | 11/2002 | Colvin | .......................... | 726/18 |
| 7,293,169 B1 * | 11/2007 | Righi et al. | ..................... | 713/2 |
| 7,302,570 B2 * | 11/2007 | Beard et al. | ................... | 713/171 |
| 2003/0065954 A1 * | 4/2003 | O'Neill et al. | ............... | 713/202 |
| 2006/0047907 A1 | 3/2006 | Shiga et al. | | |
| 2006/0064466 A1 | 3/2006 | Shiga et al. | | |
| 2006/0236053 A1 | 10/2006 | Shiga et al. | | |
| 2007/0079100 A1 | 4/2007 | Shiga et al. | | |

FOREIGN PATENT DOCUMENTS

JP          08-202658          8/1996

* cited by examiner

*Primary Examiner*—Christopher A Revak
(74) *Attorney, Agent, or Firm*—Antonelli, Terry, Stout & Kraus, LLP.

(57) ABSTRACT

The storage system of the present invention is able to update a secret while maintaining a session between a host and storage. The administrator configures a new secret for the host and the storage. The session manager issues a request to the storage to open a session that uses the new secret. The session manager opens a session that uses the new secret following authentication. A response to an old command issued prior to the secret update is transmitted from the storage to the host via a session that uses an old secret. A new command following the secret update is transmitted from the host to the storage via the session that uses the new secret. When all the old command processing is complete, the old secret using session is closed.

14 Claims, 40 Drawing Sheets

FIG. 16

HOST TABLE — 521

| HOST ID (5211) | PATH ID (5212) |
|---|---|
| HID1 | PID1 |
| HID2 | PID2 |
| ... | ... |

FIG. 17

SECRET UPDATE SCREEN (IN MANAGEMENT SERVER) — B540

- PATH ID — B541
- USER ID — B542
- NEW SECRET — B543
- NEW SECRET (RETYPE) — B544

B550 — OK    CANCEL — B551

FIG. 27

| | | | ,123 |
|---|---|---|---|
| EXTERNAL STORAGE SESSION TABLE | | | |
| 1231 | 1232 | 1233 | 1234 |
| PATH ID | EXTERNAL PATH ID | EXTERNAL SESSION ID | VERSION |
| PID1 | EPID1 | ESID1 | OLD |
| PID1 | EPD1 | ESID2 | NEW |
| PID2 | EPD2 | ESID3 | NEW |
| ... | ... | ... | ... |

# COMPUTER SYSTEM AND METHOD OF UPDATING AUTHENTICATION INFORMATION OF COMPUTER SYSTEM

CROSS-REFERENCE TO RELATED APPLICATIONS

This application relates to and claims priority from Japanese Patent Application No. 2006-180388 filed on Jun. 29, 2006, the entire disclosure of which is incorporated herein by reference.

BACKGROUND OF THE INVENTION

1. Field of the Invention

The present invention relates to a computer system and a method for updating the authentication information of the computer system.

2. Description of the Related Art

In an organization such as an enterprise, a storage apparatus constituted separately from a host computer ('host' hereinbelow) is used in order to manage large amounts of data. For example, in an organization such as a financial institution or hospital, because sales data related to a large number of customers and clinical data and so forth must be stored for long periods, a large-capacity storage apparatus is required.

Combined usage, by a plurality of hosts, of one or a plurality of storage apparatuses rather than each host having a storage apparatus allows the storage areas to be effectively used and allows data to be efficiently managed. Hence, in an organization that handles large-scale data such as an enterprise or data center, for example, SAN (Storage Area Networks) that connect a plurality of hosts and a plurality of storage apparatuses via a network are prevalent.

Former SAN are constituted by using Fibre channel technology that is superior with respect to large-capacity burst transfers. Such SANs are called FC-SANs. An FC-SAN uses a dedicated communication device and cable and so forth that correspond with FCP (Fiber Channel Protocol) and are therefore able to transfer data relatively stably. However, problems such as the fact that a dedicated communication device or the like is highly expensive and that technicians acquainted with FCP are hard to be hired have been pointed out.

Therefore, in recent years, the focus has been on IP-SANs that use the more widely popularized IP (Internet Protocol) networks. In particular, due to the development of the increased speeds and larger capacities of IP networks and also the reduction in the costs of network cards and switches enabling Gigabit-class communications, there has been a focus on the existence of IP-SANs that compare favorably with FC-SANs.

In the case of IP-SANs, for example, a technology that encapsulates SCSI (Small Computer System Interface) commands by means of TCP/IP (Transmission Control Protocol/Internet Protocol) and uses an IP network to send and receive the encapsulated packets is known. This technology is called iSCSI technology. By using iSCSI, a storage apparatus can be directly connected to an IP network.

With iSCSI, a node that requests data processing or the like is called the 'initiator' and a node that sends back a response to the requested processing is called the 'target'. For example, the host is the initiator and the storage apparatus is the target. The initiator and target are specified by identifiers known as iSCSI names. The initiator can use services (storage services) provided by the target by logging on to the target.

By pre-registering the IP address or iSCSI name or the like of the target in the initiator, the initiator is able to open a session with the target. A session is a logical communication channel that is configured in a physical communication channel.

When a session is opened, authentication is performed between the initiator and target. This serves to prevent unauthorized access. Authentication can be performed by at least either one or both of the target and initiator. Authentication is performed on the basis of whether the user name (user ID) and secret (password) reported by the initiator match the user name and secret registered in the target, for example. When both the user name and secret match, access rights are granted. As detailed by RFC (Request for Comments) 3720 8.2.1. or the like, a secret is one type of password information with a value that is from 12 bytes (96 bits) to 16 bytes (128 bits) long.

The iSCSI nodes (target and initiator) are directly connected to an IP network as mentioned above and, therefore, in order to prevent unauthorized access, the secret is preferably updated at regular intervals. Further, although not a technology related to network storage, a technology that allows the passwords of a host and terminal to each be updated by a management device is known (Japanese Patent Application Laid Open No. H8-202658).

In the conventional technology that appears in Japanese Patent Application Laid Open No. H8-202658, the passwords of the host and terminal can be easily updated by the management device. However, in the case of iSCSI, once the session has been closed in order to update the secret, the host and terminal must be reconnected based on the specifications of iSCSI. Because the session must be closed when the secret is updated, the administrator must perform the operation to update the secret after temporarily terminating application programs on the host.

However, a computer system that uses iSCSI often requires continuous operation 24 hours a day and 365 days a year. Hence, a technology that allows the secret to be updated without terminating the application program on the host is required.

SUMMARY OF THE INVENTION

Therefore, an object of the present invention is to provide a computer system that allows authentication information to be updated and a method of updating the authentication information of the computer system without halting a first computer device. A further object of the present invention is to provide a computer system that allows authentication information to be updated in a relatively short time even when a plurality of paths have been configured and a method of updating the authentication information of the computer system. Further objects of the present invention will become apparent from the subsequent description of the embodiment.

In order to solve the above problem, the computer system according to one aspect of the present invention is a computer system that connects a first computer device and a second computer device so that the first and second computer devices are capable of bi-directional communication, wherein the second computer device judges whether the first computer device has legitimate access rights on the basis of authentication information received from the first computer device and, when the first computer device has legitimate access rights, permits usage of the second computer device by the first computer device, and a session manager for managing a session configured in a path that connects the first and second computer devices is provided. The session manager updates the authentication information while maintaining the session between the first and second computer devices by executing data processing that is in the course of execution before the update of the authentication information is requested via a first session that is provided in the path and which uses pre-update authentication information and by executing data processing that is produced after the update of the authentication information is requested via a second session that is provided in the path and which uses updated authentication information.

According to an embodiment of the present invention, the session manager (1) configures a first session that uses pre-update authentication information and a second session that uses updated authentication information between the first and second computer devices; (2) performs data processing in the course of execution before the update of the authentication information by using the first session and performs new data processing after the update of the authentication information by using the second session; and (3) closes the first session when the data processing in the course of execution before the update of the authentication information is complete.

According to the embodiment of the present invention, the first and second sessions are each provided on the same path that connects the first computer device and second computer device.

According to the embodiment of the present invention, the authentication information includes user identification information for identifying users and updateable password information that is associated with the user identification information.

According to the embodiment of the present invention, the first computer device is a host computer and the second computer device is a storage apparatus that provides the host computer with a storage area.

According to the embodiment of the present invention, the first computer device is a storage apparatus and the second computer device is another storage apparatus that provides the storage apparatus with a storage area.

According to the embodiment of the present invention, a third computer device for reporting the updated authentication information to the first and second computer devices respectively is connected to the first and second computer devices respectively so as to be capable of bi-directional communication; and, when the updated authentication information is reported by the third computer device to the first and second computer devices respectively, the processes (1) to (3) are executed.

According to the embodiment of the present invention, the processes (1) to (3) are executed as a result of one of the first computer device and the second computer device reporting the updated authentication information to the other computer device.

According to the embodiment of the present invention, a plurality of paths are provided between the first computer device and the second computer device; and the first and second sessions are provided in each of the plurality of paths.

According to the embodiment of the present invention, a plurality of paths are provided between the first computer device and the second computer device; and the processes (1) to (3) are executed by selecting paths among the plurality of paths in order starting with the path for which the time to completion of the data processing being executed is smallest.

According to the embodiment of the present invention, paths are selected among the plurality of paths in order starting with the path with the smallest number of commands being executed.

According to the embodiment of the present invention, a plurality of paths are provided between the first computer device and the second computer device; and, after configuring the first and second sessions in all of the plurality of paths by executing the process (1) for each of the plurality of paths, the process (2) and the process (3) are executed in parallel with respect to the plurality of paths.

According to the embodiment of the present invention, a fourth computer device for managing the authentication information is connected so as to be capable of bi-directional communication to at least the second computer device; and, when an updated authentication information is reported by the first computer device, the second computer device issues an inquiry to the fourth computer device as to whether the updated authentication information reported by the first computer device is correct and, when the fourth computer device responds to the effect that the updated authentication information is correct, the processes (1) to (3) are executed.

According to the embodiment of the present invention, the session manager closes the first session after the data processing that uses the first session is complete and then configures the second session in the path and, when a request to execute new data processing is received during the execution of data processing that uses the first session, the request to execute the new data processing is suspended and, after configuring the second session, the suspended execution request is processed by using the second session.

According to the embodiment of the present invention, the first computer device is constituted comprising: a first communication port for connecting to the second computer device; a first communication controller for communicating with the second computer device by using a path that is configured between the first computer device and the second computer device via the first communication port; a first session manager for managing, via the first communication controller, a data transfer that uses the session configured in the path; a first session table that associates and manages the session configured in the path and identification information that indicates the number of commands being executed that use the session and a classification of whether the configured session is the first session or the second session; and a first authentication information management table that manages pre-update authentication information and updated authentication information, and the second computer device is constituted comprising: a second communication port that is connected via the path to the first communication port; a second communication controller for communicating with the first computer device via the second communication port; a second session manager for managing data transfers using the session via the second communication controller; a second session table that associates and manages the session configured in the path and identification information indicating a classification of whether the session is the first session or the second session; and a second authentication information management table that manages pre-update authentication information and updated authentication information, wherein, when the updated authentication information is input to the first computer device and the second computer device respectively, the updated authentication information is stored in each of the first authentication information management table and the second authentication information management table; the first session manager issues a request to the second session manager to open the second session that uses the updated authentication information; the second session manager opens the second session and registers information related to the opened second session in the second session table when authentication of the updated authentication information contained in the request from the first session manager is successful; the first session manager registers information related to the opened second session in the first session table when the opening of the second session is confirmed; the first session manager transmits a new command newly issued after the second session is opened to the second computer device via the second session; the second session manager transmits a response to the old command received from the first computer device prior to the opening of the second session to the first computer device via the first session; the first session manager issues a request to the second session manager to close the first session when all the old command-related responses are received from the second computer device; and the second session manager closes the first session in accordance with the first session close request received from the first session manager.

A method for updating authentication information of a computer system that comprises a first computer device and a second computer device that are connected so as to be capable of bi-directional communication via a communication network according to another aspect of the present invention, comprising the steps of: inputting updated authentication information to the first computer device; inputting the updated authentication information to the second computer device; opening a second session that uses the updated authentication information in a path that connects the first and second computer devices; processing a new command that is issued by the first computer device after the second session is opened via the second session; processing an old command that is issued by the first computer device before the second session is opened via a first session that uses pre-update authentication information; and closing the first session when all the old command processing is complete.

Sometimes all or part of the constituent elements of the present invention can be constituted as a computer program. In addition to being transferable fixed to a recording medium, this computer program can also be transferred via a communication network such as the Internet.

BRIEF DESCRIPTION OF THE DRAWINGS

FIG. 16 is an explanatory diagram of the constitution of a host table;

FIG. 17 is an explanatory diagram of a secret update screen;

FIG. 27 is an explanatory diagram of a table that manages sessions or the like for external storage;

DESCRIPTION OF THE PREFERRED EMBODIMENTS

Figure 1:
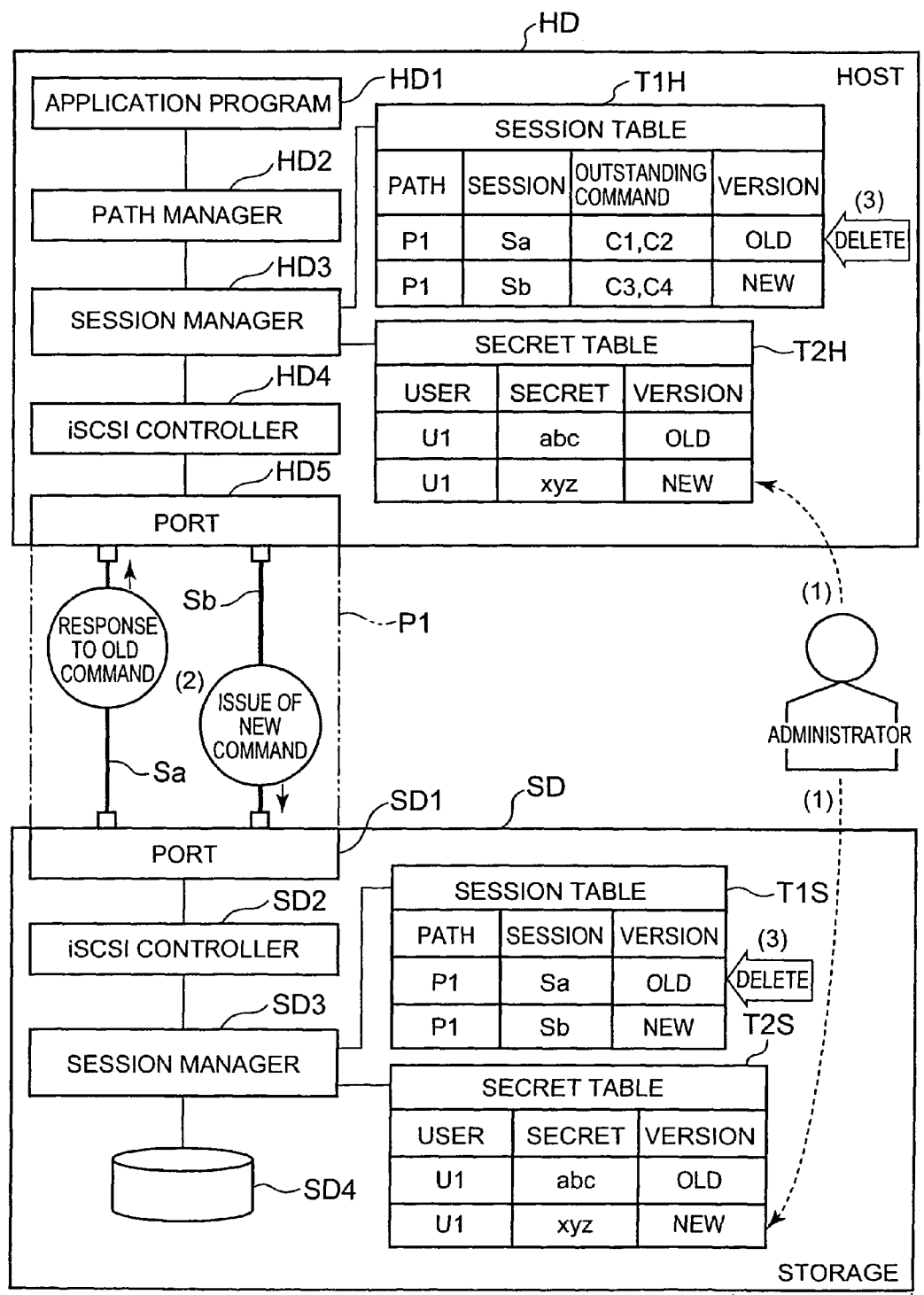
FIG. 1 is an explanatory diagram of the concept of the embodiment of the present invention.

Embodiments of the present invention will be described hereinbelow based on the drawings. FIG. 1 is an explanatory diagram of the overall concept of the embodiment. This embodiment will be described by taking, by way of example, a storage system of a computer system.

The storage system is constituted by connecting a host device HD and a storage apparatus SD via a communication network, for example. The host device ('host' hereinbelow) HD is constituted as a computer device such as a server computer, for example, and constitutes an initiator. The host HD corresponds to a 'first computer device'.

The host HD is constituted comprising an application program HD1, a path manager HD2, a session manager HD3, an iSCSI controller HD4 and communication port HD5, and a session table T1H and secret table T2H.

The application program HD1 is software such as electronic mail management software, video distribution software, sales management software, customer management software that provides data-processing services to a client terminal (not shown in FIG. 1).

The path manager HD2 serves to manage paths between the host HD and storage apparatus (sometimes written as 'storage' hereinbelow) SD. For example, when a plurality of paths are provided between the host HD and storage SD, the path manager HD2 is able to determine whether to transfer commands and data and so forth by using either path. As a result, the load can be distributed between the respective paths. Further, in FIG. 1, for the sake of expediency, only one path P1 is shown but, as will become evident from the subsequent embodiments, the present invention may also be applied to cases where a plurality of paths are provided.

The session manager HD3 opens sessions with the storage SD and manages the opened sessions. The session manager HD3 manages sessions of a plurality of types of sessions, namely, a session that uses an old secret (old secret using session) and a session that uses a new secret (new secret using session), as will be described subsequently.

The iSCSI controller HD4 controls communications on the basis of iSCSI. The communication port ('port' hereinbelow) HD5 performs communications with a port SD1 of the storage SD and, therefore, the path P1 is configured between the port HD5 of the host HD and the port SD1 of the storage SD. Further, FC-SP (Fibre Channel Security Protocol) has become standardized as the standard whereby devices compatible with FCP perform authentication. Hence, the present invention can be applied not only to IP-SAN that is used by iSCSI but also to FC-SAN which is used by FC.

The session table T1H is a table that serves to manage the sessions provided between the hosts HD and storage SD. The session table T1H performs associates and manages information for identifying paths, information for identifying sessions, information for identifying commands (outstanding commands) executed by using the sessions, and information (version) for distinguishing whether the sessions are a new secret using session or an old secret using session, for example.

The secret table T2H is a table that serves to manage authentication information when the host HD logs onto the storage SD. Usernames (user IDs) and secrets, for example, can be cited as authentication information. A secret is a character string of a plurality of digits (containing numerals) and is one type of password information. More accurately speaking, a secret is an array of bytes but, for the sake of expediency in the description, the description will focus on a case with a character string. The secret table T2H associates and manages user names, secrets, and versions for distinguishing whether the secrets are old secrets or new secrets. Further, a computer identifier for identifying the host HD can also be adopted instead of or as well as user names. That is, the constitution of the secret table T2H may be any of a constitution in which authentication is done by a combination of a user name and a secret, a constitution in which authentication is done by a combination of a computer identifier and a secret, and a constitution in which authentication is done by a combination of a user name, a computer identifier, and a secret.

The constitution of the storage SD will be described next. The storage SD is a computer device that serves to provide the host HD with a storage area. The storage SD is also known as a storage subsystem or a disk array device. The storage SD is constituted comprising a port SD1, an iSCSI controller SD2, a session manager SD3, a storage apparatus SD4, a session table T1S, and a secret table T2S, for example.

The port SD1 is for communicating with the port HD5 of the host HD. The iSCSI controller SD2 controls iSCSI-based communications. The session manager SD3 opens sessions with the host HD and manages the sessions thus opened.

The storage apparatus SD4 stores a variety of data groups that are used by the host HD. A variety of devices capable of reading and writing data can be used as the storage apparatus SD4, such as a hard disk device, a semiconductor memory device, an optical disk device, a magneto-optical disk device, a magnetic tape device, and a flexible disk device, for example.

When a hard disk device is used as the storage apparatus, an FC (Fibre Channel) disk, an SCSI (Small Computer System Interface) disk, a SATA disk, an ATA (AT Attachment) disk, or an SAS (Serial Attached SCSI) disk or the like, for example, can be used.

When a semiconductor memory device is used as the storage apparatus, a variety of memory devices such as flash memory, FeRAM (Ferroelectric Random Access Memory), MRAM (Magnetoresistive Random Access Memory), phase conversion memory (Ovonic Unified Memory), and RRAM (Resistance RAM), for example, can be used.

The session table T1S is a table for managing sessions. The session table T1S associates and manages information for identifying paths, information for identifying sessions, and versions for distinguishing whether the sessions are new secret using sessions or old secret using sessions, for example.

The secret table T2S is a table for managing authentication information. The secret table T2S manages user names, secrets, and versions as per the secret table T2H of the host HD.

The operation in a case where authentication information (secrets) used by the storage system is updated will be described next. When the host HD uses the storage SD, the host HD explicitly states the IP address and iSCSI name and so forth of the storage SD and establishes a TCP connection with the storage SD. The host HD explicitly states the user name and secret and attempts to log on to the storage SD.

When login is requested from the host HD, the storage SD verifies whether the user name and secret reported by the host HD have been registered in the secret table T2S. When the host HD is authenticated as a result of the verification, a session between the host HD and storage SD is opened. The host HD is able to read and write data from and to the storage apparatus SD4 by using the opened session.

The host HD issues a read command or write command or the like to the storage SD in accordance with a request from the client terminal. In the case of the read command, the storage SD reads data from the storage apparatus SD4 and transfers the data thus read to the host HD. In the case of a write command, the storage SD writes data received from the host HD to the storage apparatus SD4.

Further, the storage SD performs iSCSI-based communications and is therefore connected to the host HD via an IP network. Therefore, the possibility of unauthorized access by another computer device that is connected to the IP network cannot be eliminated. Hence, in order to maintain security, the secret is preferably updated at regular intervals, for example. In the following description, a secret that is used prior to requesting an update of the secret is called an old secret and the updated new secret is called a new secret.

When the administrator of the storage system updates the secret, the new secret is configured for the host HD and storage SD (first process (1)). The new secrets are registered in the secret tables T2H and T2S respectively. The version indicating whether that the secret is a new secret is configured for the new secret.

When a new secret is reported by the administrator and an update from the old secret to the new secret is requested, the session manager HD3 of the host HD requests that the storage SD open a session that uses the new secret. The session manager SD3 of the storage SD compares the new secret and user name reported by the host HD with the new secret and user name that are registered in the secret table T2S. When the new secret and user name reported by the host HD and the new secret and user name registered in the storage SD match, a session that uses a new secret is opened in path P1.

Further, in order to prevent the secret flowing through the SAN 10 from being intercepted and read, the host HD sometimes transmits a specified value (hash value of the new secret, for example) derived, in accordance with any kind of algorithm, from the new secret instead of the new secret itself, as well as a user name to the storage SD. In this case, the session manager SD3 of the storage SD derives a specified value in accordance with the same algorithm as the host HD from the registered new secret and compares the specified value with the specified value transmitted from the host HD.

As a result, the host HD and storage SD are then connected via sessions of two types that use new and old secrets (old secret using session Sa and new secret using session Sb).

Here, when a secret is updated according to the specifications of iSCSI, first the session must be closed, and then the session that uses the new secret must be opened. Hence, when the secret is updated in a storage system that uses normal iSCSI, the application program HD1 of the host HD must be temporarily terminated. On the other hand, this embodiment proposes a technology for performing an update from an old secret to a new secret without terminating the application program HD1.

Before the update from the old secret to the new secret is performed, a command (old command) issued by the host HD to the storage SD is processed by the storage SD and a response is sent back. The response to the old command is made via an old secret using session that employs the old secret.

Furthermore, after the update from the old secret to the new secret is performed, a command (new command) issued to the storage SD from the host HD is transmitted to the storage SD via a new secret using session that uses the new secret.

Thus, in a second process (2) when the secret is updated, the old secret using session is used to receive response to the old command and the new secret using session is used in transmitting the new command.

When the storage SD has completed all the old command processing, the old secret using session is unnecessary. Hence, in a third process (3), the old secret using session is closed and entries relating to the old secret are deleted from the session tables T1H and T1S respectively.

According to this embodiment that is constituted thus, a session that uses the old secret and a session that uses the new secret are configured between the host HD and storage SD and the old secret using session is used to receive response to the old command and the new secret using session is used in issuing the new command. Further, when the all the old command processing is complete, the old secret using session is closed and then integrated with the new secret using session. Hence, an update from the old secret to the new secret can be performed without terminating the application program HD1 of the host HD and high availability and security of the storage system can be made compatible.

Further, the host HD and storage SD can be replaced by a first storage SD1 and second storage SD2 respectively. The first storage SD1 may be constituted to transmit data stored in a storage apparatus that the first storage SD1 comprises to the second storage SD2 via path P1 and the second storage SD2 may be constituted to store the data in the storage apparatus SD4. That is, the secret update method of the present invention can also be applied in cases where remote copying is performed between two storages which are the first storage and second storage. This embodiment will be described in detail hereinbelow.

First Embodiment

Figure 2:
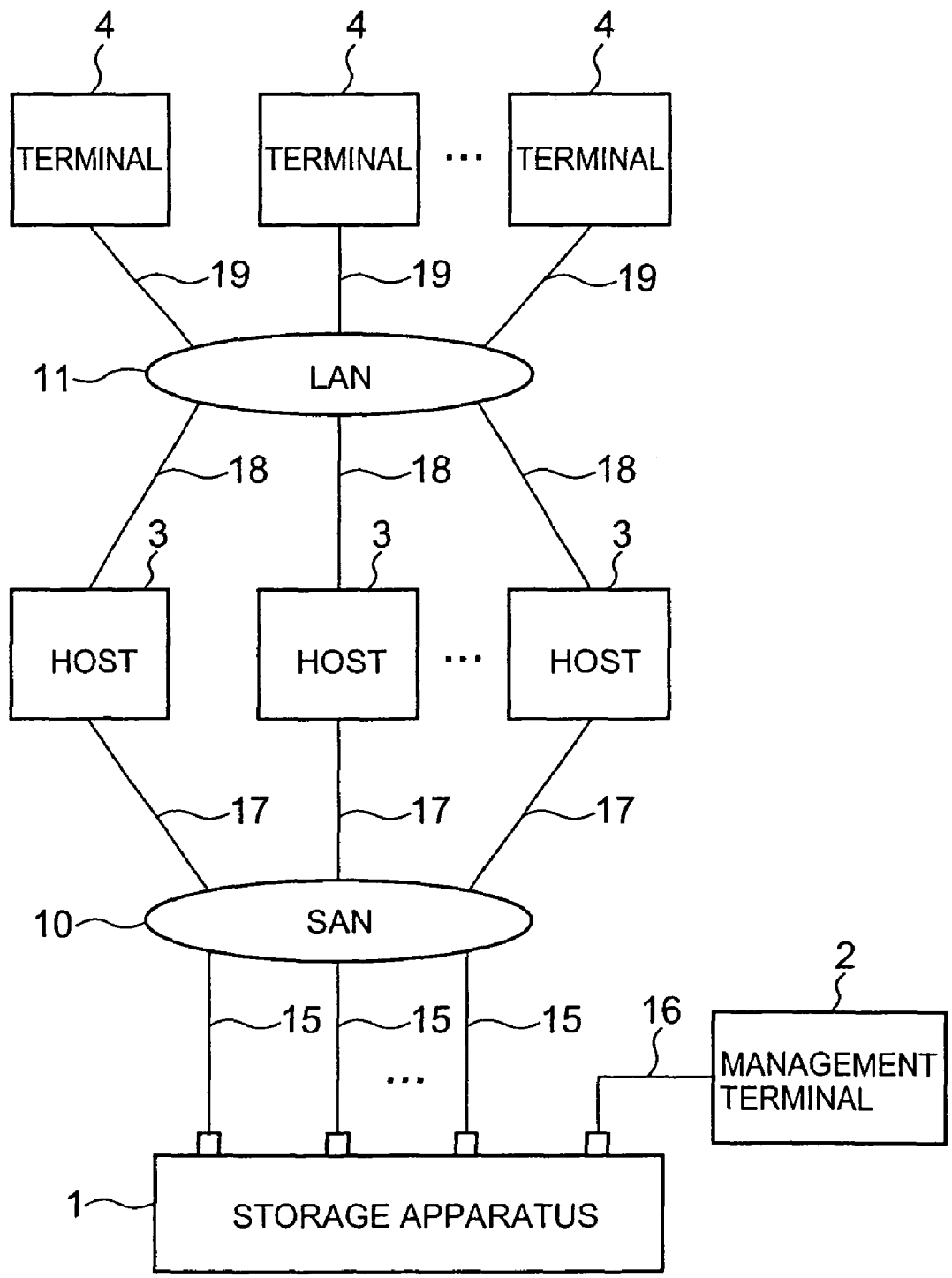
FIG. 2 is an explanatory diagram of the overall constitution of the storage system according to a first embodiment.

FIG. 2 is an explanatory diagram of the overall constitution of the storage system of this embodiment. This storage system is constituted comprising one or a plurality of storage apparatuses 1 (sometimes abbreviated to 'storage 1' hereinbelow), at least one management terminal 2, at least one or more hosts 3, and one or a plurality of client terminals 4.

The network constitution will now be described. The storage 1 and hosts 3 are connected via the IP-SAN 10 that uses an iSCSI, for example. Each of the ports of the storage 1 are connected to the SAN 10 via communication lines 15. The hosts 3 are each connected to the SAN 10 via communication lines 17. The management terminal 2 is connected to the storage 1 via a communication line 16.

The hosts 3 and terminals 4 are connected via a LAN (Local Area Network) 11, for example. The hosts 3 are connected to the LAN 11 via communication lines 18 and the terminals 4 are connected to the LAN 11 via communication lines 19.

Further, the communication lines 15, 16, 17, 18, and 19 are constituted as fixed wires such as metal cables and optical fiber cables, for example. However, the hosts 3 and terminals 4, hosts 3 and storage 1, and storage 1 and management terminal 2 can also be connected wirelessly. Communication lines 15, 16, 17, 18, and 19 are omitted in such a case.

The storage 1 corresponds to the storage SD in FIG. 1. The constitution of the storage 1 will be described subsequently, but the storage 1 provides the hosts 3 with a storage area. The management terminal 2 is a computer apparatus that is operated by the administrator in FIG. 1. The administrator is able to perform an update of configuration or the like of the storage 1 by using the management terminal 2. The hosts 3 correspond to the host HD in FIG. 1. The host 3 provide business services such as electronic mail services and video distribution services in accordance with requests from the terminals 4. The terminals 4 are constituted as computer apparatus such as personal computers, portable information terminals and cellular phones, for example.

Figure 3:
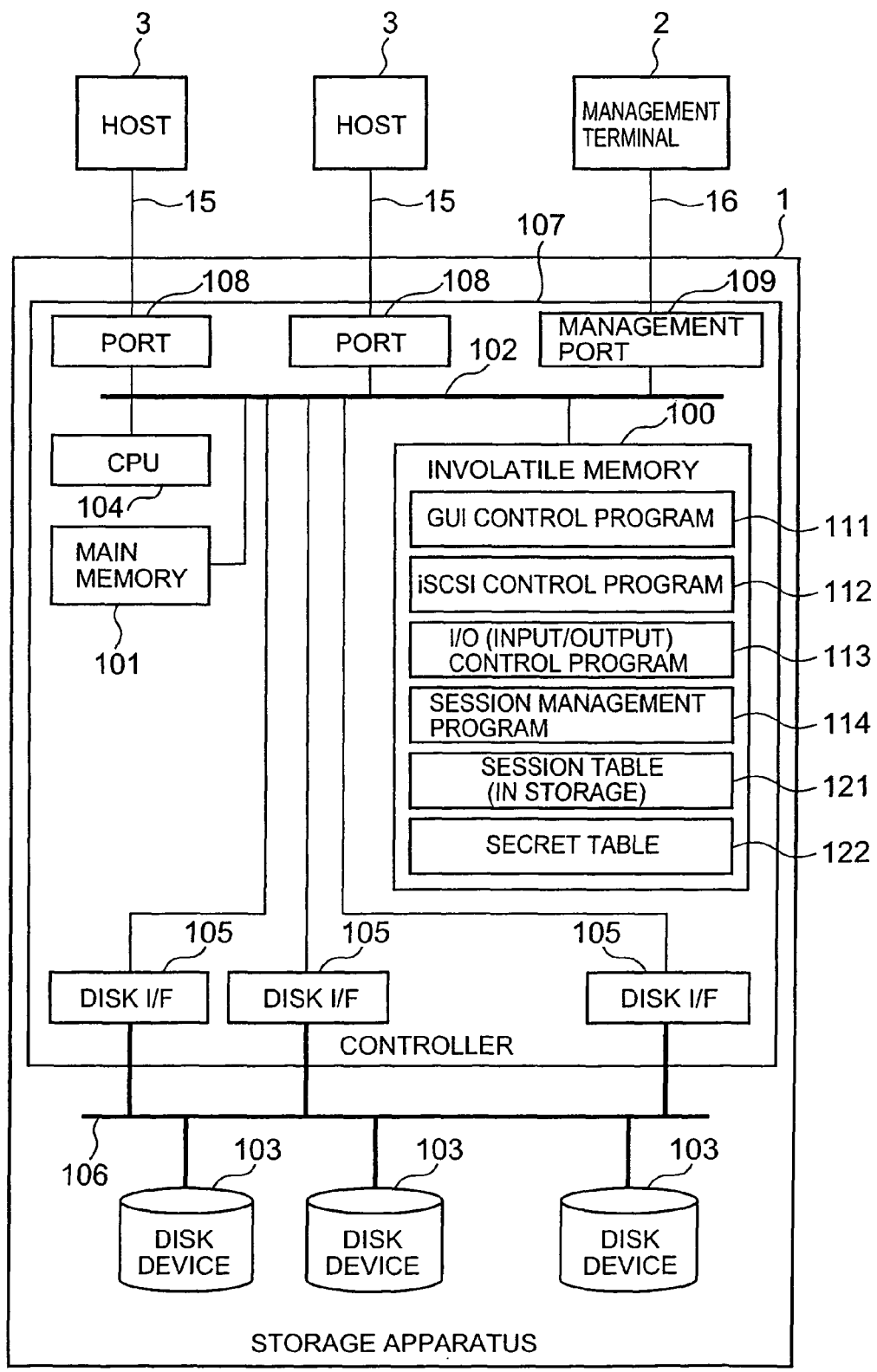
FIG. 3 is an explanatory diagram of the constitution of the storage apparatus.

FIG. 3 is an explanatory diagram of the constitution of the storage 1. The storage 1 is a storage apparatus system that comprises a single storage apparatus or a plurality thereof and can be broadly classified as a controller 107 and disk devices 103. The disk devices 103 correspond to the storage apparatus SD4 in FIG. 1.

Although a hard disk device was cited as an example of the disk device 103 in this embodiment, other storage apparatuses such as a flash memory device may also be used as mentioned earlier. The disk device 103 is connected to the controller 107 via the communication line 106 such as a Fiber channel cable. Further, a RAID (Redundant Array of Independent Disks) constitution can also be obtained from a plurality of disk devices 103.

The constitution of the controller 107 will now be described. The controller controls the writing and reading and so forth of data from and to the disk devices 103 in accordance with commands received from the hosts 3. The controller 107 are constituted comprising an involatile memory 100, a main memory 101, a CPU (Central Processing Unit) 104, a disk interface (interface is abbreviated to 'I/F' in FIG. 3) 105, a port 108, and a management port 109, for example. The respective memories 100 and 101, CPU 104, disk interface 105, and respective ports 108 and 109 are mutually connected via a communication line 102 such as a bus.

Examples of the involatile memory 100 include rewritable involatile memory such as a flash memory, for example. This memory 100 is able to store a GUI (Graphical User Interface) control program 111, an iSCSI control program 112, an I/O (Input/Output) control program 113, a session management program 114, a session table 121, and a secret table 122, for example.

The respective programs 111, 112, 113, and 114 are transferred from the involatile memory 100 to the main memory 101 and executed by the CPU 104. The GUI control program 111 controls the secret update screen displayed on the management terminal 2 as described subsequently and transmits information input by the administrator to the session management program 114.

The iSCSI control program 112 corresponds to the iSCSI controller SD2 in FIG. 1. The iSCSI control program 112 controls iSCSI-based communications. The iSCSI control program 112 assembles and disassembles IP packets, and so forth. The I/O (Input/Output) control program 113 writes data to the disk device 103 in accordance with the write command and reads data from the disk devices 103 in accordance with the read command from the hosts 3.

The session management program 114 corresponds to the session manager SD3 in FIG. 1. The session management program 114 opens a session with the hosts 3 and manages a method of using the session thus opened. In this embodiment, sessions of two types which are a session that uses an old secret (old secret using session) and a session that uses a new secret (new secret using session) are configured in the same path.

The session table 121 corresponds to the session table T1S in FIG. 1. The details will be provided in conjunction with FIG. 5 but the session table 121 stores information for managing sessions configured between the storage 1 and hosts 3. The secret table 122 corresponds to the secret table T2S in FIG. 1. The details will be provided in conjunction with FIG. 5 but the secret table 122 store user IDs and secrets and so forth for authenticating the hosts 3. Further, the constitution may be such that the session table 121 and secret table 122 are stored in both the involatile memory 100 and disk devices 103. As a result, even when the storage 1 fails or the like, loss of management information stored in the tables 121 and 122 respectively can be prevented and reliability improves.

Each of the programs 111 to 114 stored in the involatile memory 100 are read to the memory 101 if necessary. As a result of the CPU 104 executing each of the programs 111 to 114 read to the main memory 101, the GUI control function, iSCSI control function, I/O (Input/Output) control function, and session management function are each implemented. Further, the constitution may be such that a dedicated device for disassembling and assembling IP packets and so forth is provided.

The main memory 101 can also be provided with a cache area for storing data received from the host 3 and data read from the disk devices 103. Further, the constitution may also be such that a cache memory separate from the main memory 101 is provided.

The disk interface 105 exchanges data with the respective disk devices 103. The respective disk interfaces 105 are connected to each of the disk devices 103 via a communication line 106.

The port 108 corresponds to the port SD1 in FIG. 1. The ports 108 are connected to the hosts 3 via communication lines 15, the SAN 10, and the communication lines 17 as described together with FIG. 2. The management port 109 is connected to the management terminal 2 via the communication line 16.

The basic operation of the storage apparatus 1 will now be described in simple terms. When a write command is issued by the host 3, the controller 107 stores the write data received from the host 3 in the cache area in the main memory 101. The controller 107 writes the write data stored in the cache area to the disk device 103 via the disk interface 105. The constitution may be such that the fact that write-command processing is complete is reported to the host 3 at the point where the write data has been stored in the cache area, or the constitution may be such that the completion of write command processing is reported to the host 3 at the point where the write data has been written to the disk devices 103.

When a read command has been issued by a host 3, the controller 107 checks whether data requested by the host 3 is stored in the cache area. When the data requested by the host 3 is stored in the cache area, the controller 107 reads the data from the cache area and transmits the data to the host 3 via the port 108. When the data required by the host 3 is not stored in the cache area, the controller 107 reads data from the disk device 103 via the disk interface 105 and transfers the data to the cache area. The controller 107 then transmits the data stored in the cache area from the port 108 to the host 3.

Figure 4:
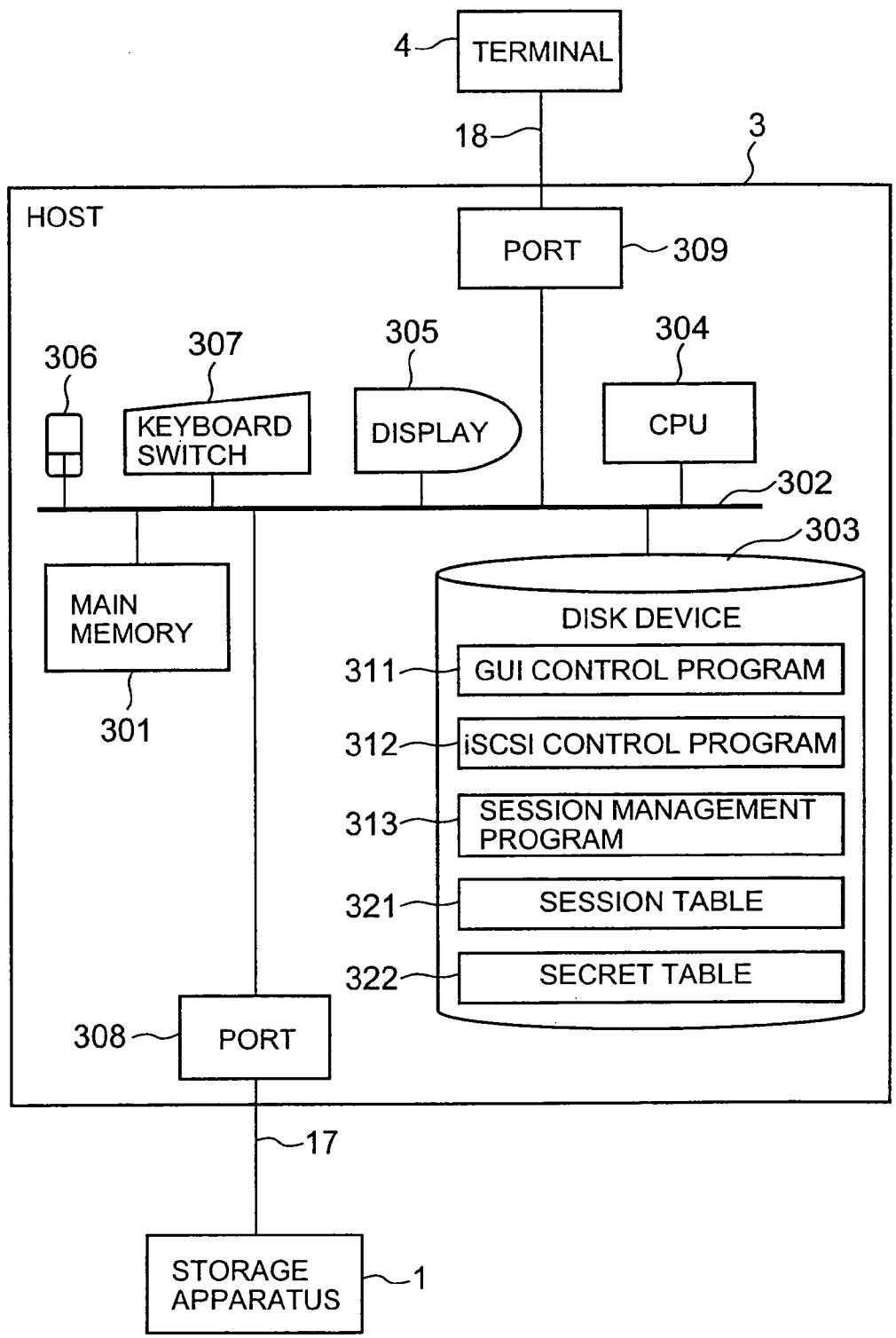
FIG. 4 is an explanatory diagram of the constitution of the host.

FIG. 4 is an explanatory diagram of the constitution of the host 3. The host 3 is constituted comprising a main memory 301, a bus 302, a disk device 303, a CPU 304, a display device 305, a pointing device 306, a keyboard switch 307, and ports 308 and 309, for example. The main memory 301, disk device 303, CPU 304, and the respective ports 308 and 309 are mutually connected via the bus 302.

The respective programs 311, 312 and 313 stored in the disk device 303 are transferred if necessary to the main memory 301. The CPU 304 implements each of the GUI control function, iSCSI control function and session management function by executing a program read to the main memory 301.

The disk device 303 is able to store a GUI control program 311, iSCSI control program 312, session management program 313, session table 321, and secret table 322, for example.

The GUI control program 311 controls the secret update screen displayed on the display device 305. The GUI control program 311 also transmits information input by the administrator via the pointing device 306 or keyboard switch 307 to the session management program 313.

The iSCSI control program 312 controls iSCSI-based communications and therefore corresponds to the iSCSI controller HD4 in FIG. 1. The iSCSI control program 312 disassembles and assembles IP packets and so forth.

The session management program 313 corresponds to the session manager HD3 in FIG. 1. The session management program 313 opens a session with the storage 1 and manages the usage methods of the sessions thus opened.

The session table 321 manages a session that uses a new secret and a session that uses an old secret. The session table 321 corresponds to the session table T1H in FIG. 1. The secret table 322 manages user IDs and secrets and so forth and corresponds to the secret table T2H in FIG. 1. The details regarding each of the tables 321 and 322 will be provided subsequently in conjunction with FIG. 5. Further, one path exists between one host 3 and one storage 1 in this embodiment.

Figure 5:
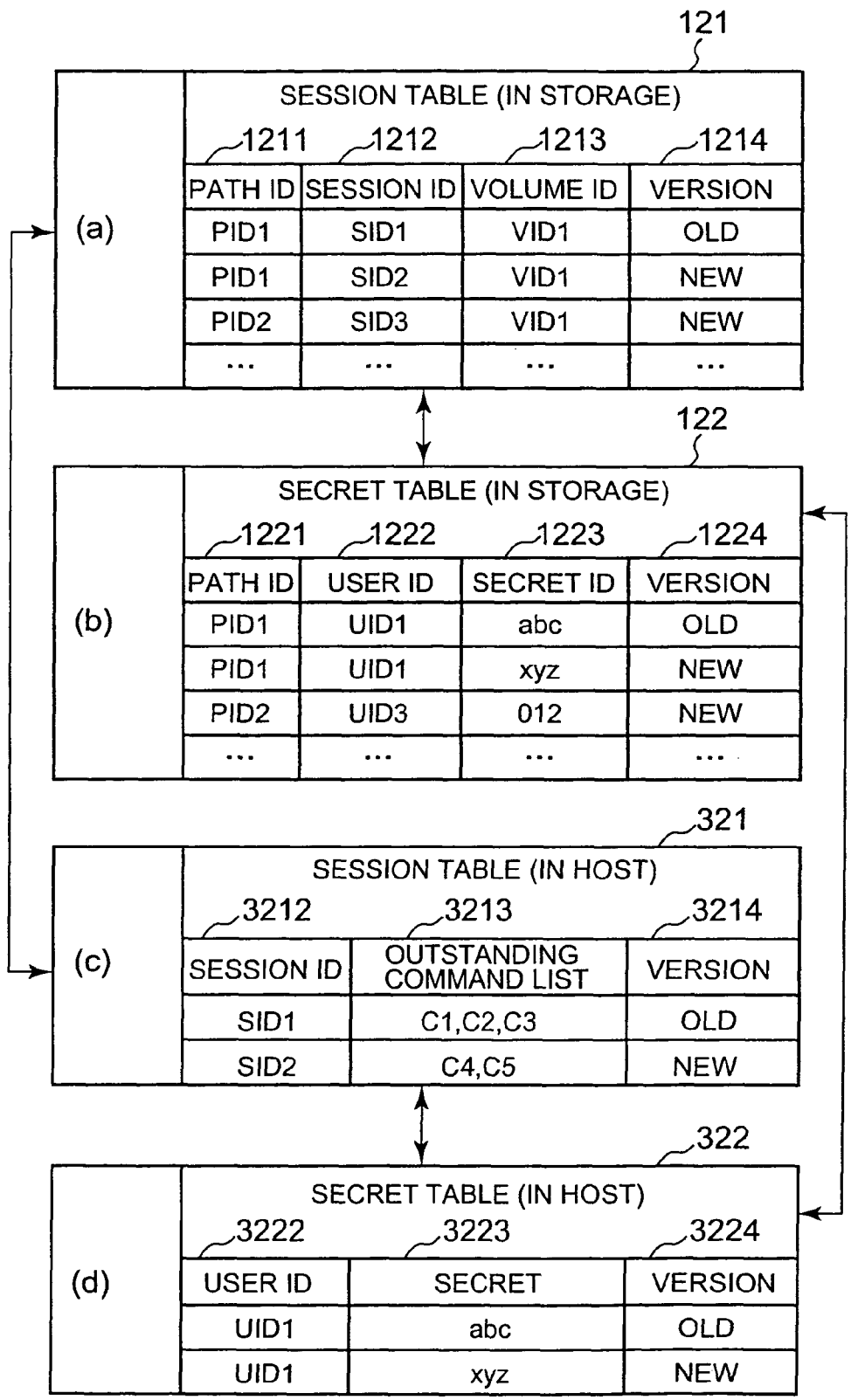
FIG. 5 is an explanatory diagram of the constitution of the session tables and secret tables.

FIG. 5 is an explanatory diagram of table structures. FIG. 5 shows the constitutions of the session table 121 and secret table 122 stored in the storage 1, and the session table 321 and secret table 322 stored in the host 3.

As shown in FIG. 5A, the session table 121 stored in the storage 1 associates and manages a path ID 1211, a session ID 1212, a volume ID 1213, and a version 1214, for example. The path ID 1211 is information for identifying the path connecting between the host 3 and storage 1. The session ID 1212 is information for identifying the sessions configured in the path. A plurality of sessions can be provided in the same path. The volume ID 1213 is information for identifying the volume being accessed via the session.

A volume is a logical storage area configured on a physical storage area of the disk devices 103. One or a plurality of volumes can be provided in a physical storage area that one disk device 103 comprises or one or a plurality of volumes can be provided by virtualizing a physical storage area that a plurality of disk devices 103 comprise.

The version 1214 is information indicating a distinction as to whether the session is an old secret using session that uses an old secret or a new secret using session that uses a new secret. 'old' is configured for the session that uses the old secret and 'new' is configured for the session that uses the new secret.

FIG. 5A shows an aspect in which a plurality of sessions specified by SID1 and SID2 are each provided in a path specified by PID1. The target volume accessed by the path (PID1) is specified by the VID1. Further, FIG. 5A shows that the session specified by SID1 is a session that uses the old secret and the session specified by SID2 is a session that uses the new secret.

The secret table 122 stored in the storage 1 associates and manages a path ID 1221, a user ID 1222, a secret 1223, and a version 1224, for example. The path ID 1221 is information serving to identify the path as described earlier. The user ID 1222 is information serving to identify the user. The secret 1223 is an array of characters or numerals used in authentication. The version 1224 is information indicating a distinction as to whether the secret is an old secret (secret before secret update) or a new secret (secret scheduled for update). 'old' is configured for the old secret and 'new' is configured for the new secret.

The session table 321 stored in the host 3 associates and manages a session ID 3212, an outstanding command list 3213, and a version 3214, for example. The session ID 3212 is information serving to identify the respective sessions configured between the host 3 and the storage 1. The outstanding command list 3213 is a list of commands executed by using the session. An outstanding command signifies a command for which a response related to the result of processing the command has not been received from the storage 1 and is a command that is in the course of execution. The version 3214 is information indicating a distinction as to whether the session is a session that uses a new secret or a session that uses an old secret.

The secret table 322 stored in the host 3 associates and manages a user ID 3222, a secret 3223, and a version 3224, for example. The user ID 3222 is information identifying the user. The secret 3223 is an array of a plurality of characters or numerals. The version 3224 is information serving to distinguish whether the secret is a new secret or an old secret.

Figure 6:
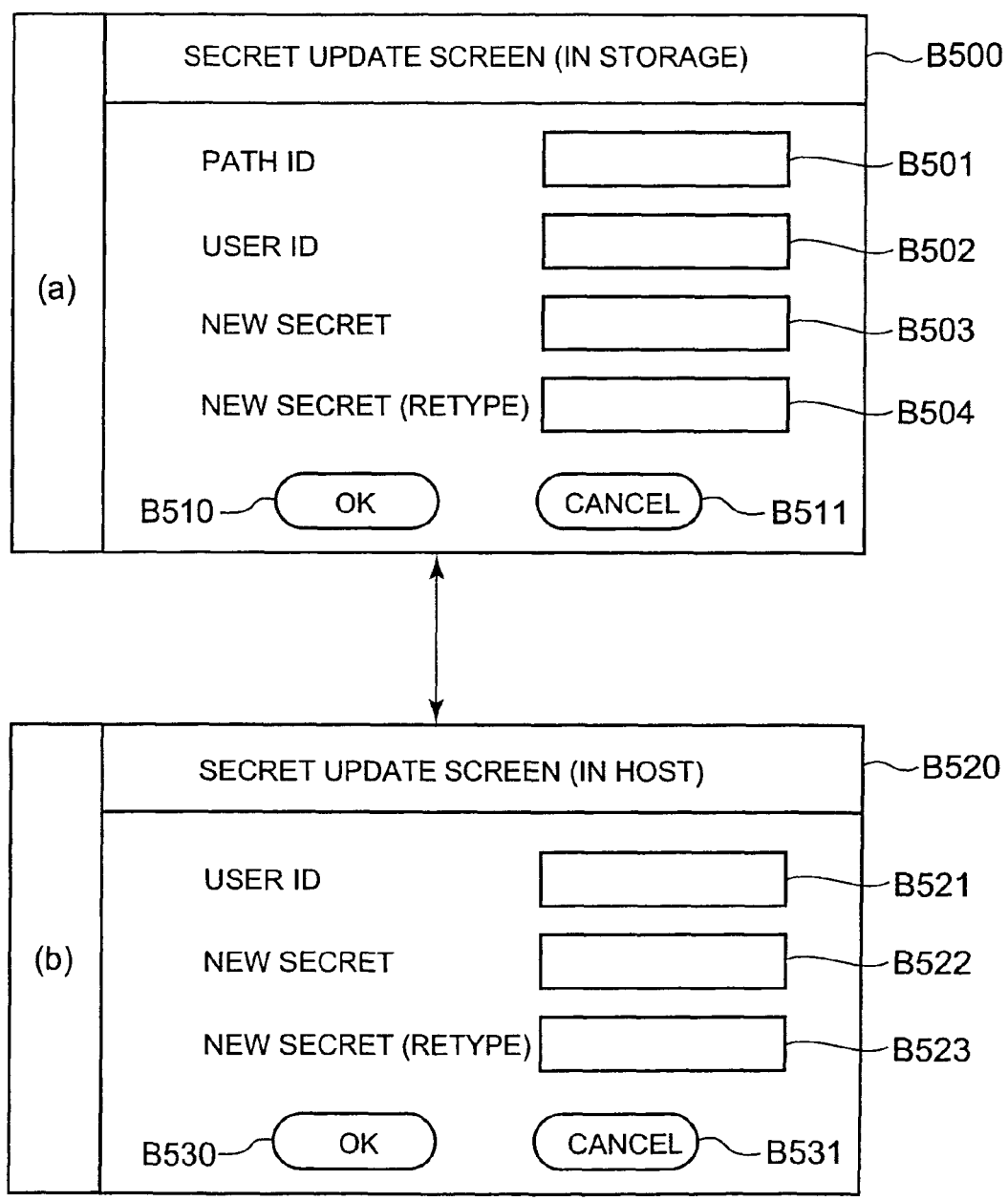
FIG. 6 is an explanatory diagram of secret update screens.

FIG. 6 is an explanatory diagram that schematically shows a secret update screen that is supplied to the administrator by the storage 1 and hosts 3. FIG. 6A shows a secret update screen B500 that the storage 1 supplies to the administrator via the management terminal 2. A plurality of input fields B501 to B504 and a plurality of buttons B510 and B511, for example, can be provided on the secret update screen B500.

The input field B501 allows the administrator to input a path ID. The input field B502 allows the administrator to input a user ID. The input field B503 allows the administrator to input a new secret. The input field B504 allows the administrator to retype a new secret. The button B510 serves to allow information that is input to the screen B500 by the administrator to be finalized. The button B511 cancels information that has been input to the screen B500 by the administrator.

Further, the screen B520 shown in FIG. 6B may also be the same but the input field B504 for retyping a new secret may be deleted. In addition, the constitution may be such that the path ID, user ID, and new secret are entered using speech.

FIG. 6B shows a secret update screen B520 that the host 3 supplies to the administrator via the display device 305. A plurality of input fields B521 to B523 and a plurality of buttons B530 and B531, for example, can be provided on the secret update screen B520.

The input field B521 serves to allow the administrator to input a user ID. The input field B522 serves to allow the administrator to input a new secret. The input field B523 serves to allow the administrator to retype a new secret. The button B530 serves to allow information that has been input to the screen B520 by the administrator to be finalized. The button B531 cancels information that has been input to the screen B520 by the administrator. Further, the secret update screens B500 and B520 shown in FIG. 6 are an example and other screen constitutions are also possible.

Figure 7:
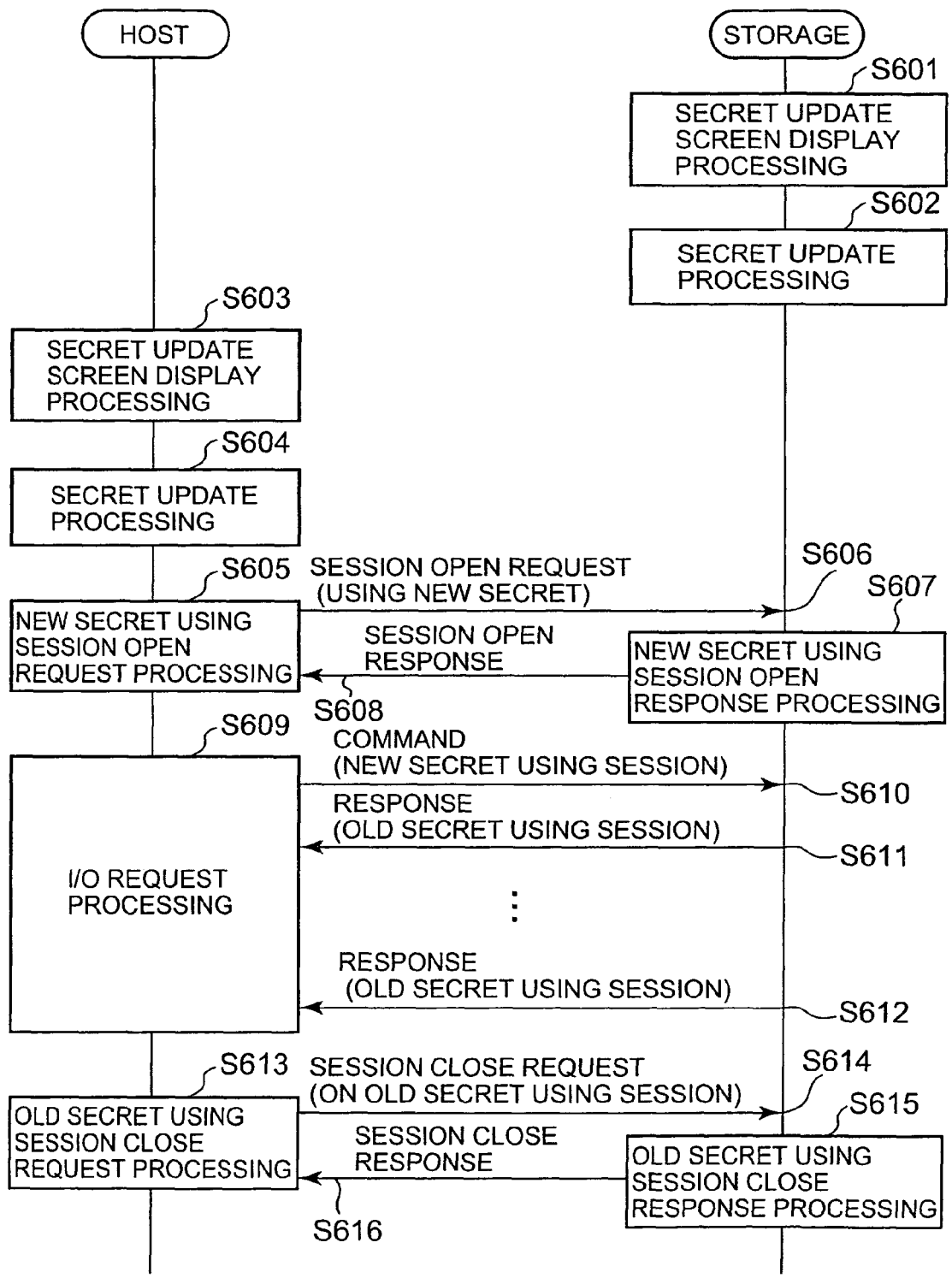
FIG. 7 is a flowchart that shows the overall operation when a secret is updated.

FIG. 7 is a flowchart that shows overall processing that serves to update the secret that is used by the storage system. Each of the following flowcharts is the same but the respective flowcharts shows an overview of the respective processes in the range required to understand and implement the present invention. The actual programs sometimes differ. Further, step is abbreviated to 'S' in the following description.

First, the overall flow in a case where the secret is updated will be described with reference to FIG. 7, whereupon the main processing included in FIG. 7 will be described.

The administrator is able to order an update of the secret at regular or irregular intervals. An update of the secret signifies that the secret currently being used (old secret) is exchanged for another new secret (new secret). When the administrator issues a request to update the secret to the storage 1 via the management terminal 2, the storage 1 displays a secret update screen B500 on the screen of the management terminal 2 (S601).

When the administrator inputs information required for the respective input fields B501 to B504 of the secret update screen B500 and selects the finalization button B510, the storage 1 executes secret update processing (S602). The details of the secret update processing S602 will be described subsequently in conjunction with FIG. 8.

Meanwhile, when the administrator issues a request to the host 3 to update the secret, the host 3 displays the secret update screen B520 on the display device 305 (S603). When the administrator inputs the required information to the respective input fields B521 to B523 of the secret update screen B520 and selects the finalization button B530, the host 3 executes secret update processing (S604). The secret update processing (S604) will be described in conjunction with FIG. 8.

After executing the secret update processing (S604), the host 3 executes processing to issue a request to the storage 1 to open a new secret using session (S605). A new secret using session is a session that uses a new secret, as mentioned earlier. In the processing S605 to request that a new secret using session be opened, a request to open a new session that uses a new secret is issued to the storage 1 (S606). The details of the processing S605 will be described in conjunction with FIG. 9.

When asked by the host 3 to open a session (S606), the storage 1 executes processing that responds by opening a new secret using session (S607). The details of the processing S607 will be described subsequently in conjunction with FIG. 10. When the storage 1 responds to the host 3 to the effect that a new session that uses a new secret has been opened (S608), the host 3 executes I/O request processing (S609).

At the point where a session that uses a new secret has been opened, the host 3 and storage 1 are connected via sessions of two types which are a session that uses an old secret and a session that uses a new secret.

The details of the I/O request processing S609 will be described subsequently in conjunction with FIG. 11. To describe these details first in simple terms, when a new command is issued in the I/O request processing S609, the new command is transmitted to the storage 1 via the new secret using session (S610). When the storage 1 issues a response related to a command (old command) received from the host 3 before opening a new secret using session, the old secret using session is used (S611, S612).

When time has elapsed, all the old commands are processed by the storage 1 and the host 3 receives a response related to all the old commands. The time required until a response related to all the old commands is received differs depending on the number of old commands issued, the processing power of the storage 1, and the communication delay time and so forth, for example. Further, responses received from the storage 1 include a response to the effect that a command has been completed normally and a response to the effect that a command could not be completed normally.

When the host 3 confirms that the processing of the old commands is complete, processing to close the old secret using session (S613) is executed. The processing S613 will be described in conjunction with FIG. 12. When the host 3 issues a request to the storage 1 to close the old secret using session (S614), the storage 1 executes processing to close the old secret using session (S615). The details of the processing S615 will be described subsequently in conjunction with FIG. 13. Upon receiving a response to the effect that the old secret using session has been closed from the storage 1 (S616), the host 3 terminates the processing S613.

Figure 8:
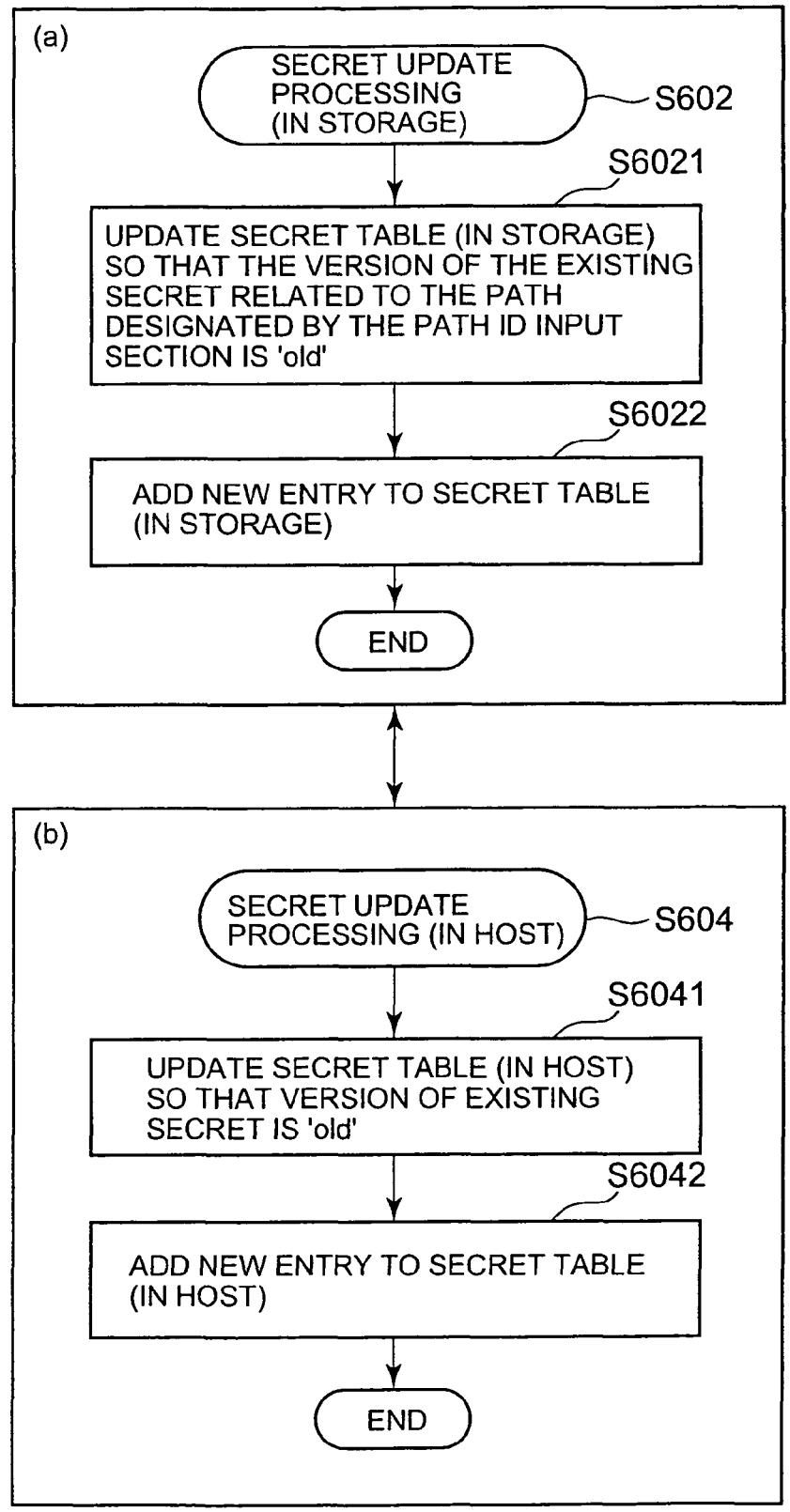
FIG. 8 is a flowchart that shows secret update processing (in storage and in host)

FIG. 8 is a flowchart that shows the details of the secret update processing S602 and S604 executed by the storage 1 and host 3. FIG. 8A shows a flowchart of the secret update processing S602 executed by storage 1.

In the processing S602, the storage 1 searches for the secret table 122 (FIG. 5B) on the basis of the path ID input to the path ID input field 501 of the secret update screen B500 and configures the version 1224 of the secret 1223 already registered for the path to 'old' (S6021).

The storage 1 then adds a new entry for registering a new secret to the secret table 122 (S6022). This is described by means of the example shown in FIG. 5B. When the administrator instructs an update of the secret of the path (PID1), the version of the existing secret ('abc') is updated to 'old'. Further, a new entry is added to the secret table 122. The path ID (PID1) requested by the secret update, the new secret ('xyz') and the version ('new') are configured as the new entry.

FIG. 8B is a flowchart that shows the details of the secret update processing S604 executed by the host 3. As mentioned earlier with respect to FIG. 8A, the host 3 updates the configured content of the secret table 322 so that the version of the existing secret (old secret) is 'old' (S6041). The host 3 then adds a new entry to the secret table 322 (S6042). The user ID, new secret and version are configured as the new entries. The value of the version is 'new'.

Figure 9:
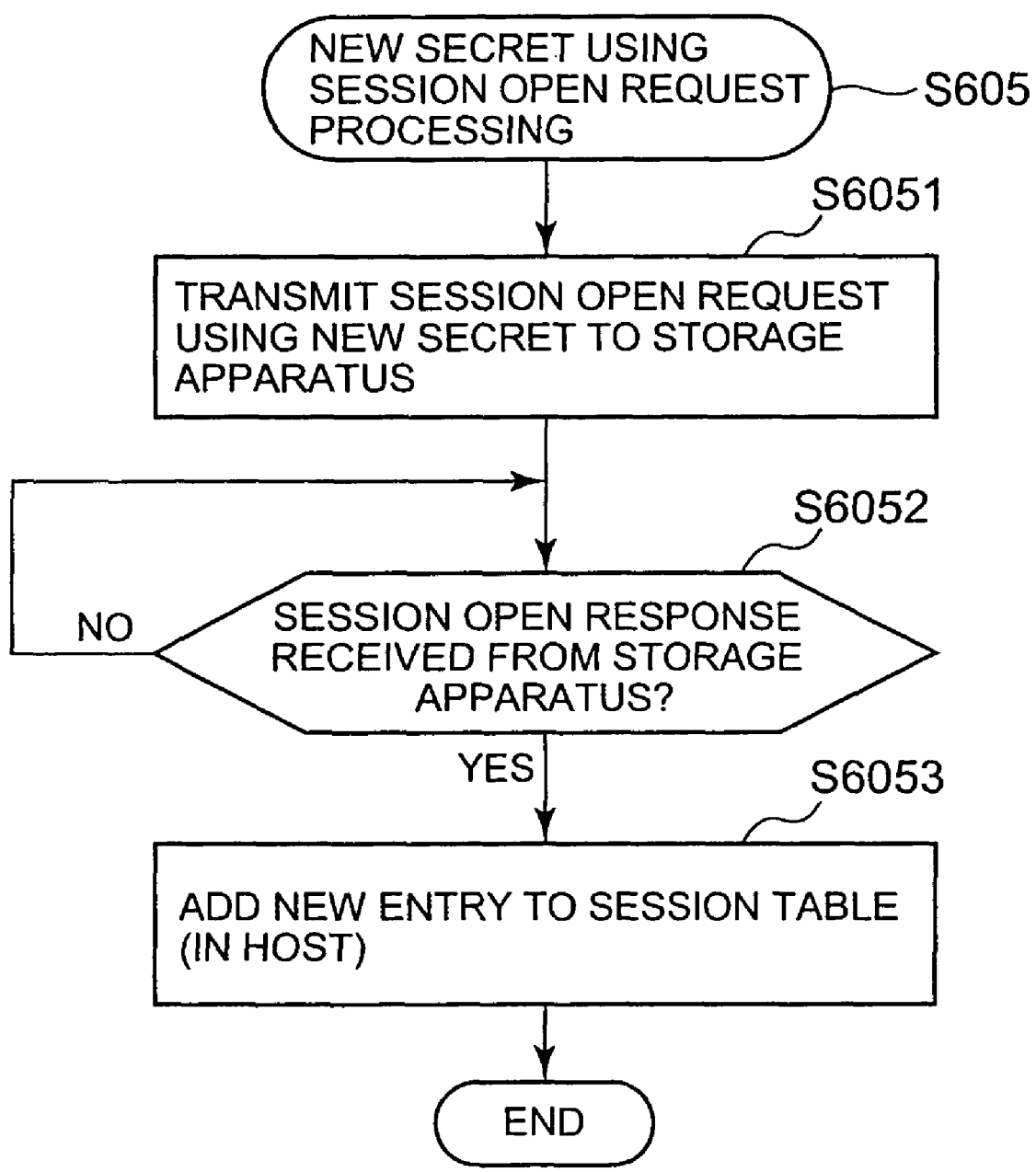
FIG. 9 is a flowchart that shows processing to request that a new secret using session be opened.

FIG. 9 is a flowchart that shows the details of the processing S605 for requesting that a new secret using session be opened that is executed by the host 3. The host 3 transmits a new session open request (using new secret) to the storage 1 as also indicated in S606 in FIG. 7 (S6051).

The host 3 waits to receive a session open response from the storage 1 (S6052). When a session open response is received from the storage 1 (S6052: YES), the host 3 adds a new entry to the session table 321 (S6053). A session ID for identifying a new secret using session, a list of commands being executed by using the new secret using session and a version are each configured as the new entry. The list of commands is blank because commands are not issued by using the new secret using session at the point where a new secret using session is opened. When a new command is issued by using the new secret using session, the command ID of the command is added to the command list. Further, 'new' is configured for the version of the new secret using session.

Figure 10:
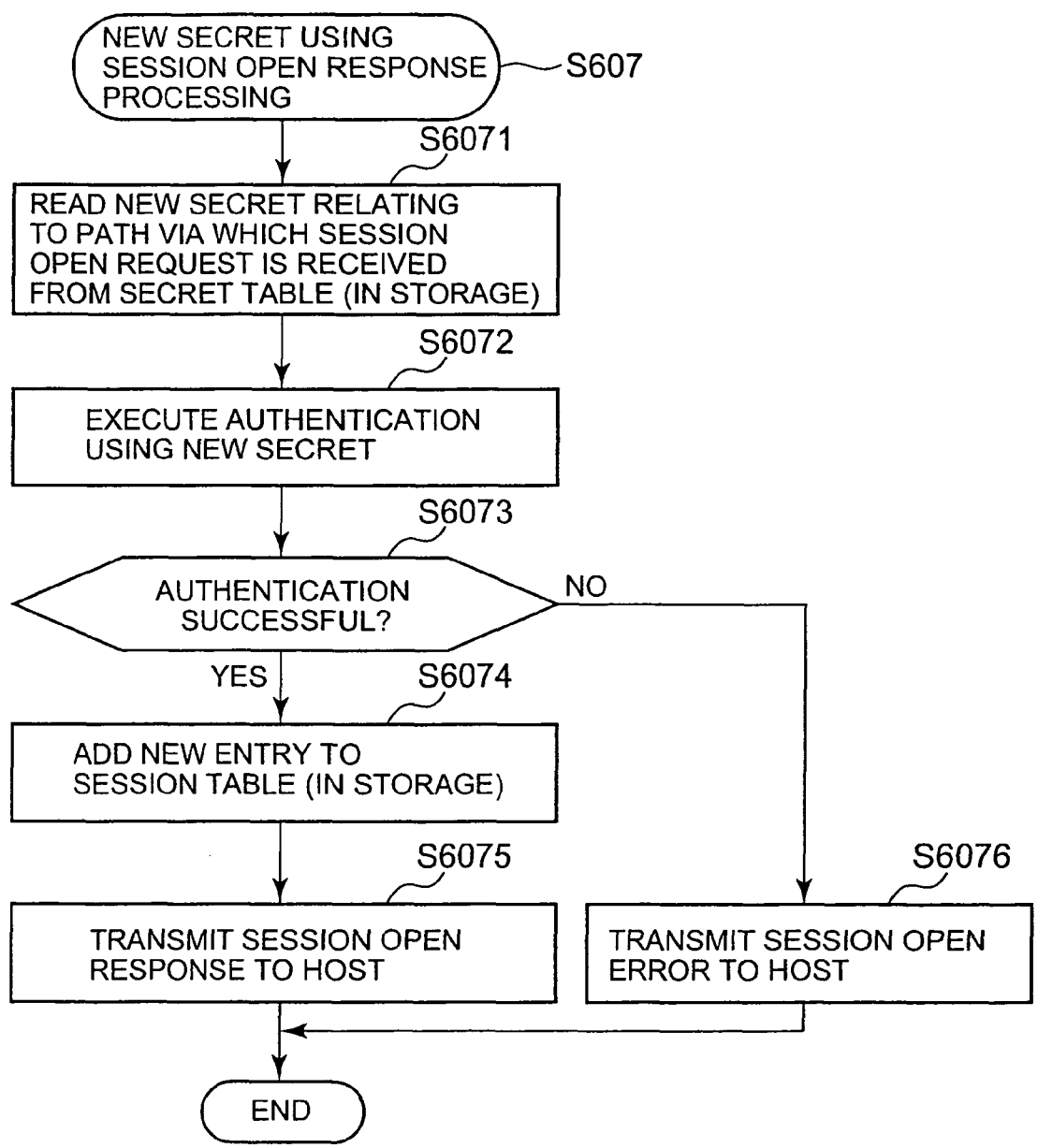
FIG. 10 is a flowchart that shows processing to open the new secret using session.

FIG. 10 is a flowchart showing the details of the processing S607 that opens a new secret using session and issues a response to the effect that a new secret using session has been opened. The processing S607 is executed by the storage 1.

When the storage 1 is asked by the host 3 to open a new secret using session, the storage 1 searches for the secret table 122 on the basis of the path ID of the path via which the request to open the new secret using session is received. The storage 1 reads the new secret and the user ID configured for the path via which the new secret using session open request is received from the secret table 122 (S6071).

Further, the storage 1 compares the user ID and new secret contained in the new secret using session open request received from the host 3 with the user ID and new secret registered in the secret table 122 and judges whether both match (S6072). The storage 1 judges whether authentication has been successful (S6073) and, when authentication has been successful (S6073: YES), the storage 1 adds a new entry to the session table 121 (S6074).

In the example shown in FIG. 5A, the entry of the new session (SID2) is added to the session table 121 in addition to the existing session (SID1). The version of the new entry is configured as 'new'. As a result of an entry related to the new secret using session being added to the session table 121, the opening of a session using a new secret is complete. Hence, the storage 1 transmits a response to the effect that a new secret using session has been opened to the host 3 (S6075).

On the other hand, when authentication has failed (S6073: NO), an error response to the effect that the session could not be opened is sent back to the host 3 (S6076). It is noted that a request to open a session by using the old secret is rejected after the administrator registers the new secret to the storage 1. That is, when the storage 1 is asked by the host 3 to open a session by using the old secret, authentication fails and an error response that the session could not be opened is sent back to the host 3 by the storage 1. As a result, risk that unauthorized access to the volume occurs because of compromise of the old secret can be minimized.

Figure 11:
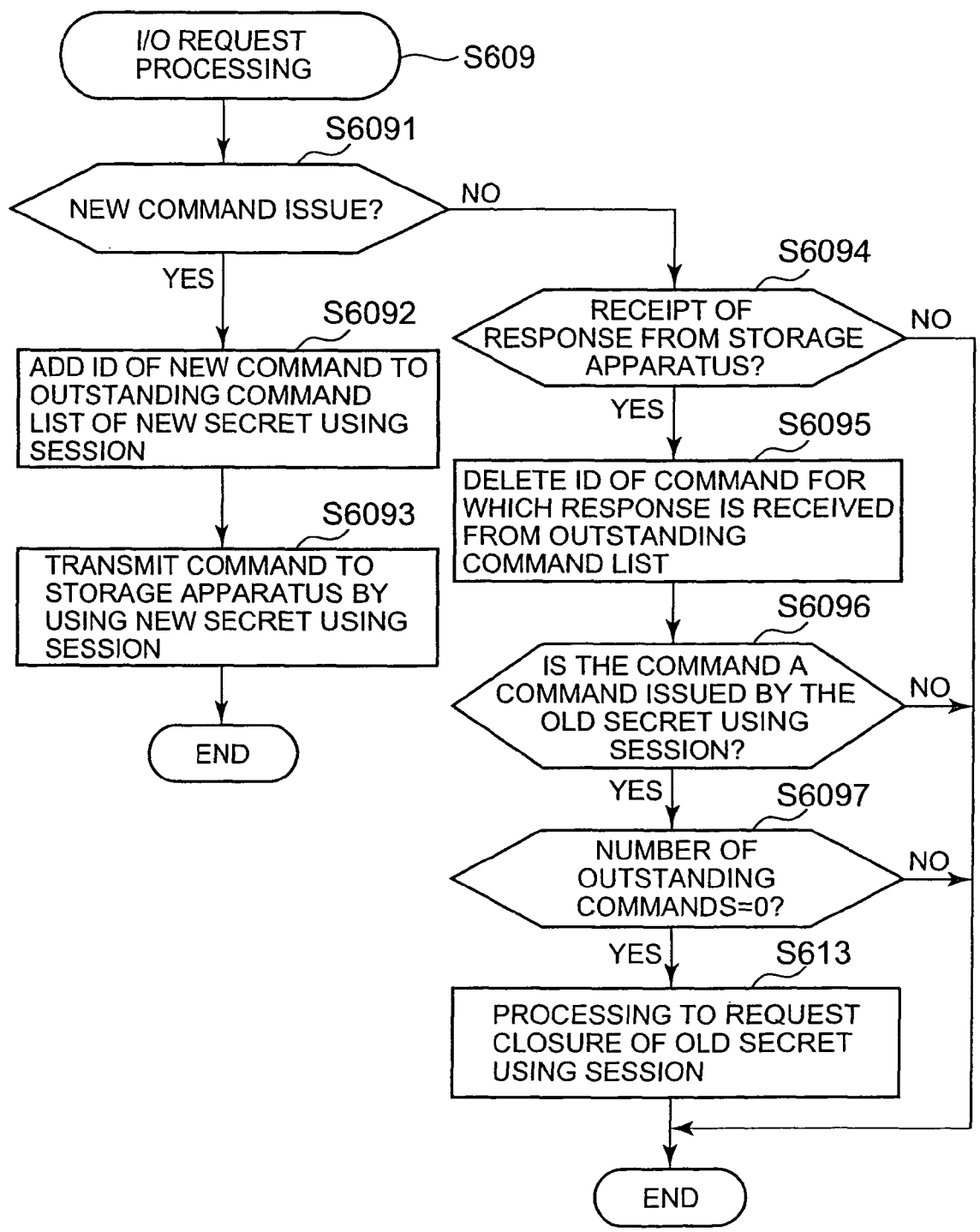
FIG. 11 is a flowchart that shows I/O request processing.

FIG. 11 is a flowchart showing the details of I/O request processing S609 that is executed by the host 3. In the processing S609, the new secret using session and old secret using session are used in accordance with the period of the issue of the command as will be described hereinbelow.

First, the host 3 judges whether the processing target is 'the issue of new command' (S6091). The new command signifies a command that is issued after updating the secret. A command that is issued prior to updating the secret, that is, a command that is transmitted from the host 3 to the storage 1 by using an old secret using session is an old command.

When a new command is issued (S6091:YES), the host 3 adds the command IDs of new commands to be issued thereafter to the outstanding command list related to the new secret using session in the session table 321 (S6092). The host 3 transmits the new command to the storage 1 via the new secret using session after adding the command ID of the new command to the session table 321 (S6093).

When a new command is not issued (S6091: NO), the host 3 judges whether a response from the storage 1 has been received (S6094). When a response related to the command has not been received (S6094: NO), this processing ends. That is, this processing operates when a new command is issued and when a response is received.

When a response is received from the storage 1 (S6094: YES), the host 3 deletes the command ID of the command for which a response has been received from the outstanding command list in the session table 321 (S6095).

Thereafter, the host 3 judges whether the command for which a response has been received in S6094 is a command issued by the old secret using session (S6096). That is, it is judged whether the response has been received from the storage 1 via the old secret using session.

When the command has not been issued by using the old secret using session (S6096: NO), this processing is ended because the command is a new command issued by using the new secret using session. That is, upon receiving a response related to the new command from the storage 1, the host 3 deletes only the command ID of the new command from the command list in the session table 321.

On the other hand, when the command for which a response has been received in S6094 is transmitted from the host 3 to the storage 1 by using the old secret using session (S6096: YES), the host 3 judges whether the number of commands of the outstanding command list of the old secret using session is '0' (S6097). That is, the host 3 judges whether the processing is complete for all the old commands transmitted via the old secret using session.

When the number of outstanding commands of the old secret using session is '0' (S6097: YES), the host 3 executes processing to issue a request to the storage 1 to close the old secret using session (S613).

Figure 12:
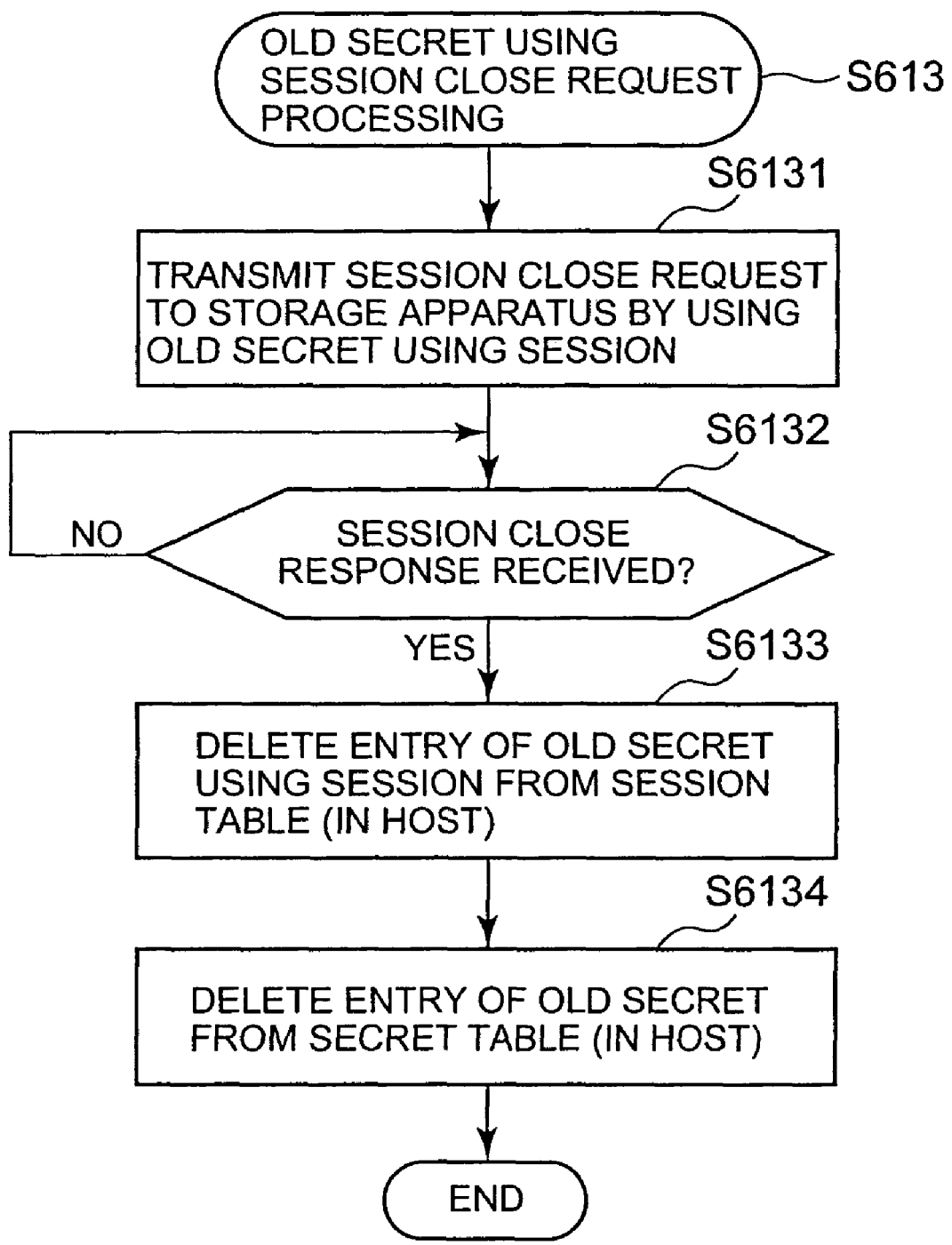
FIG. 12 is a flowchart that shows processing to request the closing of an old secret using session.

FIG. 12 is a flowchart showing the details of the processing S613 to request closure of the old secret using session executed by the host 3. The host 3 issues a request to the storage 1 to close the session by using the old secret using session (S6131). The host 3 waits to receive a response to the effect that the session (old secret using session) has been closed from the storage 1 (S6132).

When a request to the effect that the session is closed has been received from the storage 1 (S6132: YES), the host 3 deletes entries related to the old secret using session from the session table 321 (S6133). Further, the host 3 deletes entries related to the old secret from the secret table 322 (S6134).

Figure 13:
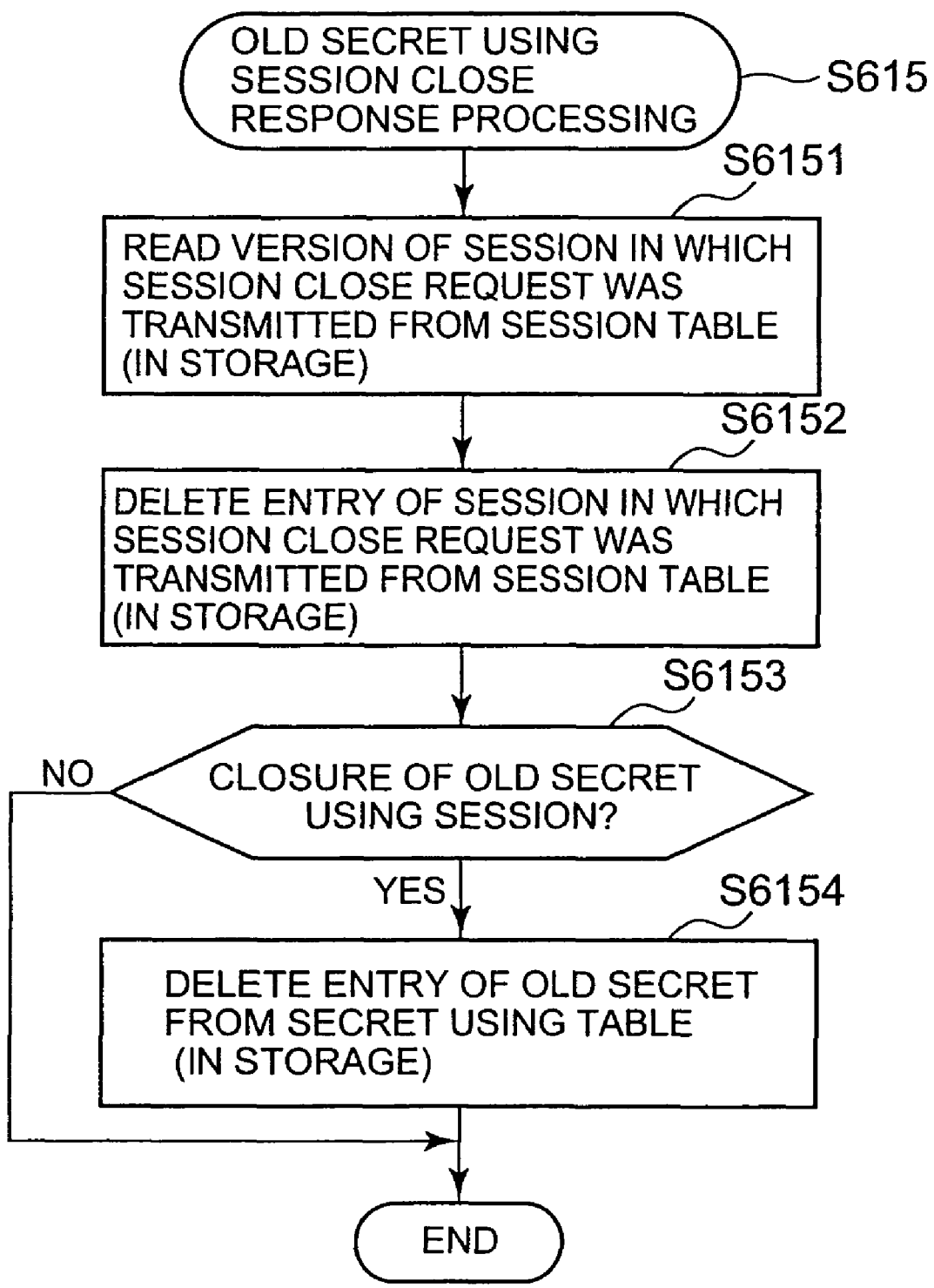
FIG. 13 is a flowchart that shows processing to close the old secret using session.

FIG. 13 is a flowchart that shows the details of processing S615 that closes the old secret using session and sends back a response to the effect that this session is closed. The processing S615 is executed by the storage 1.

Upon receipt of the request to close the session from the host 3, the storage 1 searches for the session table 121 on the basis of the session ID of the session for which the close request was received and reads the version of the session from the session table 121 (S6151). Further, the storage 1 deletes entries of the session for which the close was requested from the session table 121 (S6152).

The storage 1 judges whether the session closed in S6152 is an old secret using session on the basis of the version acquired in S6151 (S6153). When the old secret using session has been closed (S6153: YES), the storage 1 deletes entries related to the closed old secret from the secret table 122 (S6154).

This embodiment is constituted as mentioned earlier and therefore affords the following effects. In this embodiment, when a secret is updated, both an old secret using session and a new secret using session are configured. Outstanding commands (commands in the course of execution) issued prior to the secret update processing are processed by using the old secret using session and commands issued after the secret update processing are processed by using the new secret using session. Further, the constitution is such that, at the point where the old secret using session is not required (when all the old command processing is complete), the old secret using session is closed and only a new secret using session is generated. Hence, the secret can be updated while the session is maintained between the hosts 3 and storage 1. As a result, security can be improved while maintaining the availability of the host 3, and user convenience also improves.

Here, commands that are issued prior to the secret update processing (old commands) may be redefined as commands that are issued before the start of secret update preparations and commands that are issued after the secret update processing (new commands) may be also redefined as commands that are issued after completion of the secret update preparations.

Second Embodiment

The second embodiment will now be described based on FIGS. 14 to 18. The following respective embodiments that include this embodiment correspond to modified examples of the first embodiment above. Hence, in the following embodiments that include this embodiment, the focus of the description will be on the parts that differ from those of the first embodiment. In this embodiment, a secret is updated as a result of a new secret being reported by the management server 5 to the host 3 and storage 1.

Figure 14:
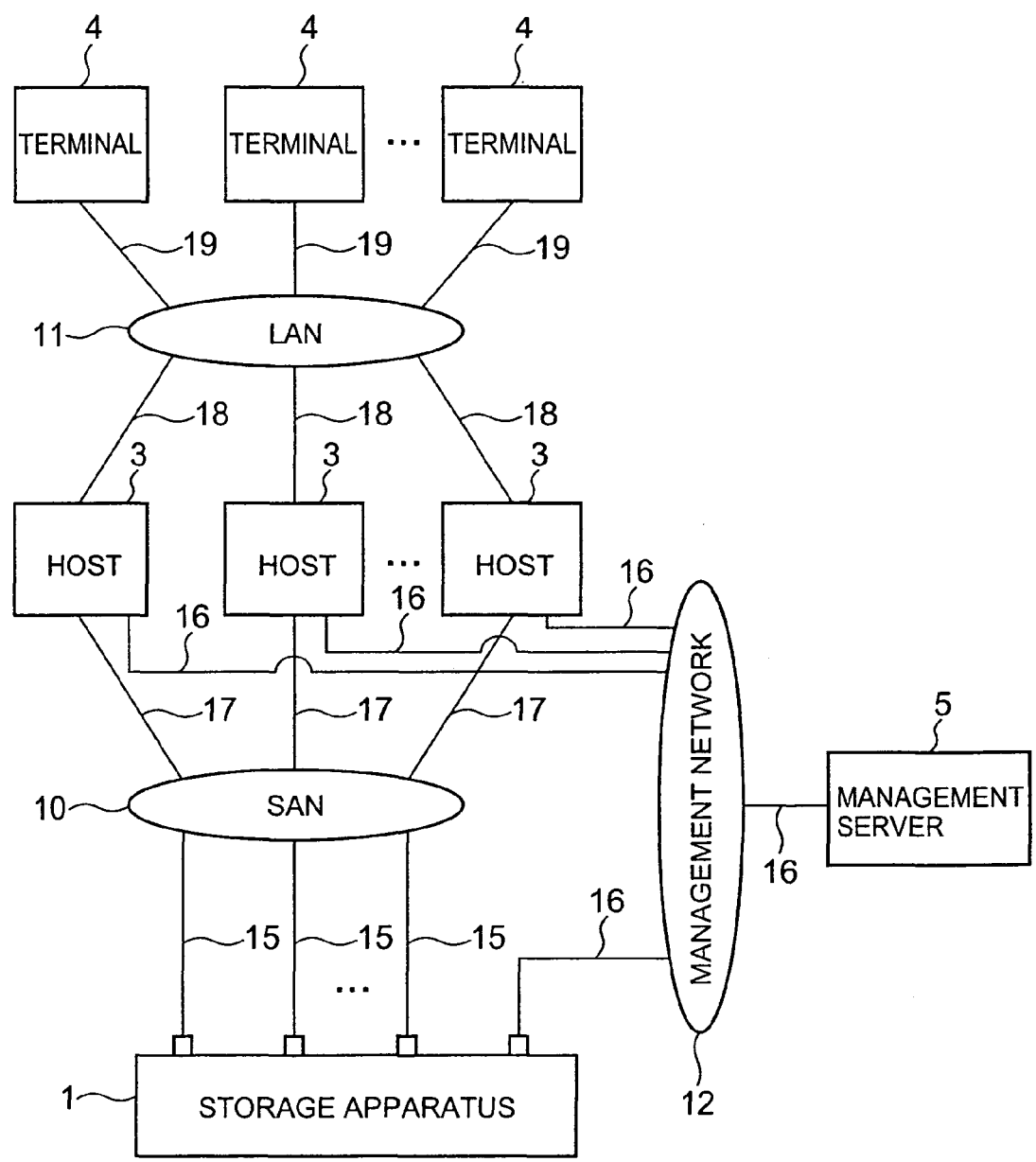
FIG. 14 is an explanatory diagram of the overall constitution of the storage system according to a second embodiment.

FIG. 14 is an explanatory diagram that shows the overall constitution of the storage system of this embodiment. In this embodiment, a management network 12 and management server 5 are each added to the constitution shown in FIG. 2.

The management server 5 is a computer apparatus for managing each of the hosts 3 and the storage 1. The management server 5 is connected to the management network 12 via a communication line 16. The hosts 3 and storage 1 are also connected to the management network 12 via communication lines 16. That is, the management server 5 is connected so as to be capable of bi-directional communication to each of the respective hosts 3 and storage 1 via the management network 12.

Here, the management network 12 can be constituted as a network such as a LAN, for example. However, the management network 12 is not limited to a LAN and may also be constituted as a network such as a SAN. Further, a constitution in which the SAN 10 connecting the hosts 3 and storage 1 and the management network 12 are integrated is also possible.

Figure 15:
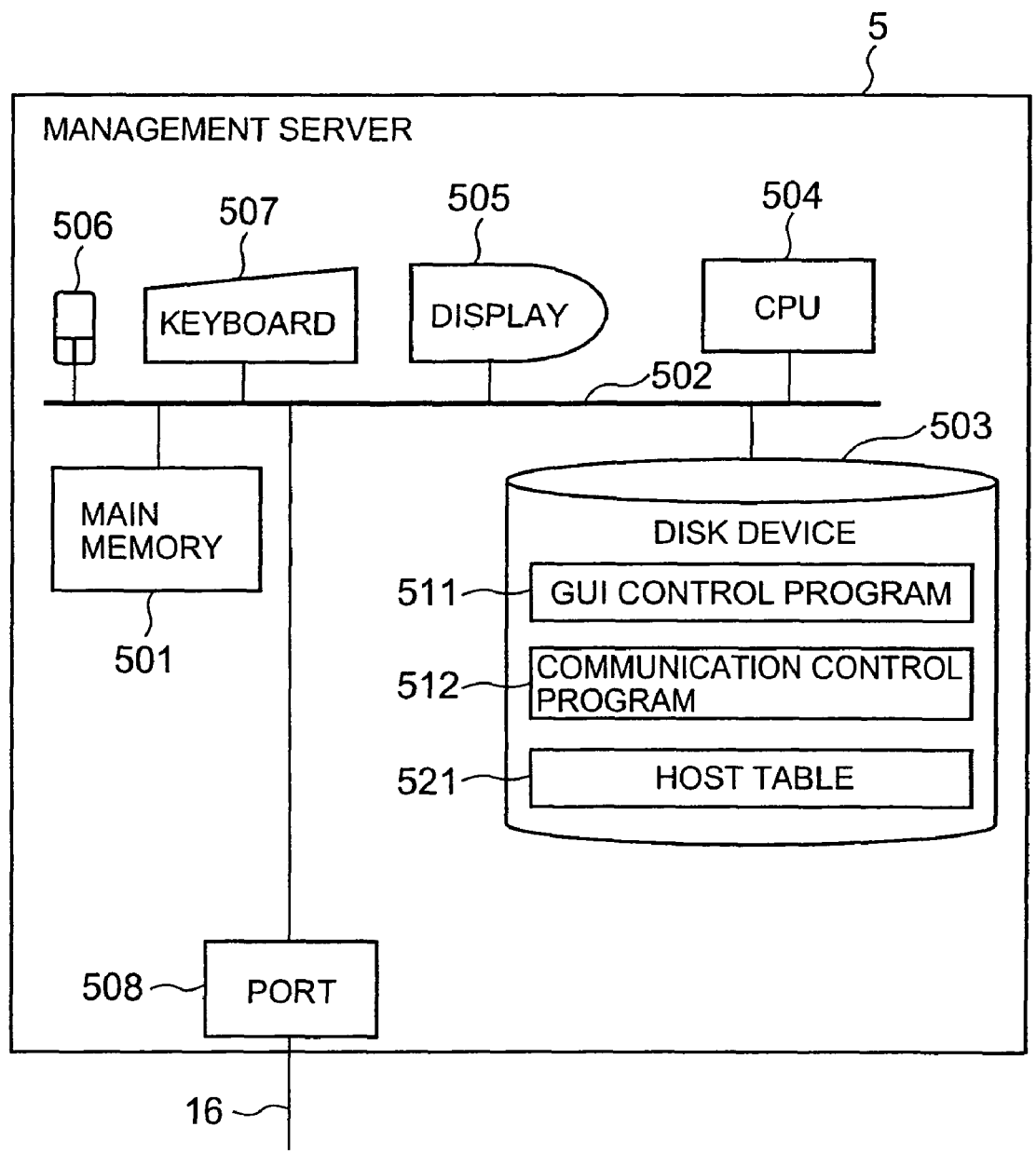
FIG. 15 is an explanatory diagram of the constitution of the management server.

FIG. 15 is an explanatory diagram showing the constitution of the management server 5. The management server 5 is constituted comprising, for example, a main memory 501, a bus 502, a disk device 503, a CPU 504, a display device 505, a pointing device 506, a keyboard switch 507, and a port 508. The main memory 501, disk device 503, CPU 504, and port 508 and so forth are mutually connected via the bus 502.

Each of the programs 511 and 512 stored in the disk device 503 are transferred to the main memory 501 if necessary. The CPU 504 implements a GUI control function and a communication control function by executing programs that are read to the main memory 501.

The disk device 503 is able to store a GUI control program 511, a communication control program 512, and a host table 521, for example.

The GUI control program 511 controls the secret update screen B540 displayed on the display device 505 (See FIG. 17). Further, the GUI control program 511 transmits information input by the administrator via the pointing device 506 or keyboard switch 507 to the communication control program 512.

The communication control program 512 is a program for performing communications with the hosts 3 and storage 1 via the management network 12. As a result of the communication control program 512, the management server 5 issues a request to the hosts 3 and storage 1 to update the secret and receives a response to the effect that the secret has been updated from the hosts 3 and storage 1.

The host table 521 is a table for managing the respective hosts 3. FIG. 16 is an explanatory diagram of a constitutional example of the host table 521. The host table 521 associates and manages the host ID 5211 for identifying the respective hosts 3 and the path ID 5212 for identifying the respective paths, for example. By using the host table 521, it can be detected which path a particular host 3 is using.

FIG. 17 is an explanatory diagram of an example of the secret update screen B540 provided by the management server 5. The secret update screen B540 can be provided with a plurality of input fields B541 to B544 and a plurality of buttons B550 and B551, for example.

The input field B541 serves to allow the administrator to input a path ID. The input field B542 serves to allow the administrator to input a user ID. The input field B543 serves to allow the administrator to input a new secret. The input field B544 serves to allow the administrator to retype a new secret. The button B550 is for finalizing the information that has been input to the screen B540 by the administrator. The button B551 is for canceling information that has been input to the screen B500 by the administrator.

Figure 18:
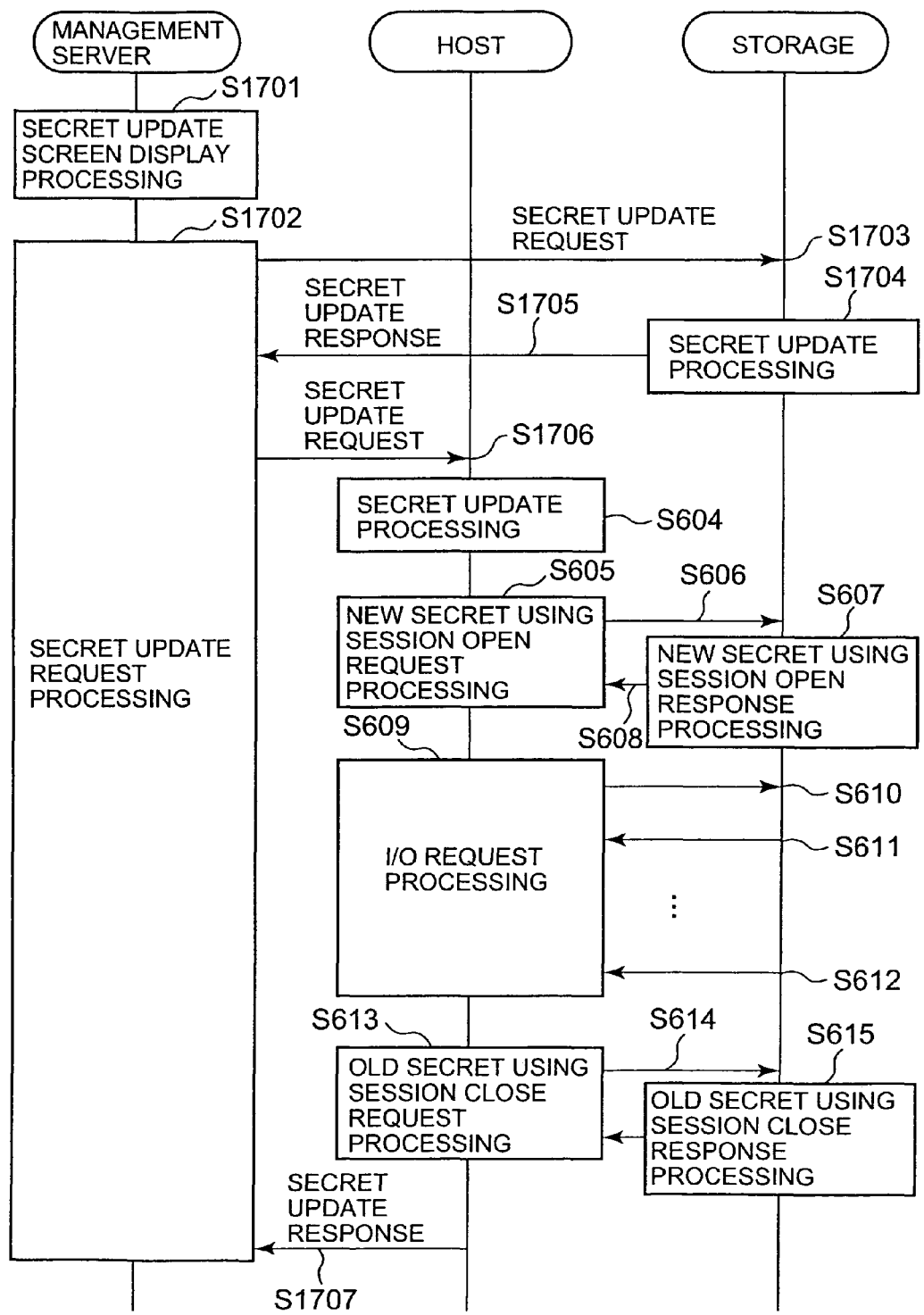
FIG. 18 is a flowchart of the overall operation when a secret is updated.

FIG. 18 is a flowchart of the overall operation when a secret is updated according to this embodiment. The management server 5 executes processing to display the secret update screen B540 on the display device 505 as a result of an instruction from the administrator (S1701).

When the administrator inputs the required information to the respective input fields B541 to B544 of the secret update screen B540 and selects the finalization button B550, the management server 5 starts the processing to request an update of the secret (S1702).

The management server 5 issues a request to the storage 1 to update the secret (S1703). The storage 1 executes secret update processing in accordance with the request from the management server 5 (S1704). That is, as mentioned earlier in FIG. 8A, the storage 1 configures the version of the existing secret as 'old' and adds a new entry for the new secret to the secret table 122. When the secret update processing (S1704) is complete, the storage 1 sends back a response to the effect that the secret has been updated to the management server 5 (S1705).

The management server 5 issues a request to the host 3 to update the secret (S1706). The host 3 executes the secret update processing described in conjunction with FIGS. 7 and 8 in accordance with the request from the management server 5 (S604).

Thereafter, the steps of S605 to S615 described in FIG. 7 are executed. That is, the host 3 and storage 1 are connected via an old secret using session and new secret using session (S605, S606, S607, and S608). A new command is transmitted from the host 3 to the storage 1 by using a new secret using session and a response related to an old command is transmitted from the storage 1 to the host 3 via an old secret using session (S609, S610, S611, and S612). When all the old command processing is complete, the old secret is closed (S613, S614, S615).

Upon confirming that the old secret using session is closed, the host 3 issues a response to the effect that the secret update is complete to the management server 5 (S1707).

This embodiment constituted thus also affords the same effects as those of the first embodiment. In addition, in this embodiment, the administrator is able to issue an instruction to the host 3 and storage 1 to update the secret via the management server 5 and user convenience therefore increases. That is, the administrator need not individually instruct the host 3 and storage 1 to update the secret. The secret can be updated by means of a one-time instruction from the management server 5.

Third Embodiment

Figure 19:
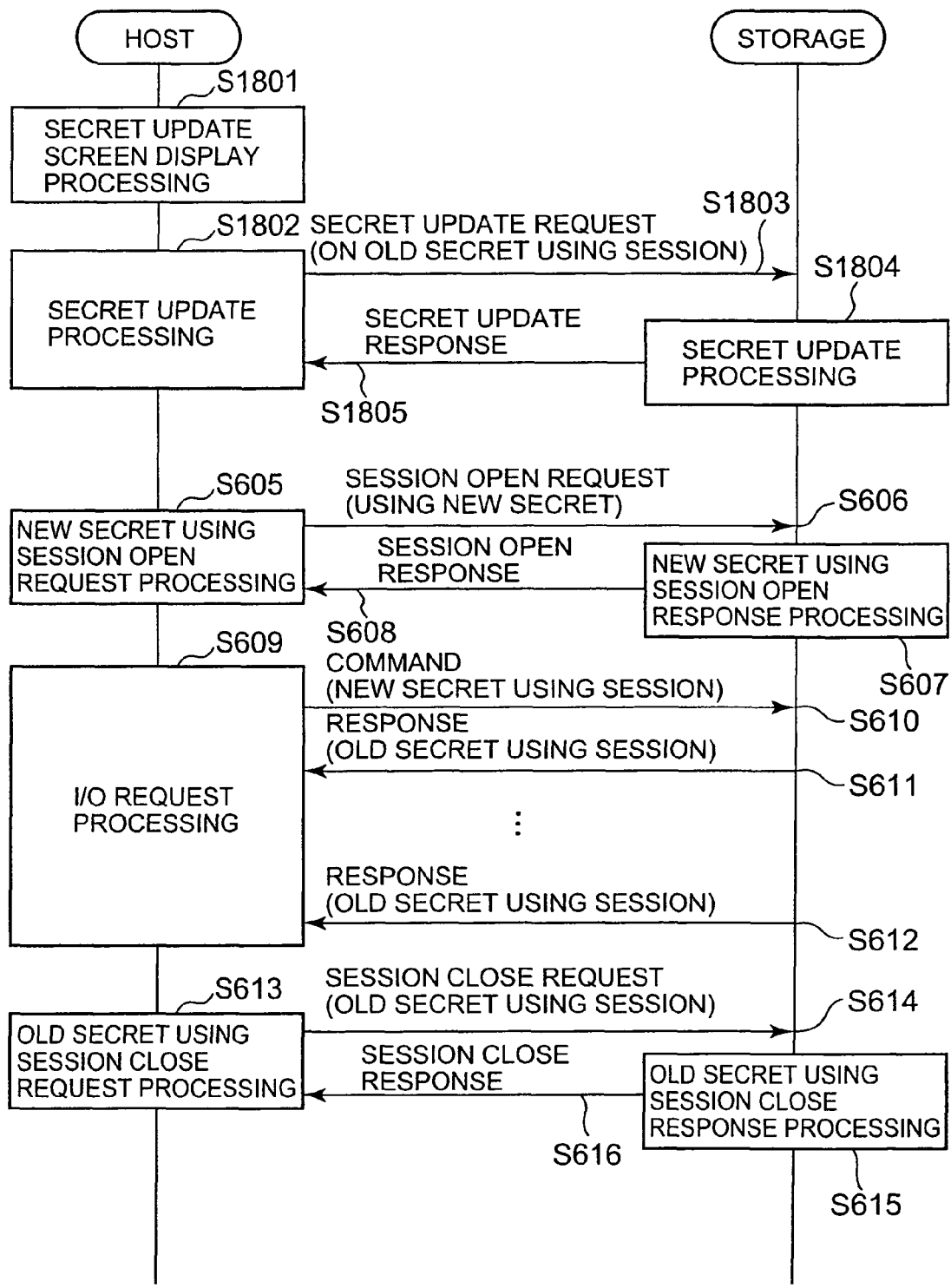
FIG. 19 is a flowchart that shows the overall operation when a secret is updated in the storage system according to a third embodiment.

The third embodiment will now be described based on FIG. 19. In this embodiment, a request to update the secret is sent from the host 3 to the storage 1. FIG. 19 is a flowchart that shows the overall processing when the secret is updated.

Upon receiving an instruction to update the secret from the administrator, the host 3 displays the secret update screen B520 (S1801). When the administrator inputs a new secret or the like to the secret update screen B520, the host 3 starts the secret update processing (S1802).

The host 3 transmits a secret update request to the storage 1 by using an old secret using session (S1803). Upon receiving the secret update request from the host 3, the storage 1 executes the secret update processing (S1804). The secret update processing (S1802, S1804) executed by the host 3 and storage 1 respectively is the same as S604 and S602 described earlier in the first embodiment except for the fact that the host 3 transmits the secret update request and the storage 1 transmits a secret update response to the host 3 after the secret update processing is complete.

Further, upon receiving a response to the effect that the secret update processing is complete from the storage 1 (S1805), the host 3 executes the steps S605 to S615 above.

This embodiment, which is constituted in this way, affords the same effects as those of the first embodiment. In addition, in this embodiment, the administrator need only supply a secret update instruction to the host 3, whereby user convenience improves. Further, in this embodiment, because a secret update request is issued from the host 3 to the storage 1, there is no need to provide the management server 5 and the constitution can be simplified.

Further, although a case where a secret update request is issued from the host 3 to the storage 1 was mentioned in this embodiment, the constitution may also be such that a secret update request is conversely sent from the storage 1 to the host 3. That is, the administrator is able to issue a secret update request to the storage 1 via the secret update screen B500 and the storage 1 can also be controlled to issue a secret update request to the host 3.

However, the disadvantage of this embodiment is the possibility that someone will intercept and read the new secret because the new secret flows on the SAN 10. As a method of eliminating this disadvantage, a method for opening a secure session as a result of the host 3 and storage 1 using a security technology such as IPsec may be considered.

Fourth Embodiment

The fourth embodiment will now be described based on FIGS. 20 and 21. In this embodiment, when a plurality of paths are configured between the hosts 3 and storage 1, the secrets are updated in order starting with the path with the smallest number of outstanding commands.

Figure 20:
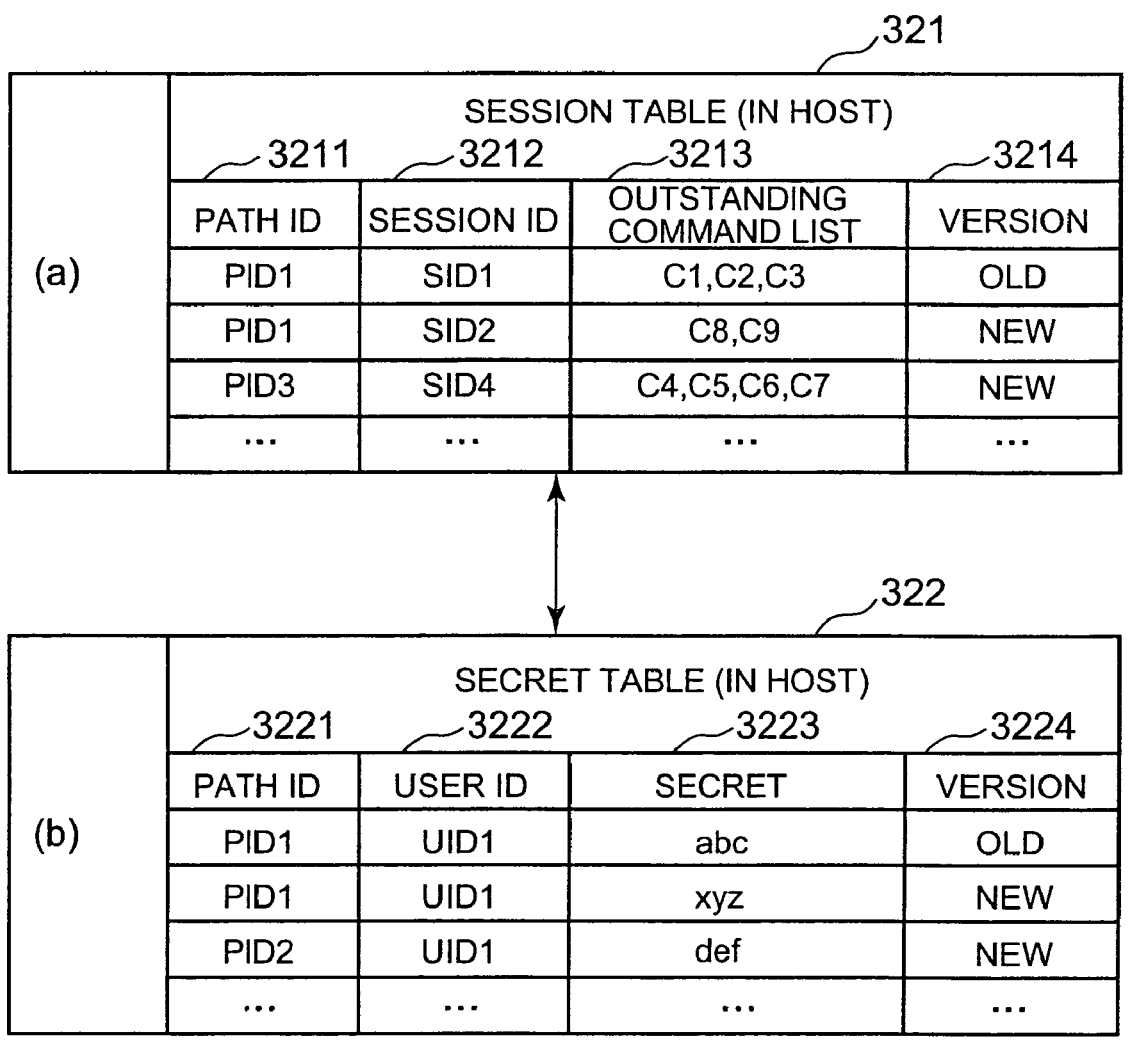
FIG. 20 is an explanatory diagram of a session table (in host) and secret table (in host) that are used in the storage system according to a fourth embodiment.

FIG. 20 is an explanatory diagram of an example of the session tables 321 and 322 that are used by the storage system according to this embodiment. This embodiment is based on the premise that the hosts 3 and storage 1 are connected by a plurality of paths. Hence, a path ID 3211 is managed by session table 321 that is used by the host 3 and, likewise, the path ID 3221 is also managed by the secret table 322.

Figure 21:
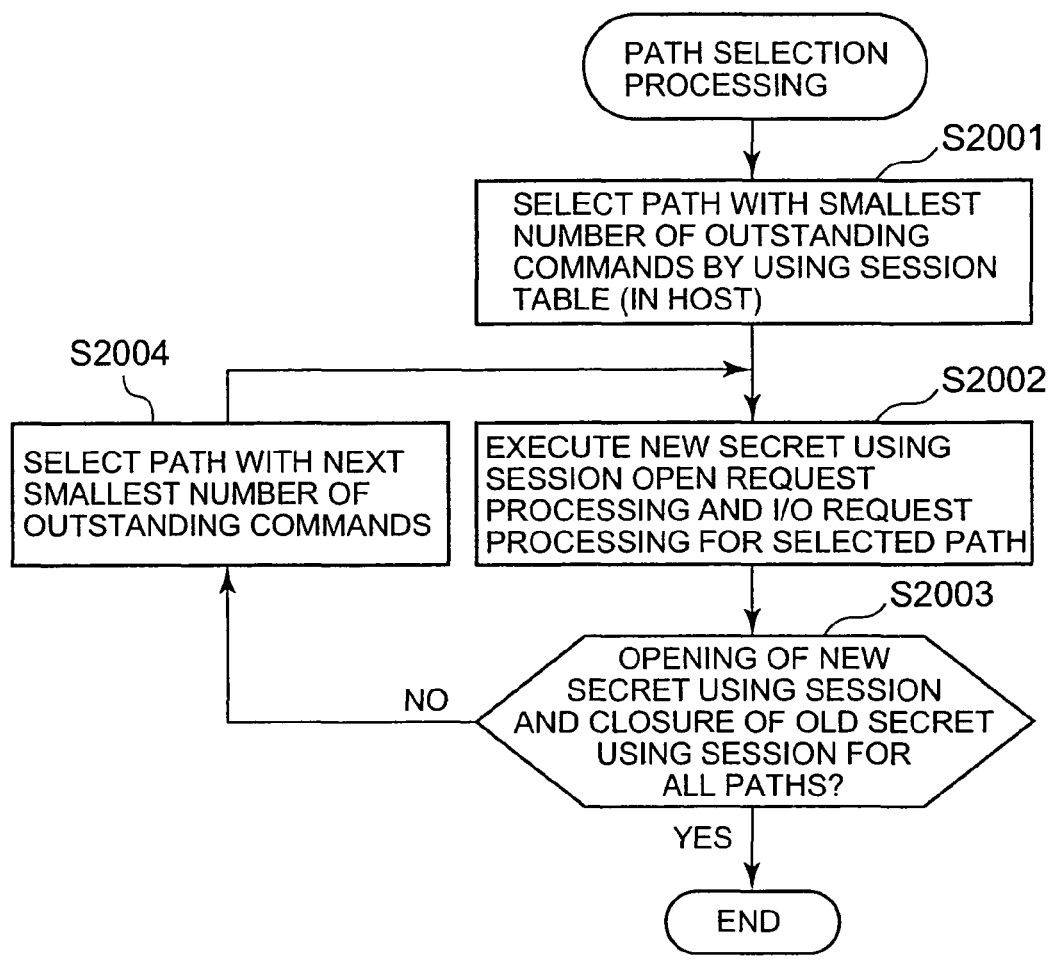
FIG. 21 is a flowchart that shows the path selection processing.

FIG. 21 is a flowchart that shows processing for selecting a path for performing a secret update. This processing is executed by the host 3. First, the host 3 references the session table 321 shown in FIG. 20 and selects one path which has the smallest number of outstanding commands (S2001).

Further, the host 3 executes processing to request that a new secret using session be opened (S605) and I/O request processing (S609) for the path selected in S2001 (S2002).

The host 3 judges whether the update of the secret is complete for all the paths connected to the storage 1 (S2003). When a path whose secret has not been updated exists (S2003:NO), the host 3 selects the path with the next smallest number of outstanding commands (S2004) and repeats S2002 and S2003. Thus, the secrets are updated in order starting with the path with the smallest number of outstanding commands. Further, this processing ends when the secret is updated for all the paths (S2003:YES).

This embodiment, which is constituted in this way, affords the same effects as those of the first embodiment. In addition, in this embodiment, when the hosts 3 and storage 1 are connected by a plurality of paths, a constitution is adopted in which the secrets are updated in order starting with the path with the smallest number of outstanding commands. Hence, in this embodiment, the secret can be updated even when an upper limit is set for the number of sessions that can be opened at the same time.

Fifth Embodiment

The fifth embodiment will now be described based on FIG. 22. In this embodiment, when the host 3 and storage 1 are connected via a plurality of paths, a new secret using session is opened for all the paths and the old secret using sessions are closed in order starting with the old secret using session with no outstanding commands.

Figure 22:
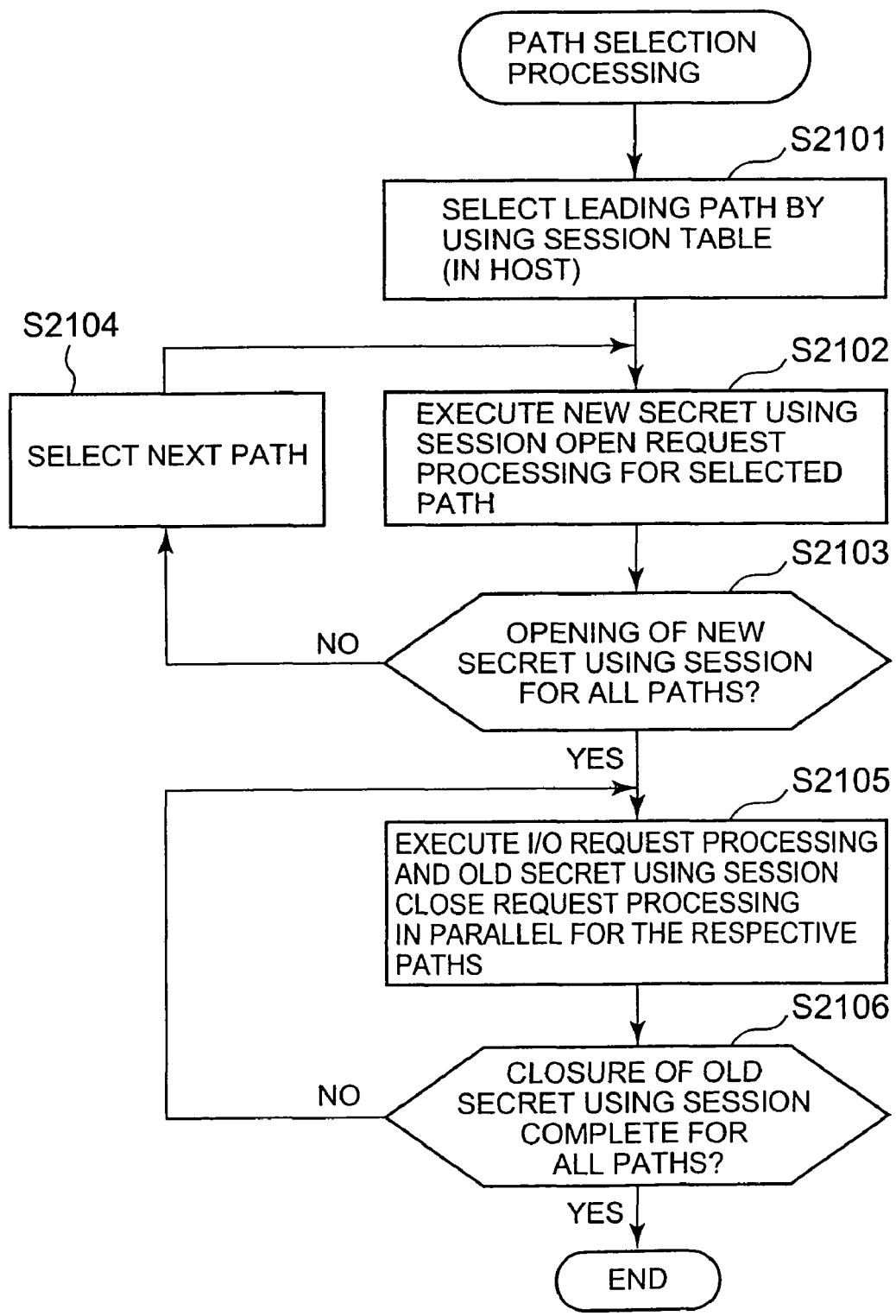
FIG. 22 is a flowchart that shows the path selection processing that is executed by a storage system according to a fifth embodiment.

FIG. 22 is a flowchart that shows path selection processing during a secret update. This processing is executed by the host 3. The host 3 selects one leading path registered in the session table 321 shown in FIG. 20 (S2101). The host 3 executes processing (S605) to request that a new secret using session be opened for the path selected in S2101 (S2102).

The host 3 judges whether a new secret using session has been opened for all the paths (S2103). When paths for which a new secret using session has not been opened remain (S2103: NO), the host 3 selects the next path registered in the session table 321 (S2104) and repeats the steps S2102 and S2103.

When a new secret using session is opened for all the paths (S2013:YES), the host 3 executes the I/O request processing (S609) and old secret using session close request processing (S613) for each of the paths (S2105). That is, the I/O request processing (S609) is executed in parallel for each of the paths and old secret using sessions are closed in order starting with the path for which there are no outstanding commands. S2105 is repeated until the old secret using session is closed for all the paths (S2106). This processing ends when the old secret using session is closed for all the paths (S2106:YES).

This embodiment, which is constituted in this way, affords the same results as those of the first embodiment. In addition, in this embodiment, when the hosts 3 and storage 1 are connected by means of a plurality of paths, the old secret close processing is executed in parallel via the respective paths after a new secret using session has been opened for all the paths. Hence, the time required to update the secret for all the paths can be shortened and user convenience improves.

Sixth Embodiment

The sixth embodiment will now be described on the basis of FIGS. 23 and 24. In this embodiment, when a plurality of hosts 3 share the same volume (in the case of a cluster constitution), an old secret is maintained until the secret has been updated by all the hosts 3 sharing the volume.

Figure 23:
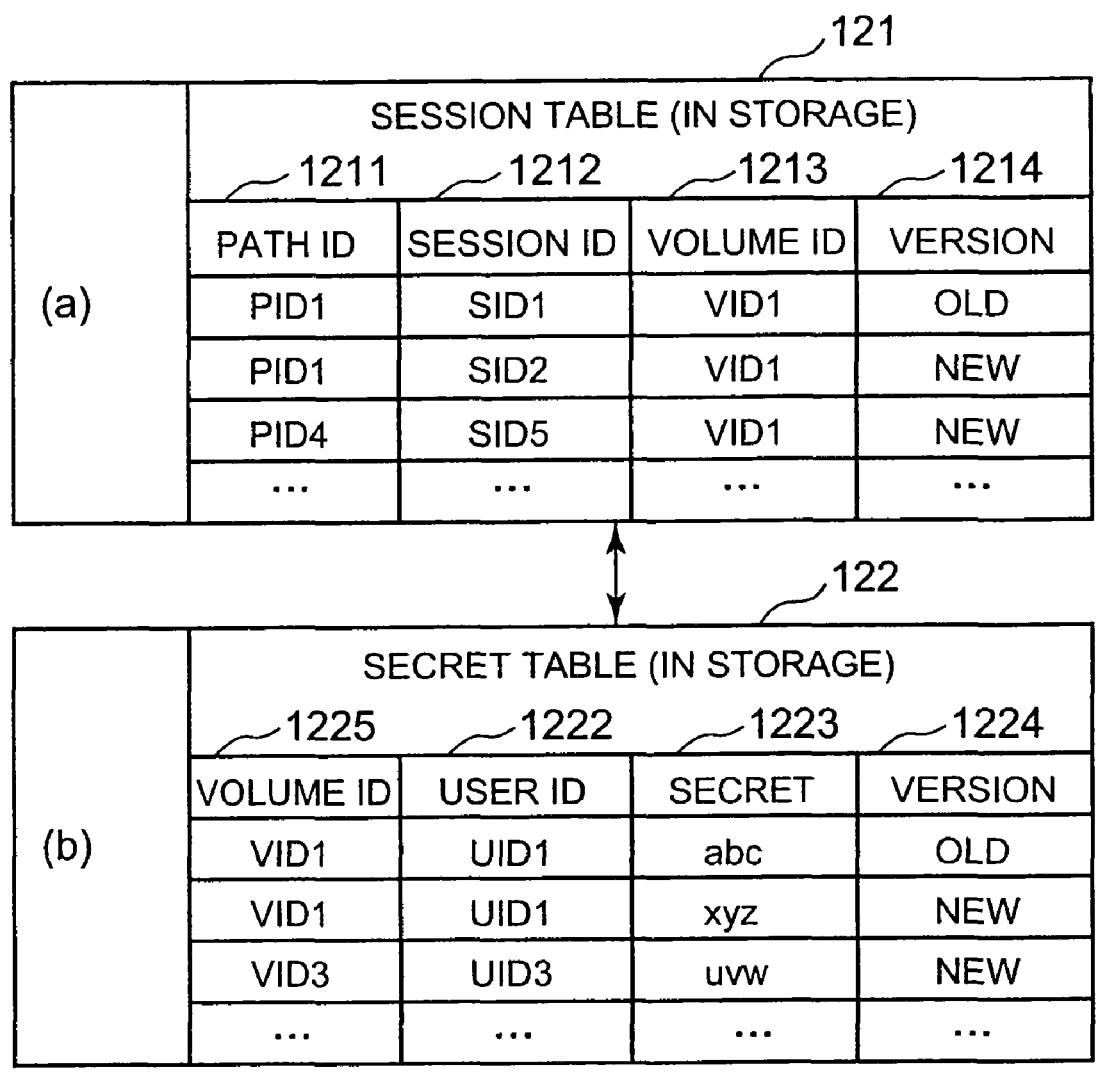
FIG. 23 is an explanatory diagram of a session table (in storage) and secret table (in storage) that are used by a storage system according to a sixth embodiment.

FIG. 23 is an explanatory diagram of the session table 121 and secret table 122 that are used by the storage system of this embodiment. Each of these tables 121 and 122 are stored in the storage 1.

A volume ID 1225 is added to the secret table 122 of this embodiment. As shown in the session table 121 of FIG. 23, in this embodiment, a plurality of paths (PID1, PID4) are configured in one volume (VID1), for example.

Figure 24:
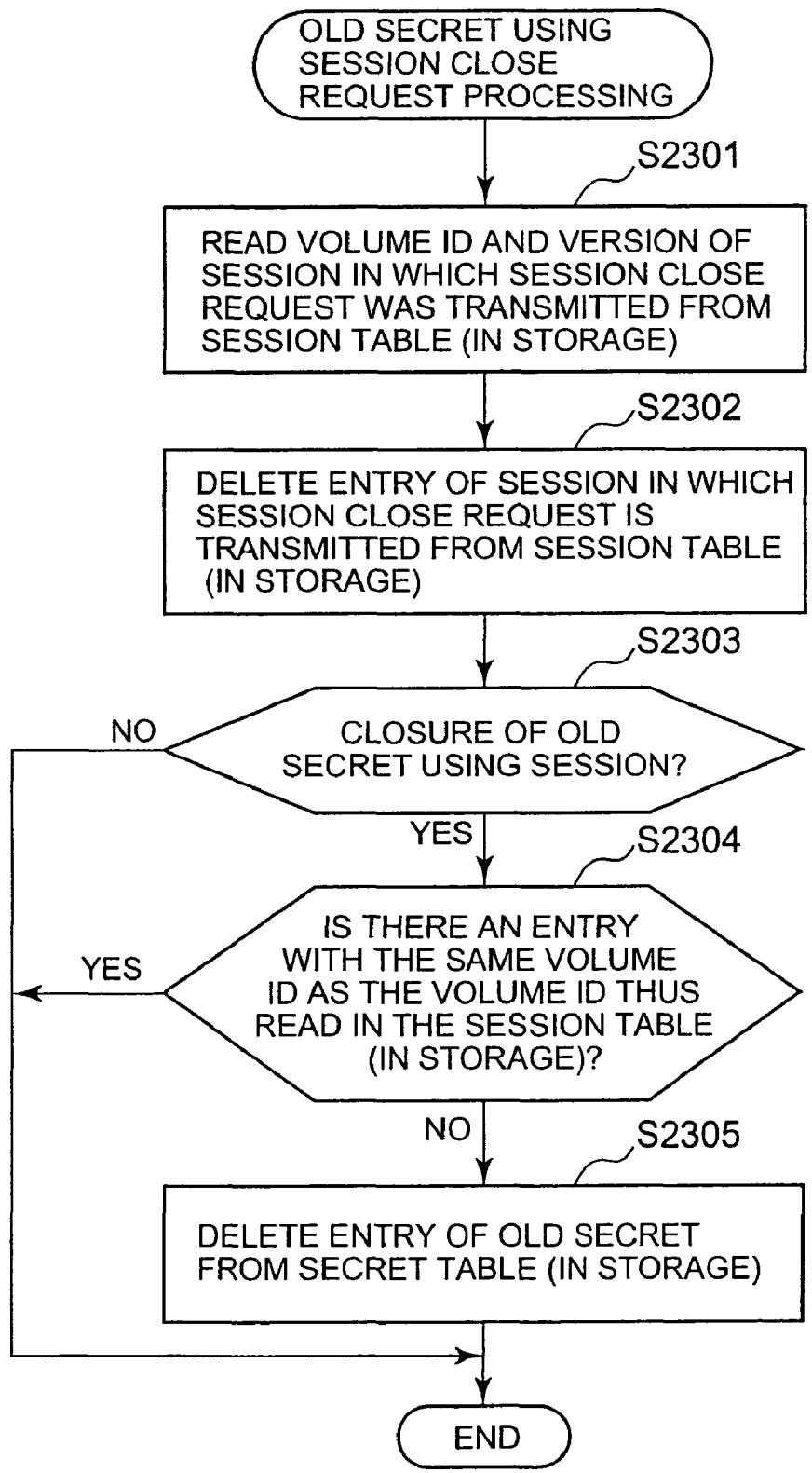
FIG. 24 is a flowchart that shows processing to close the old secret using session.

FIG. 24 is a flowchart that shows processing for closing an old secret using session and sending a response to the effect that this session has been closed to the host 3. This processing is executed by the storage 1.

Upon receipt of the session closing request from the host 3, the storage 1 reads the volume ID and version related to the session close request from the session table 121 shown in FIG. 23 (S2301).

The storage 1 deletes entries of the session whose closure has been requested from the session table 121 (S2302). As a result, the session instructed by the host 3 is closed.

The storage 1 judges whether the session closed in S2302 is an old secret using session on the basis of the version acquired in S2301 (S2303). When an old secret using session is not closed (S2303:NO), that is, when a new secret using session is closed, there is no need to update the secret table 122 and, hence, this processing ends.

When the session closed in S2302 is an old secret using session (S2303:YES), the storage 1 references the session table 121 and judges whether another entry associated with the same volume ID as the volume ID acquired in S2301 exists (S2304). That is, the storage 1 checks whether another host 3 that shares the same volume exists.

When another host 3 that shares the same volume exists (S2304: YES), the storage 1 ends this processing without updating the secret table 122. On the other hand, when another host 3 that shares the same volume does not exist (S2304:NO), the storage 1 deletes the entries of the old secret from the secret table 122 shown in FIG. 23 (S2305).

This embodiment, which is constituted in this way, affords the same results as those of the first embodiment. In addition, in this embodiment, a consistent secret update can be performed even when the hosts 3 constitute a cluster.

Seventh Embodiment

The seventh embodiment will now be described on the basis of FIGS. 25 to 29. In this embodiment, in a case where a first storage 1 uses the storage area of another storage 6, the secret between the first storage 1 and the other storage 6 is also updated in the event of a secret update between the host 3 and the first storage 1.

Figure 25:
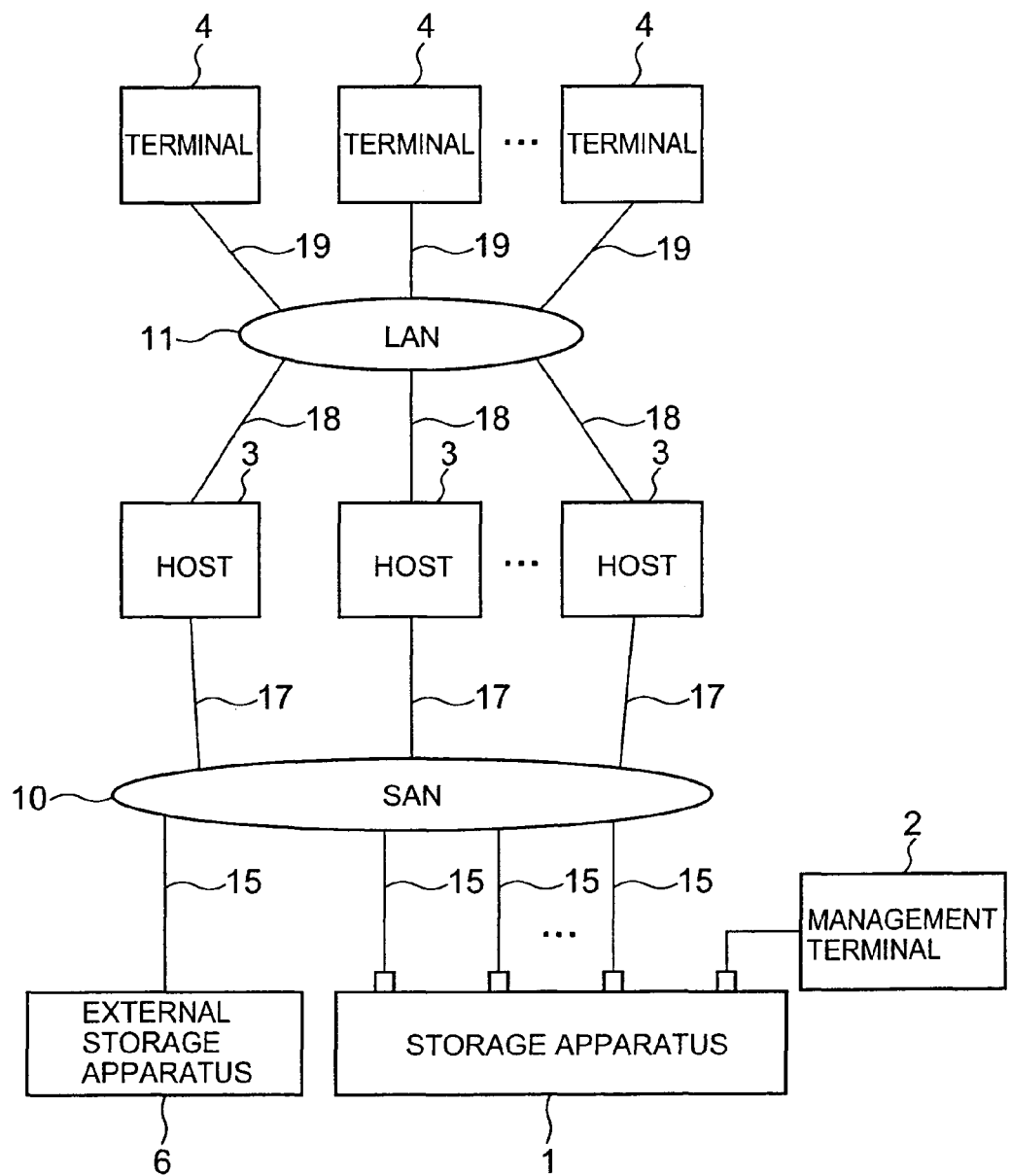
FIG. 25 is an explanatory diagram showing the overall constitution of a storage system according to a seventh embodiment.

FIG. 25 is an explanatory diagram showing the overall constitution of the storage system according to this embodiment. In the storage system of this embodiment, an external storage apparatus ('external storage' hereinbelow) 6 is added.

The external storage 6 is storage that exists outside the storage 1. The storage 1 and external storage 6 are connected so that same are capable of bi-directional communication via the SAN 10. The storage 1 introduces the storage area (volume) of the external storage 6 to the interior of the storage 1 and the storage area of the external storage 6 is seen by the host 3 as if the storage area exists in the storage 1.

For example, by providing a virtual volume inside the storage 1 and allocating the address space of the volume in the external storage 6 to the address space of the virtual volume, the volume of the external storage 6 can be used as if same were a real volume within the storage 1.

Although the virtual volume is the target accessed by the host 3, data is actually stored in the volume (real volume) in the external storage 6. Supposing that the host 3 accesses the virtual volume, the storage 1 converts the command received from the host 3 into a command that is to be transmitted to the external storage 6. The storage 1 reads and writes data from and to the volume of the external storage 6 and sends back the results of the reading/writing to the host 3.

The storage 1 can also be called the connection-source storage or the main storage and the external storage 6 can also be called the connection-destination storage or sub-storage.

Figure 26:
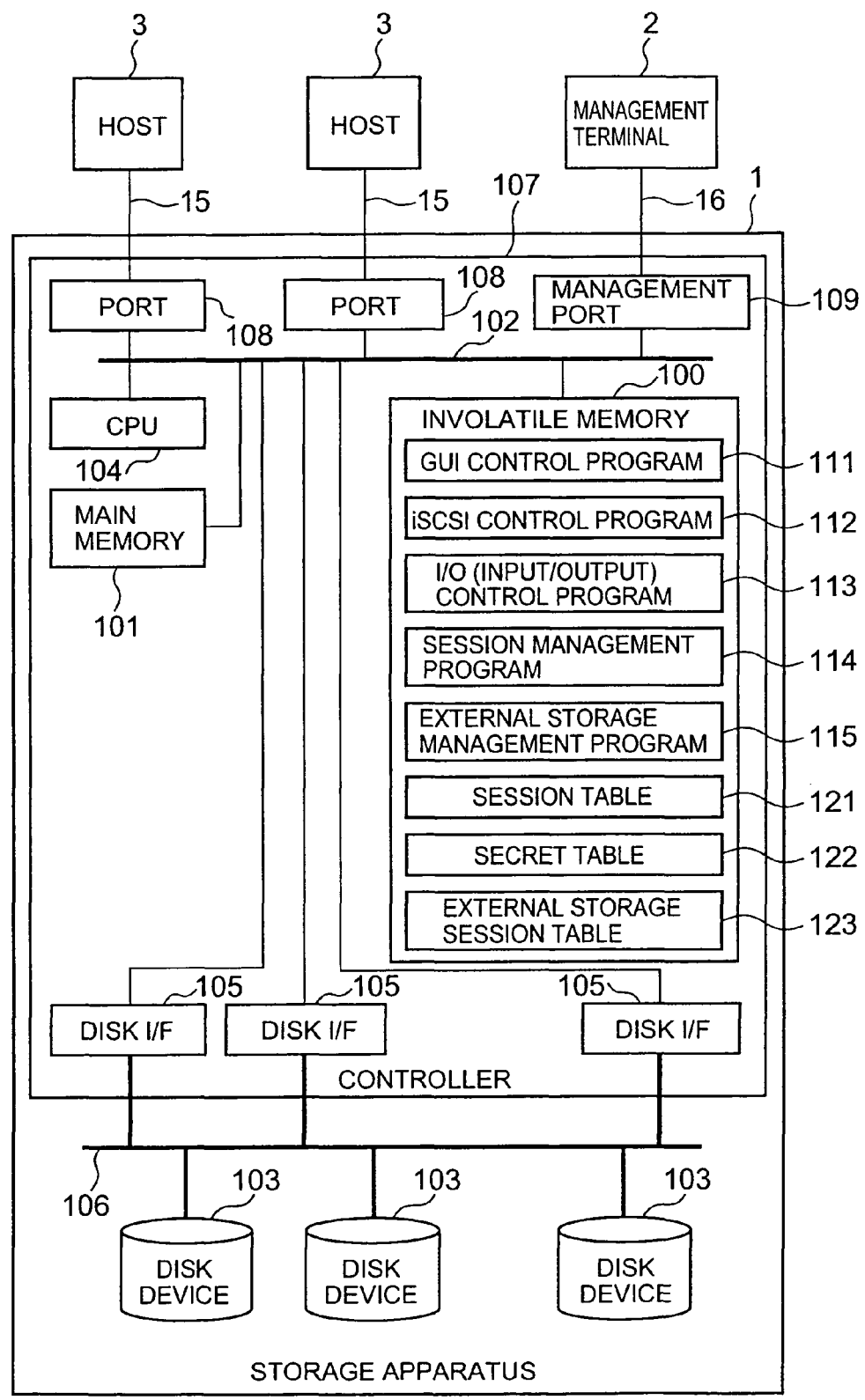
FIG. 26 is an explanatory diagram of the constitution of the storage apparatus.

FIG. 26 is an explanatory diagram of the constitution of the storage 1. In comparison with the constitutional view shown in FIG. 3, in this embodiment, an external storage management program 115 and external storage session table 123 are added.

The external storage management program 115 is a program that is to be used for using the volume in the external storage 6 by introducing this volume to the storage 1. The external storage management program 115 converts an access request from the host 3 (read command or write command) into an access request for access by the storage 1 to the external storage 6, as mentioned earlier.

FIG. 27 is an explanatory diagram of an example of the external storage session table 123. The external storage session table 123 associates and manages the path ID 1231, external path ID 1232, external session ID 1233, and version 1234, for example.

The path ID 1231 is information serving to identify the path between the hosts 3 and storage 1. The external path ID 1232 is information serving to identify the path between the storage 1 and the external storage 6 (external connection path). The external session ID 1233 is information serving to identify a session that is provided in the external path that connects the storage 1 and external storage 6.

Figure 28:
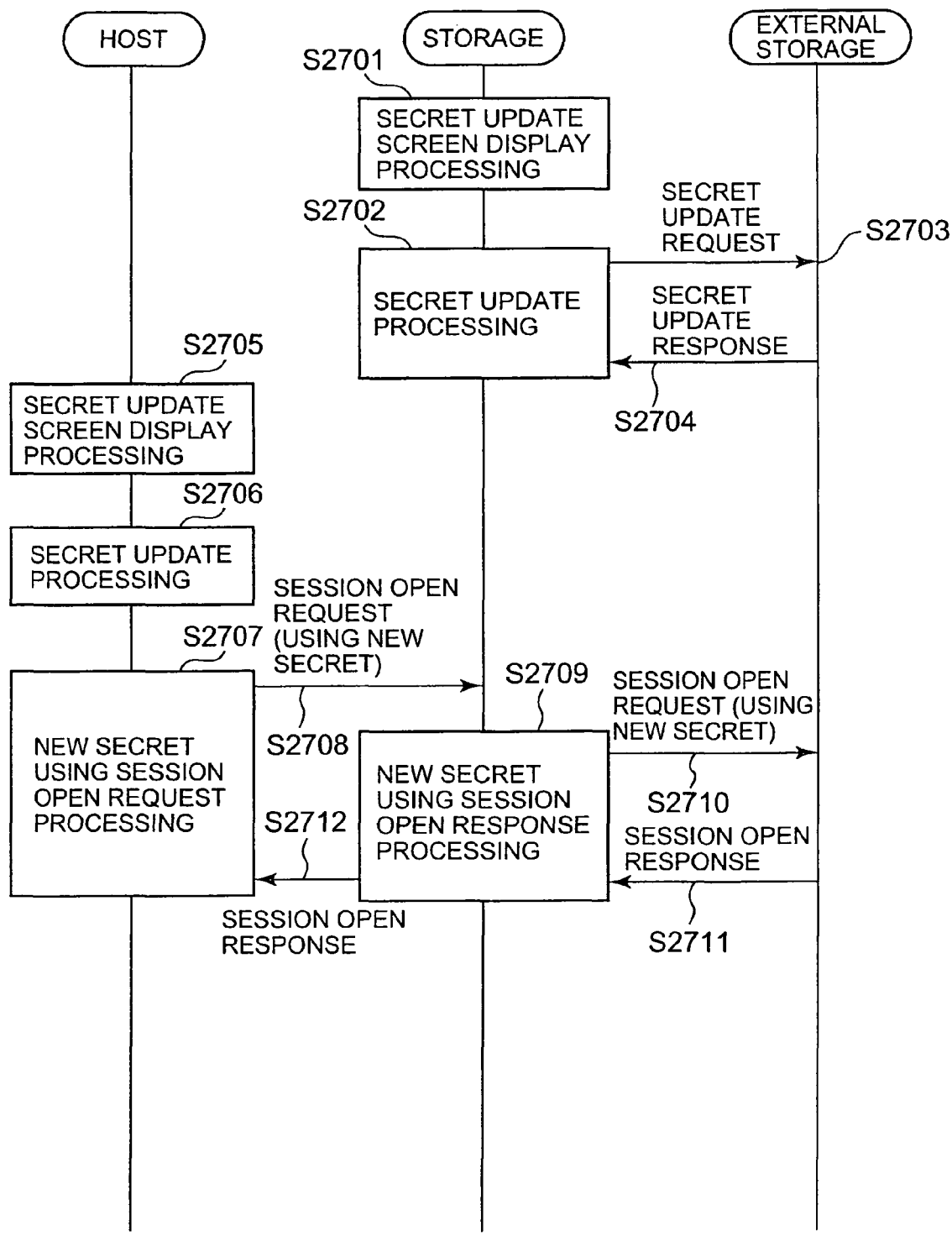
FIG. 28 is a flowchart that shows the overall operation when a secret is updated.
Figure 29:
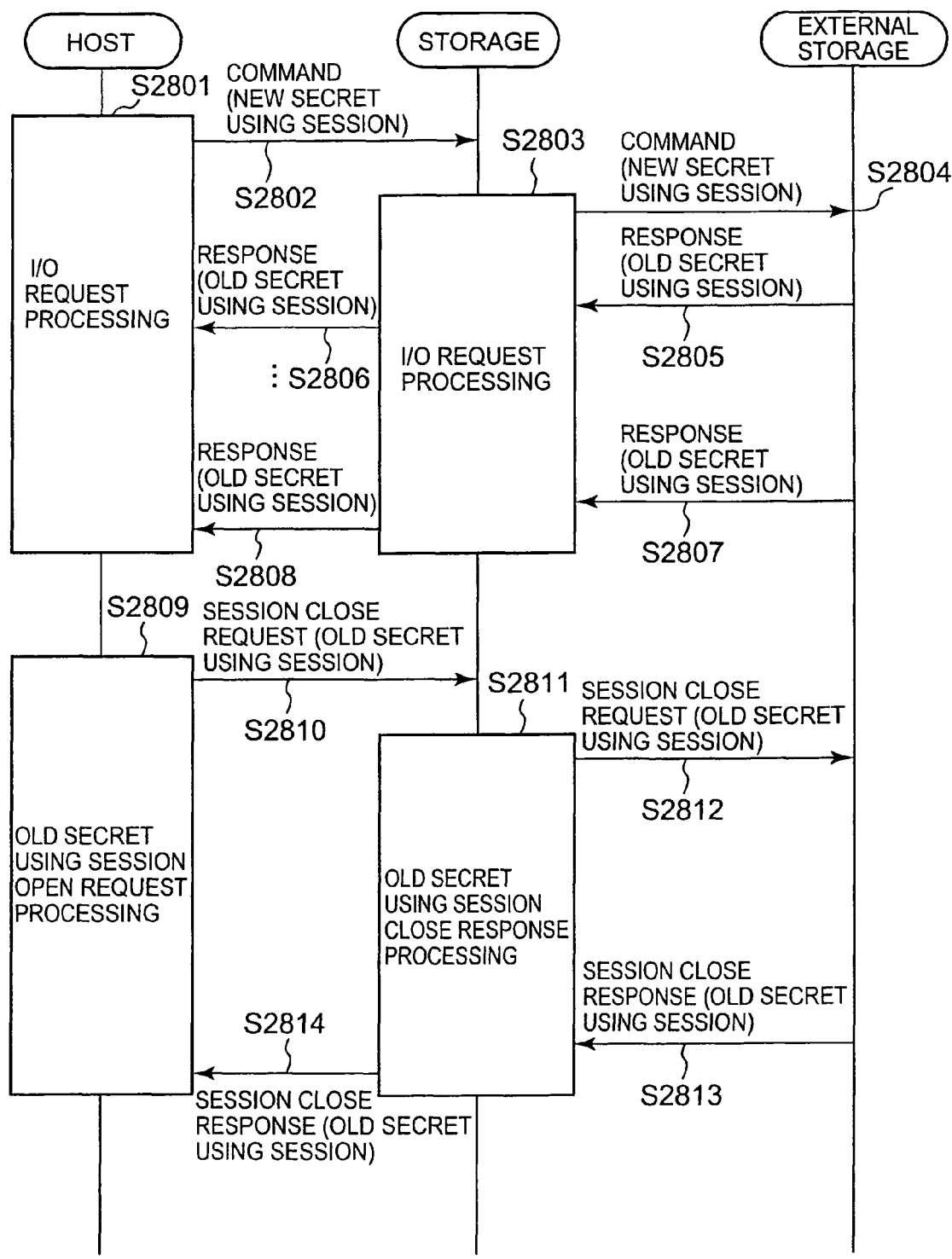
FIG. 29 is a flowchart that follows on from FIG. 28.

FIGS. 28 and 29 are flowcharts that show the overall operation in a case where a secret is updated in the storage system according to this embodiment. The storage 1 executes processing to display the secret update screen B500 on the basis of an instruction from the administrator (S2701) and execute secret update processing (S2702). The storage 1 adds anew secret to the secret table 122 and issues a request to update the secret to the external storage 6 (S2703).

The external storage 6 comprises the same session table and secret table as the storage 1. The external storage 6 adds a new secret to the secret table in the external storage 6 in accordance with a request from the storage 1. The external storage 6 sends a response to the effect that the secret in the external storage 6 has been updated to the storage 1 (S2704). Further, instead of the storage 1 transmitting a secret update request, the secret of the external storage 6 may be updated before S2701 as a result of the administrator using secret update means (GUI and CLI or the like) of the external storage 6.

On the other hand, the host 3 executes processing to display the secret update screen B520 on the basis of an instruction from the administrator (S2705) and then executes processing to add the entry of the new secret to the secret table 322 (S2706).

Further, as described in the first embodiment, the host 3 starts processing to issue a request that a new secret using session be opened to the storage 1 (S2707). When the host 3 issues a request to open a new secret using session to the storage 1 (S2708), the storage 1 executes processing to open a new secret using session (S2709). The storage 1 then issues a request to open a new secret using session to the external storage 6 (S2710). Further, when the external storage 6 has a restriction to open only one session with one initiator, the storage 1 may open the new secret using session by using the iSCSI name of a different initiator from that used when the old secret using session was opened.

When a response to the effect that a new secret using session has been opened is received from the external storage 6 (S2711), the storage 1 transmits a response to the effect that a new secret using session has been opened to the host 3 (S2712).

FIG. 29 is a flowchart that follows on from FIG. 28. As mentioned in the first embodiment, the host 3 starts I/O request processing (S2801). The host 3 transmits a new command that is issued after a new secret using session is opened to the storage 1 by using the new secret using session (S2802).

The storage 1 starts I/O request processing (S2803). The storage 1 converts the command received from the host 3 into a command that is to be transmitted to the external storage 6 and transmits the converted command to the external storage 6 (S2804). When a new command is received from the host 3, the storage 1 converts the new command and transmits same to the external storage 6 via the new secret using session (S2804).

On the other hand, the external storage 6 transmits the results of processing the command received from the storage 1 to the storage 1 (S2805, S2807). The command transmitted from the storage 1 (old command) is transmitted from the external storage 6 to the storage 1 via the old secret using session before the new secret using session is opened between the storage 1 and external storage 6.

Likewise, upon receiving a response from the external storage 6, the storage 1 converts the response into a response that is to be transmitted to the host 3 and transmits the converted response to the host 3 via the old secret using session (S2806, S2808).

When it is confirmed that all the old command processing is complete, the host 3 executes old secret using session close request processing (S2809). Upon receiving a request to close the old secret using session from the host 3 (S2810), the storage 1 executes processing for closing the old secret using session and so forth (S2811).

The storage 1 issues a request to close the old secret using session to the external storage 6 (S2812). The external storage 6 closes the old secret using session in accordance with the close request from the storage 1.

When a response to the effect that the old secret using session has been closed is received from the external storage 6 (S2813), the storage 1 transmits a response to the effect that the old secret using session is closed to the host 3 (S2814).

This embodiment, which is constituted in this way, affords the same effects as those of the first embodiment. In addition, in this embodiment, when the storage 1 uses the external storage 6, a secret update between the storage 1 and external storage 6 can be performed in sync with the secret update between the host 3 and storage 1. Therefore, even when the storage 1 uses the external storage 6, the secret can be updated in a state where the sessions between the host 3 and storage 1 and between the storage 1 and external storage 6 are maintained as is, whereby availability and security can be combined.

Eighth Embodiment

The eighth embodiment will now be described on the basis of FIGS. 30 to 36. In this embodiment, the storage system is provided with an authentication server 7 and authentication during a secret update is executed by the authentication server 7.

Figure 30:
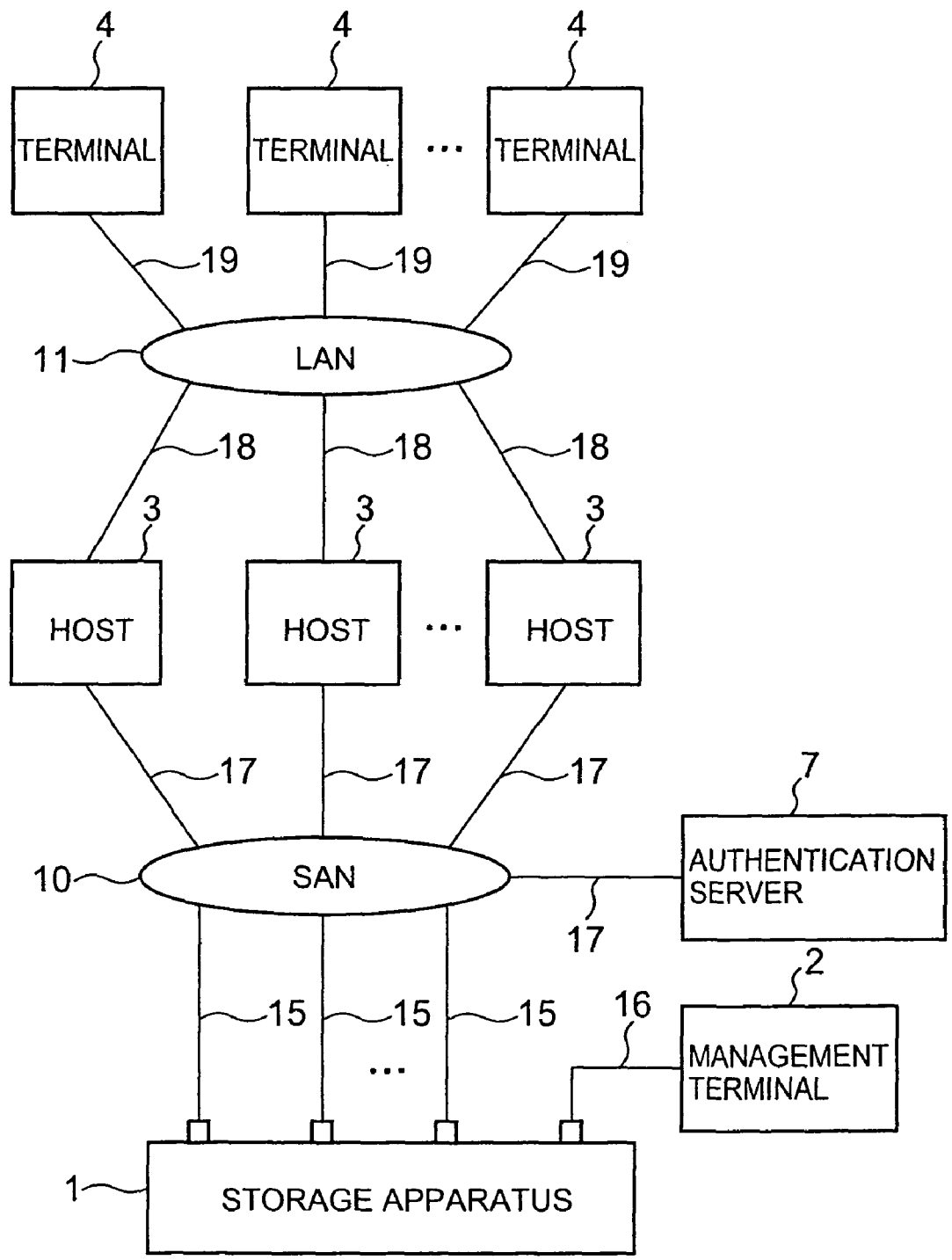
FIG. 30 is an explanatory diagram of the overall constitution of a storage system according to an eighth embodiment.

FIG. 30 is an explanatory diagram showing the overall constitution of the storage system according to this embodiment. The storage system comprises the authentication server 7 in addition to the constitution mentioned in the first embodiment. The authentication server 7 is a computer apparatus for providing authentication of whether a secret (new secret) during a secret update is accurate. The authentication server 7 is connected to the SAN 10 via the communication line 17 and the authentication server 7 and the respective hosts 3 and storage 1 are connected so as to be capable of bi-directional communication via the SAN 10. Further, when the management network 12 shown in FIG. 14 exists in the storage system, the authentication server 7 may be connected via a communication line 16 to the management network 12.

Figure 31:
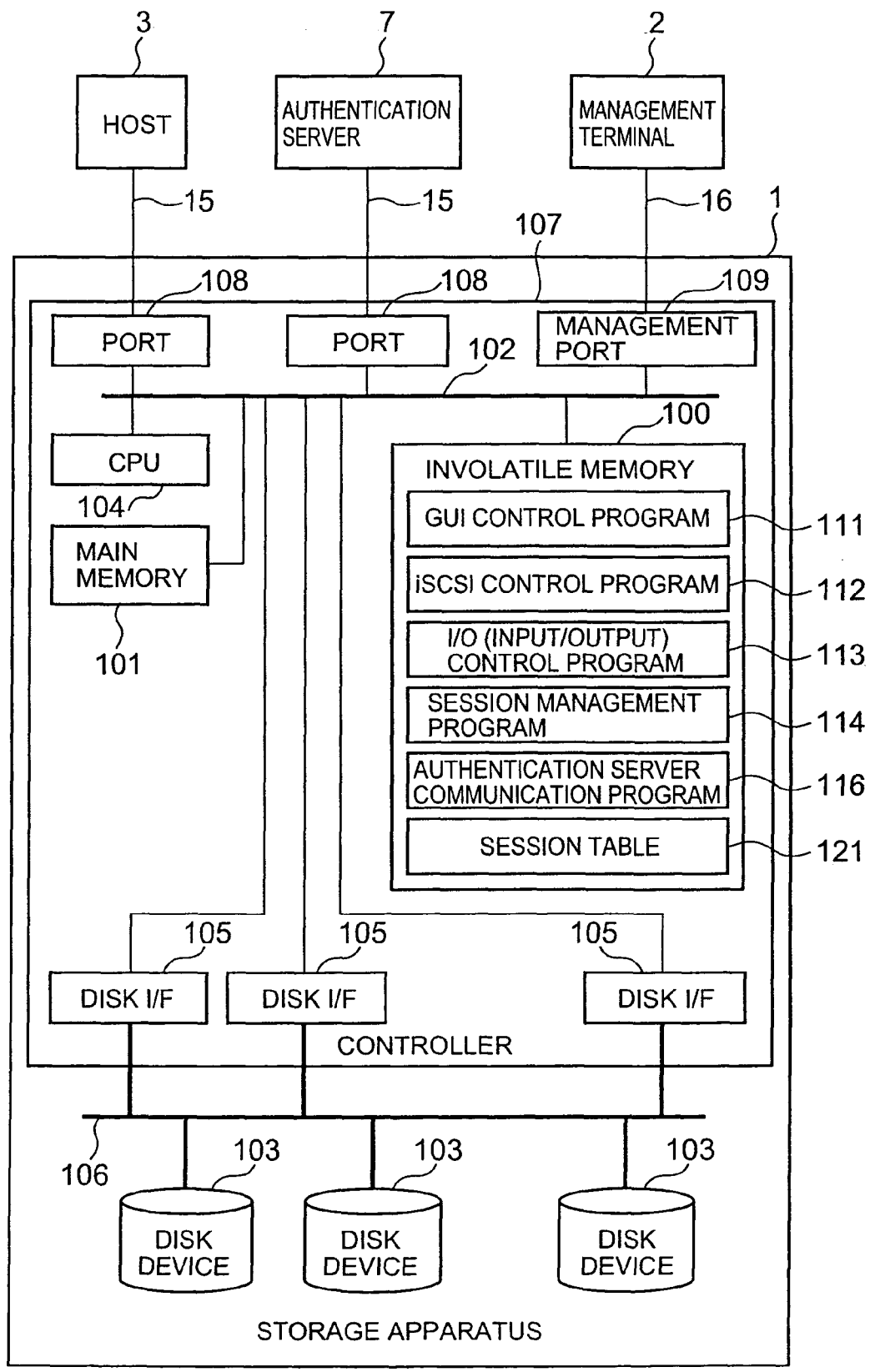
FIG. 31 is an explanatory diagram of the constitution of the storage apparatus.

FIG. 31 is an explanatory diagram showing the constitution of the storage 1 according to this embodiment. In comparison with the storage 1 of the first embodiment shown in FIG. 3, the storage 1 of this embodiment comprises an authentication server communication program 116. Further, in this embodiment, because the authentication server 7 performs secret management, the secret table 122 has been removed from the storage 1.

Figures 32, 33:
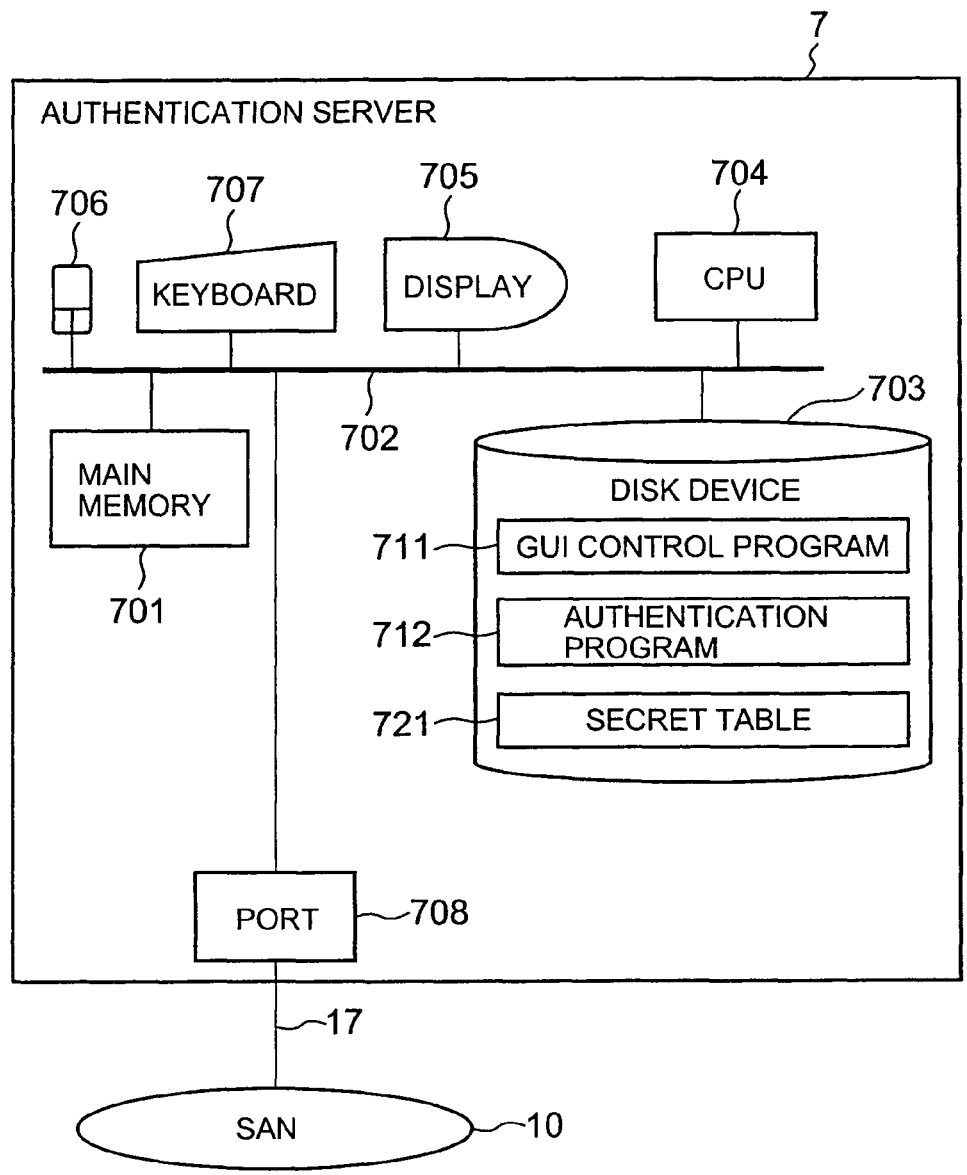
FIG. 32 is an explanatory diagram of the constitution of the authentication server.
FIG. 33 is an explanatory diagram of a secret table.

FIG. 32 is an explanatory diagram showing the constitution of the authentication server 7. The authentication server 7 is constituted comprising, a main memory 701, a bus 702, a disk device 703, a CPU 704, a display device 705, a pointing device 706, a keyboard switch 707, and a port 708, for example. The main memory 701, disk device 703, the CPU 704, and the port 708 and so forth are mutually connected via the bus 702.

The respective programs 711, 712 stored in the disk device 703 are transferred to the main memory 701 if necessary. The CPU 704 implements a GUI control function and an authentication function by executing programs that are read to the main memory 701.

The disk device 703 is able to store a GUI control program 711, an authentication program 712, and a secret table 721, for example.

The GUI control program 711 controls the secret update screen displayed on the display device 705. Further, the GUI control program 711 transmits information input by the administrator via the pointing device 706 or keyboard switch 707 to the authentication program 712.

The authentication program 712 is a program that judges whether the queried secret is an accurate secret and outputs the judgment result.

FIG. 33 is an explanatory diagram of the constitution of the secret table 721. The secret table 721 associates and manages a user ID 7211 and secret 7212, for example.

Figure 34:
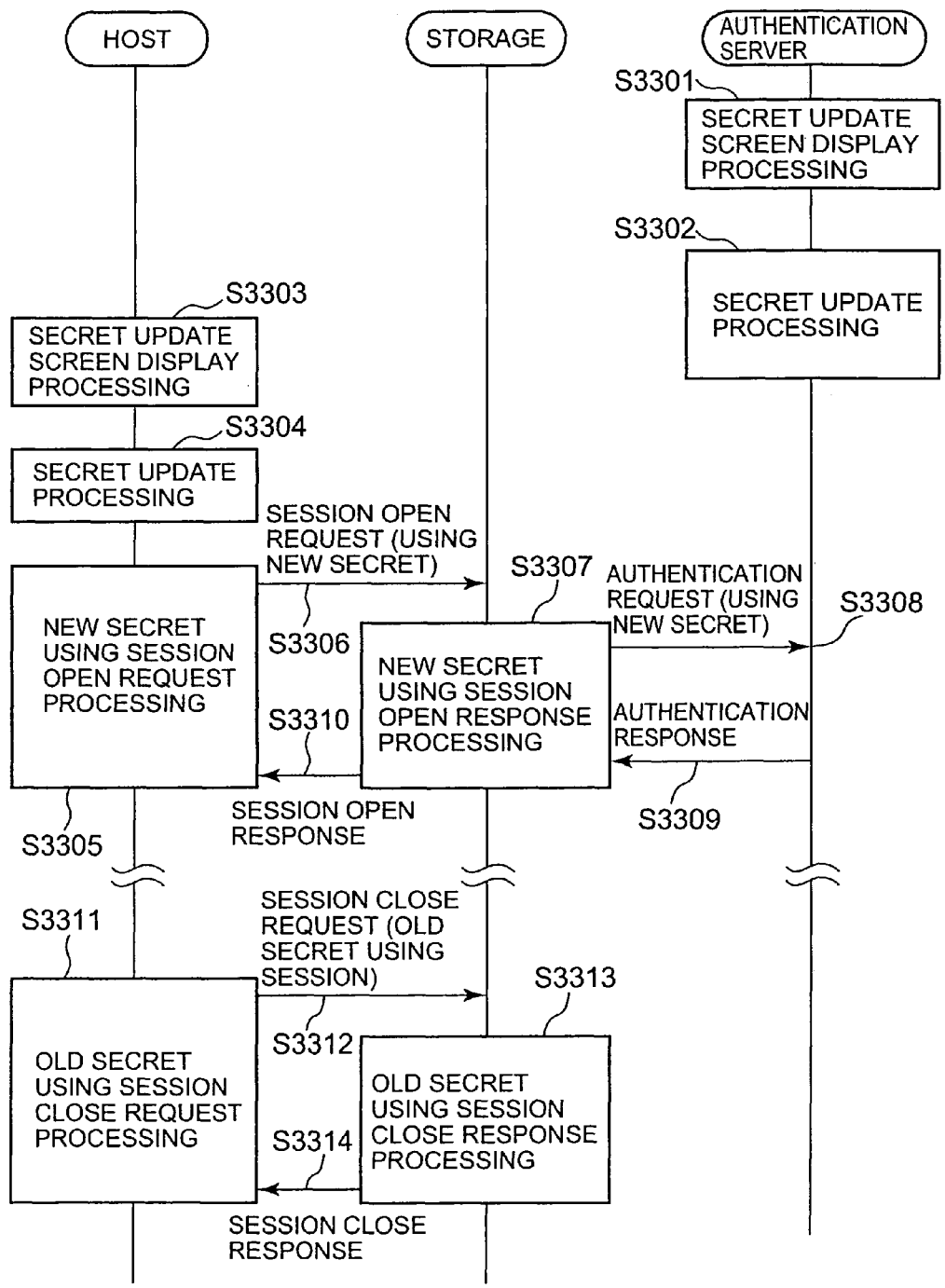
FIG. 34 is a flowchart that shows the overall operation when a secret is updated.

FIG. 34 is a flowchart that shows the overall operation when the secret is updated. The authentication server 7 executes processing to display the secret update screen on the basis of an instruction from the administrator (S3301). The secret update screen can be constituted as per the secret update screen B520 shown in FIG. 6B, for example.

When the administrator inputs information required for the secret update (new secret and so forth) to the authentication server 7, the authentication server 7 executes secret update processing (S3302). In the secret update processing, the authentication server 7 adds entries related to the new secret to the secret table 721.

The administrator issues an instruction to update the secret to the host 3 after registering the new secret in the authentication server 7. When an instruction to update the secret is input by the administrator, the host 3 supplies a secret update screen B520 to the administrator (S3303) and, as mentioned in the first embodiment above, executes secret update processing (S3304).

The host 3 executes processing to request that a new secret using session be opened (S3305). Upon receiving the request to open a new secret using session from the host 3 (S3306), the storage 1 executes processing to open a new secret using session and so forth (S3307). The details of the S3307 will be provided in conjunction with FIG. 35.

The storage 1 issues a request to the authentication server 7 to authenticate the new secret reported by the host 3 (S3308). The authentication server 7 checks whether the new secret received from the storage 1 has been registered in the secret table 721. When the new secret received from the storage 1 has been registered in the secret table 721, authentication is successful. When the new secret received from the storage 1 has not been registered in the secret table 721, authentication fails.

Upon receipt of a response regarding the success of authentication from the authentication server 7 (S3309), the storage 1 opens a new secret using session and reports the fact that the new secret using session has been opened to the host 3 (S3310).

Thereafter, the host 3 executes I/O request processing as mentioned in the first embodiment (not illustrated). Further, when all the old command processing is complete, the host 3 executes processing to request that an old secret using session be closed (S3311).

Upon receipt of the request to close the old secret using session from the host 3 (S3312), the storage 1 closes the old secret using session and executes processing to issue a response to the effect that this session is closed (S3313).

S3313 will be described in detail in FIG. 36. The storage 1 then issues a response to the host 3 regarding the completion of the closure of the old secret using session (S3314).

Figure 35:
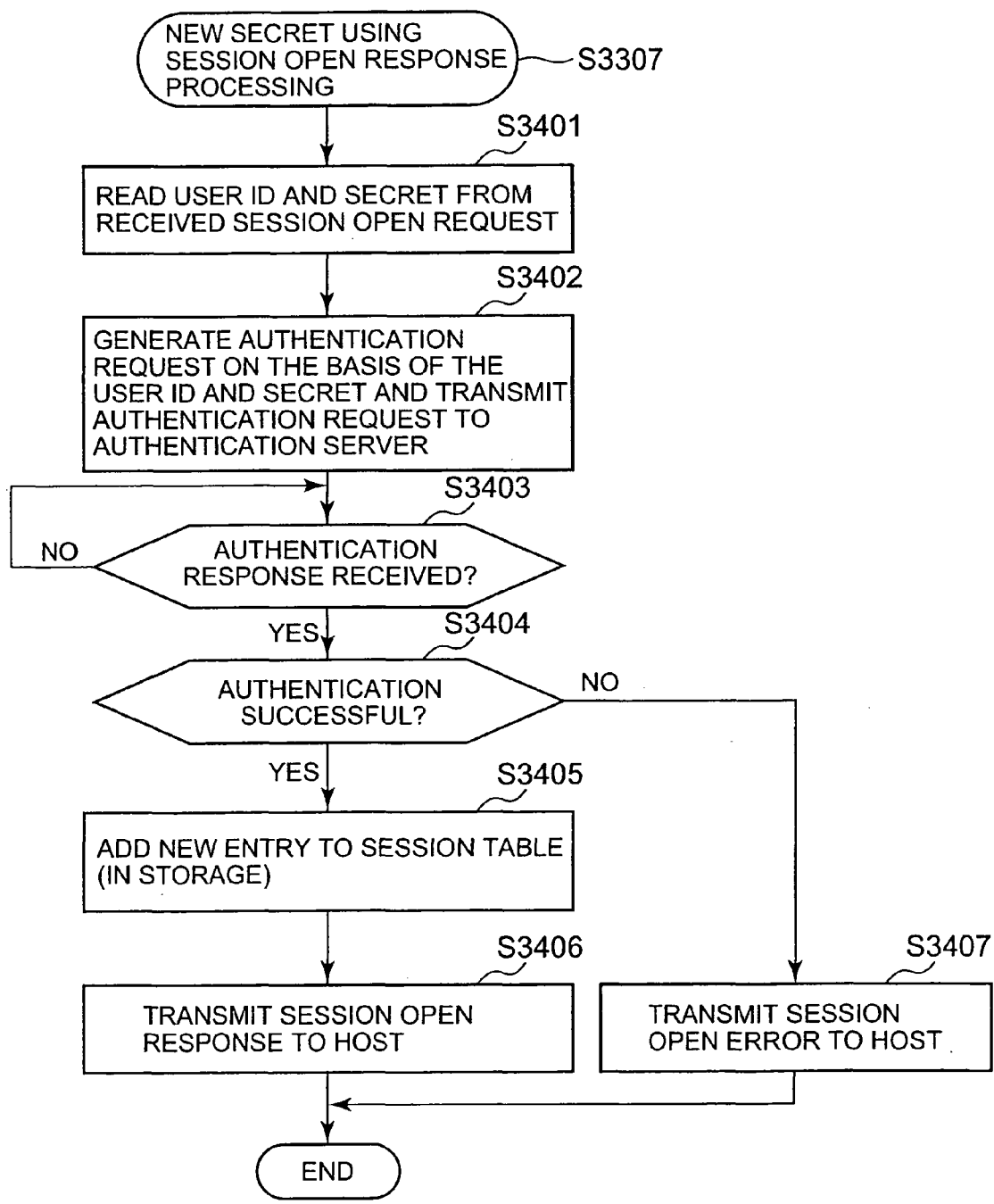
FIG. 35 is a flowchart that shows processing to open a new secret using session.

FIG. 35 is a flowchart that shows the details of the processing S3307 to open a new secret using session and so forth. The storage 1 obtains a user ID and secret (new secret) from the request to open the session received from the host 3 (S3401).

The storage 1 generates an authentication request on the basis of the user ID and secret obtained in S3401 and transmits the authentication request thus generated to the authentication server 7 (S3402). The storage 1 waits for an authentication response from the authentication server 7 (S3403).

When an authentication response is received from the authentication server 7 (S3403:YES), the storage 1 judges whether authentication has been successful (S3404). When authentication has been successful (S3404:YES), the storage 1 adds an new entry for a new secret using session to the session table 121 (S3405). The storage 1 then reports the fact that the new secret using session has been opened to the host 3 (S3406).

On the other hand, when authentication has failed (S3404: NO), because the secret reported by the host 3 in S3306 is an erroneous secret, the storage 1 transmits an error response to the host 3 without opening the session (S3407).

Figure 36:
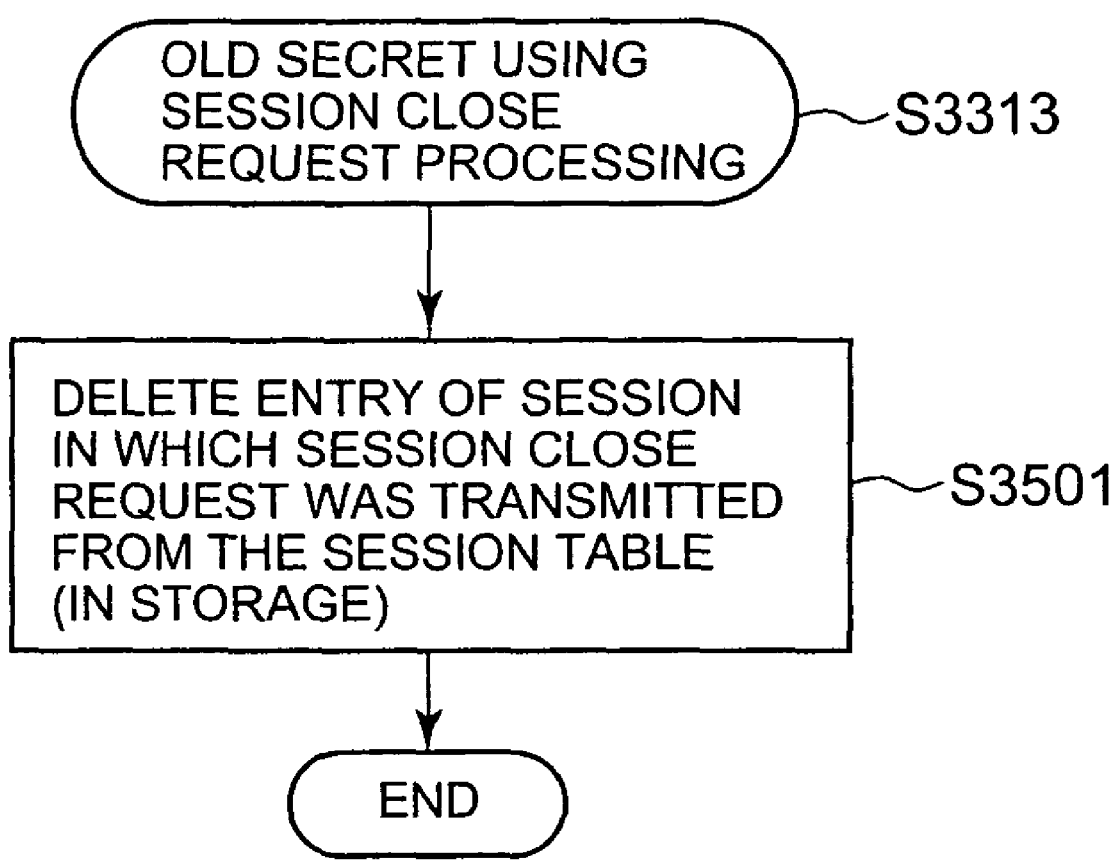
FIG. 36 is a flowchart that shows processing to close the old secret using session.

FIG. 36 is a flowchart that shows the content of the processing S3313 for closing the old secret using session and so forth. The storage 1 deletes the entries of the session for which closure has been requested by the host 3 from the session table 121 (S3501).

This embodiment, which is constituted in this way, affords the same effects as those of the first embodiment. In addition, because this embodiment is constituted such that the authentication server 7 for centrally managing the secret in the storage system is provided, there is no need to manage a secret in the storage 1. Therefore, in a storage system comprising a plurality of storages, a secret can be updated more simply.

Ninth Embodiment

The ninth embodiment will now be described on the basis of FIGS. 37 to 42. In this embodiment, a new secret using session is configured after confirming that all the processing of the outstanding old commands is complete.

Figure 37:
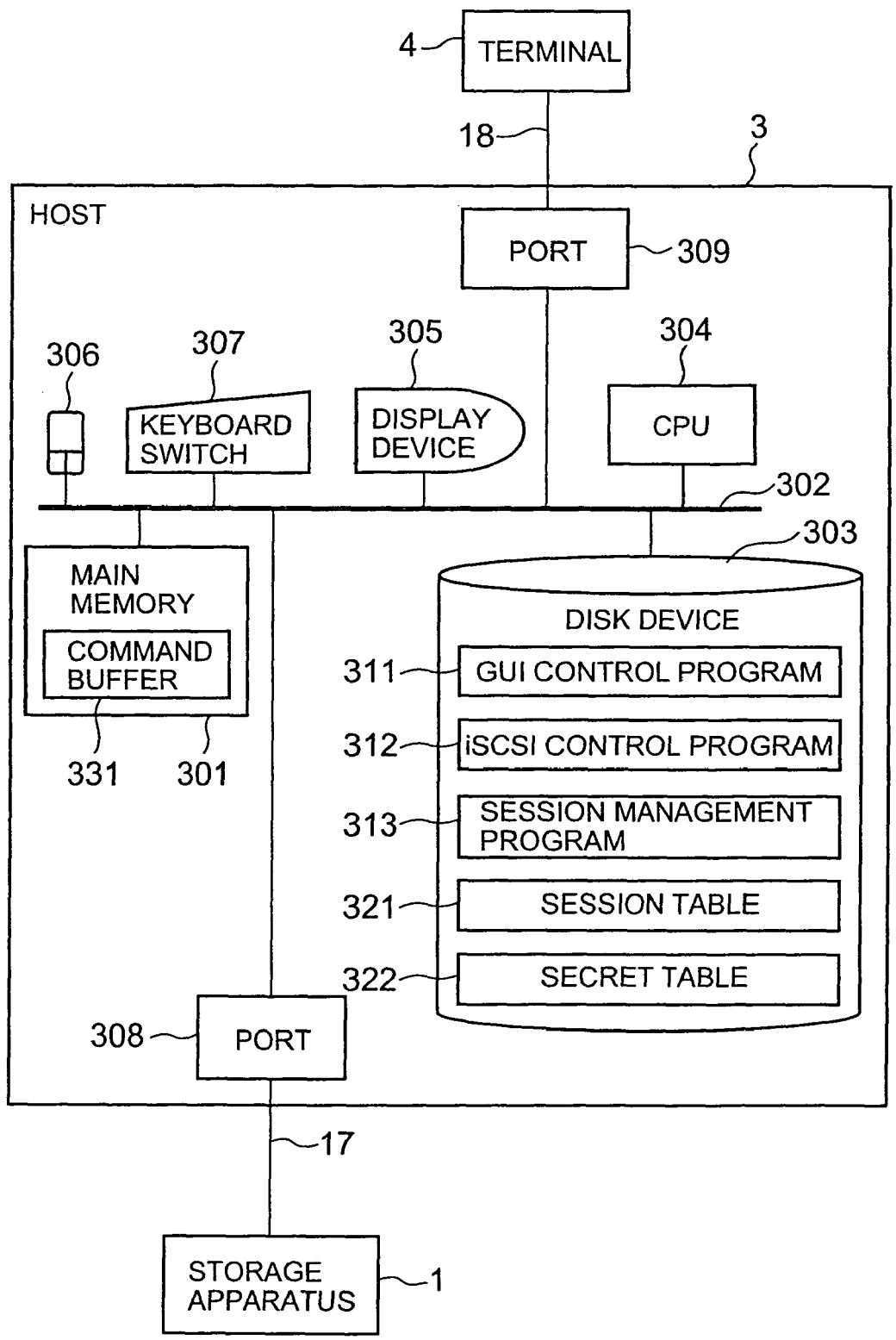
FIG. 37 is an explanatory diagram of the constitution of the host of a storage system according to a ninth embodiment.

FIG. 37 is an explanatory diagram of the constitution of the host 3 according to this embodiment. The host 3 comprises a command buffer 331 in the main memory 301. The command buffer 331 is a storage area for temporarily suspending a new command issued following the execution of the secret update processing, as will be described subsequently.

Figure 38:
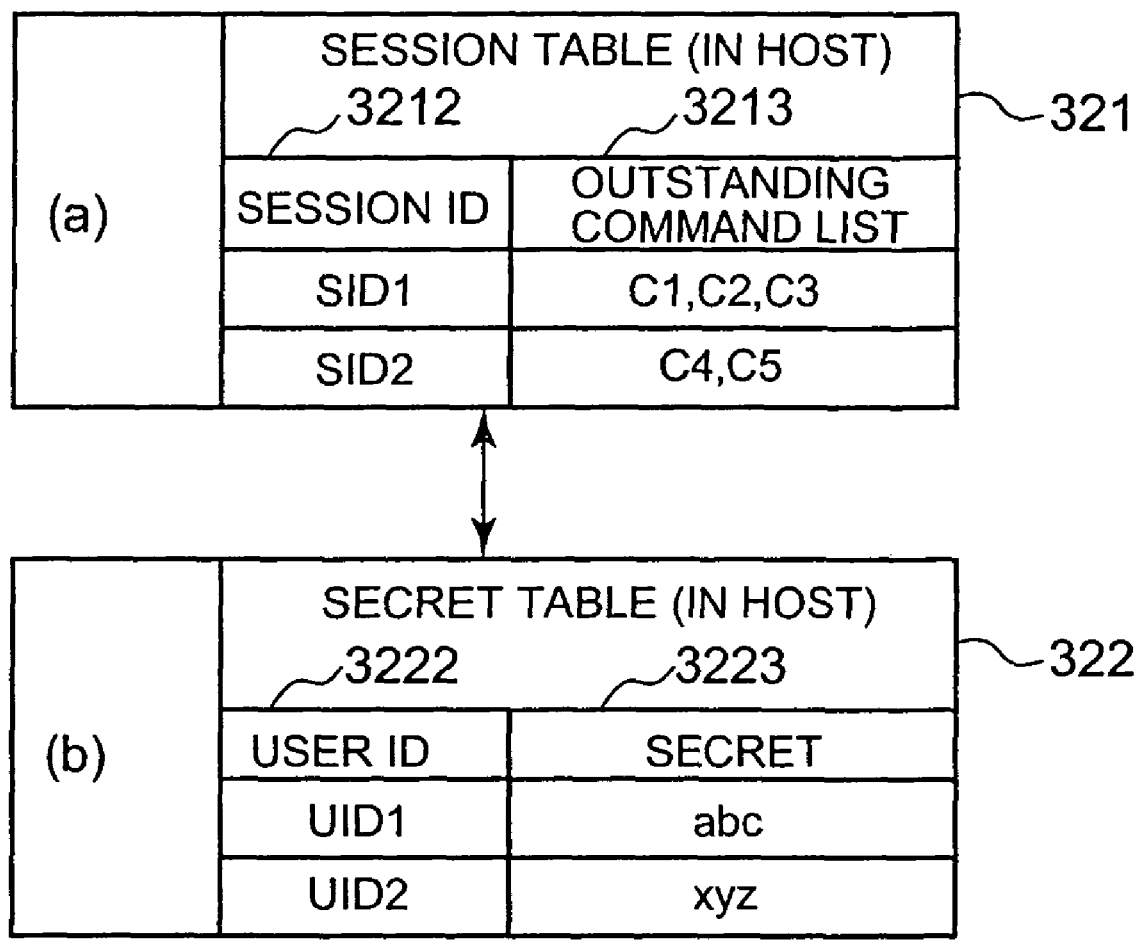
FIG. 38 is an explanatory diagram of a session table (in host) and secret table (in host)

FIG. 38 is an explanatory diagram of the session table 321 and secret table 322 used by the host 3 according to this embodiment. Unlike the session table and secret table described in the first embodiment, the session table 321 and secret table 322 of this embodiment do not manage versions 3214 and 3224.

Figure 39:
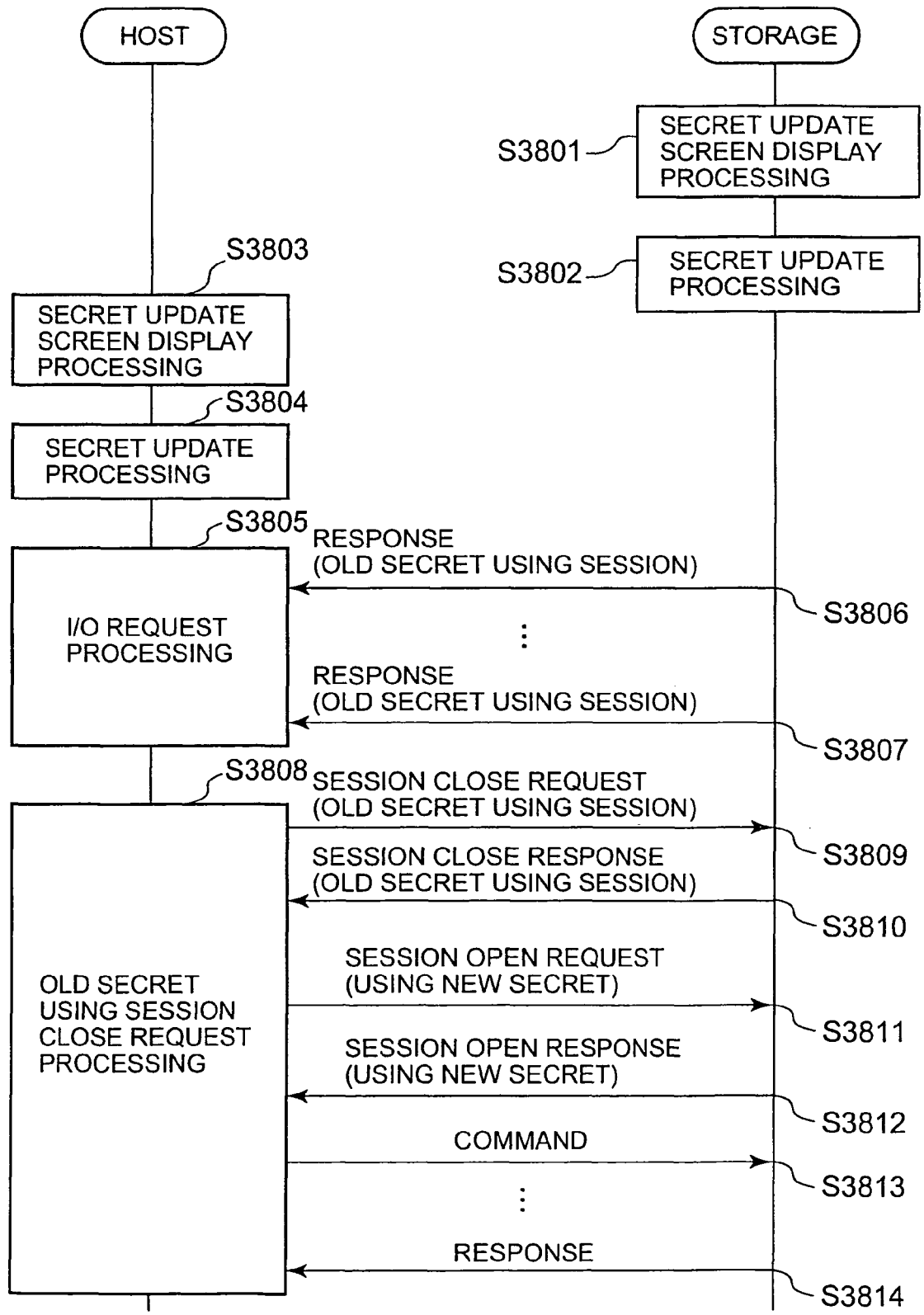
FIG. 39 is a flowchart that shows the overall operation when a secret is updated.

FIG. 39 is a flowchart that shows the overall operation when a secret is updated. The storage 1 executes processing for displaying the secret update screen B500 in accordance with an instruction from the administrator (S3801). Further, the storage 1 adds a new secret input by the administrator to the secret table 122 (S3802).

The host 3 displays the secret update screen B520 in accordance with the instruction from the administrator (S3803) and executes processing to update the secret on the basis of the new secret input by the administrator (S3804).

Figure 40:
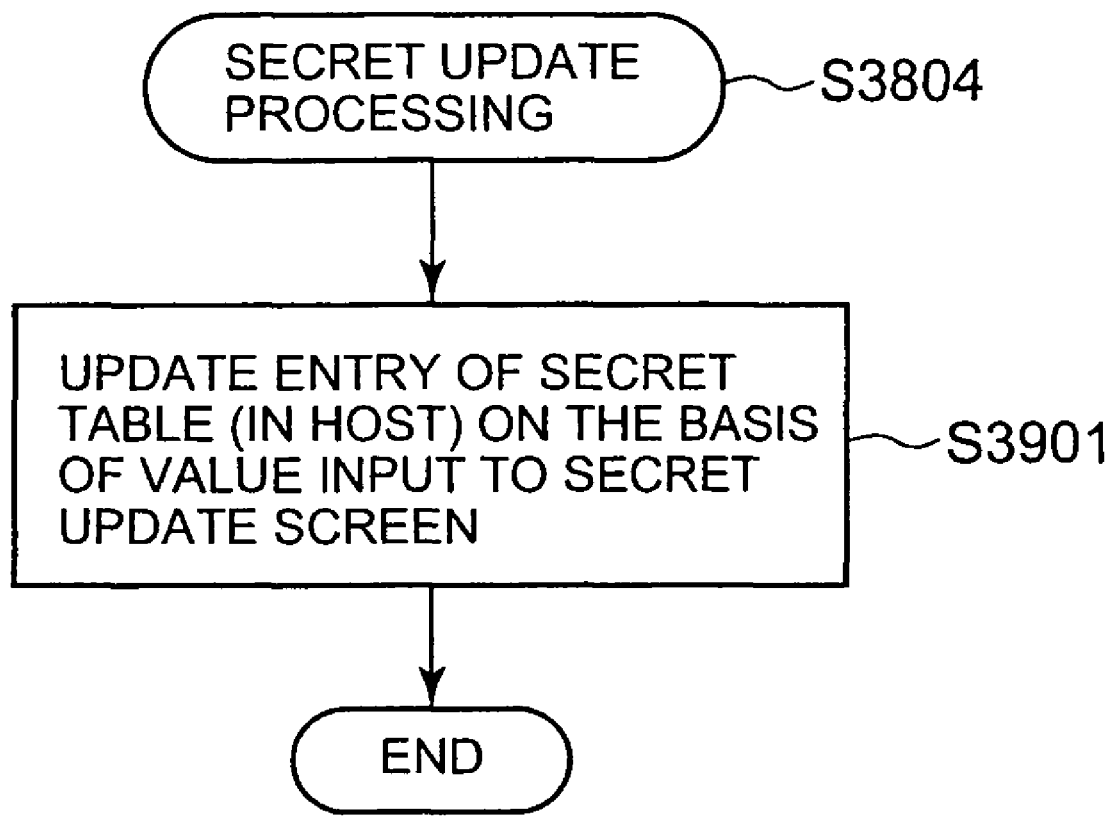
FIG. 40 is a flowchart that shows secret update processing.
Figure 41:
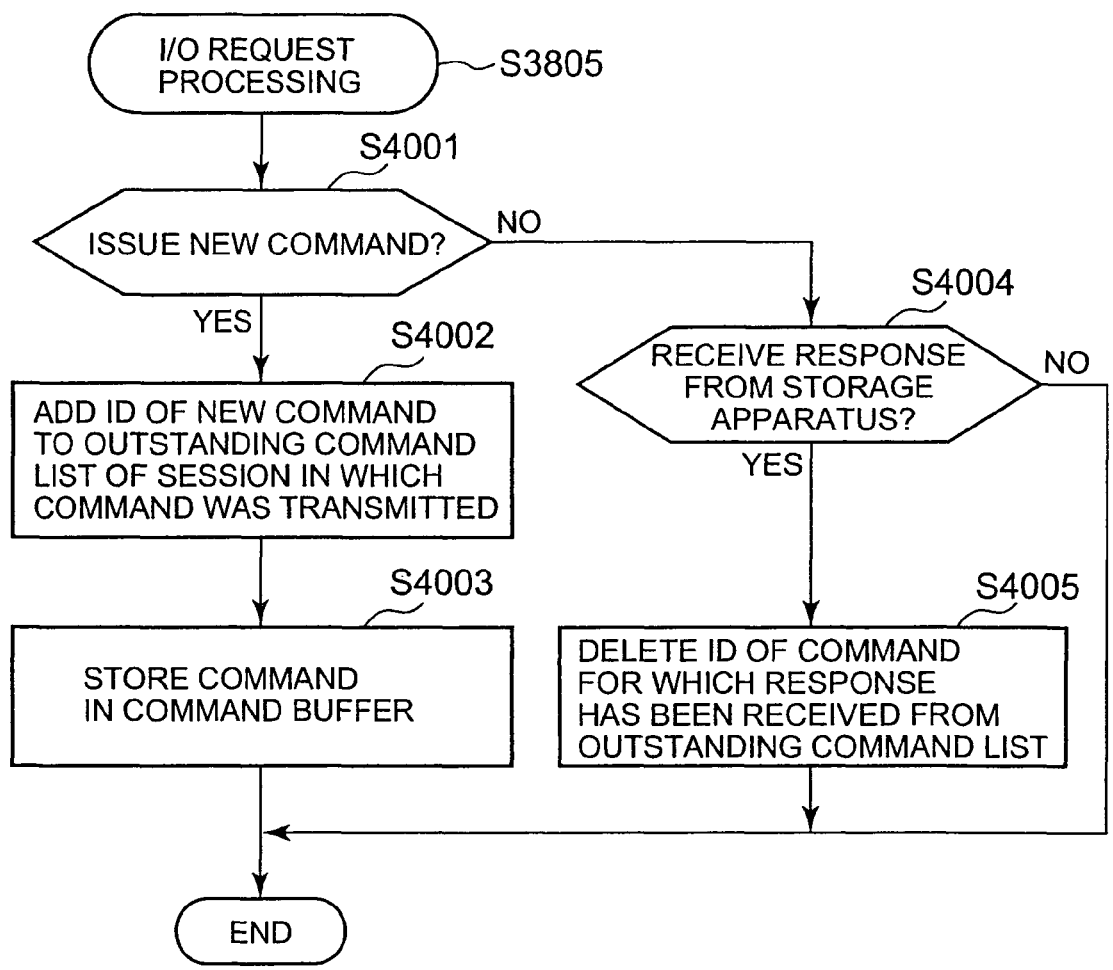
FIG. 41 is a flowchart that shows I/O request processing.

Please see FIG. 40. In the secret update processing S3804, the entries of the secret table 322 shown in FIG. 38 are updated on the basis of the value input to the secret update screen B520 by the administrator (S3901). That is, at this point, the old secret is overwritten with the new secret.

Please see FIG. 39. The host 3 executes I/O request processing (S3805). The details of the I/O request processing will be described with reference to FIG. 41. The host 3 judges whether to issue a new command (S4001). When a new command is issued (S4001:YES), the command ID of the new command is added to the outstanding command list 3213 of the session for which the new command is to be transmitted (which is a new secret using session. However, a new secret using session has not been opened at this point) (S4002). Further, the host 3 stores the new command in the command buffer 331 (S4003). That is, the new command is not transmitted to the storage 1 and is placed in a temporarily suspended state.

When a new command is not issued (S4001:NO), the host 3 judges whether a response from the storage 1 has been received (S4004). When a response from the storage 1 is received (S4004:YES), the host 3 deletes the command ID of the command for which a response has been received from the outstanding command list 3213 (S4005).

Please return now to FIG. 39. As mentioned earlier, in the I/O request processing (S3805), the issue of a new command is temporarily suspended and standby ensues until all old-command related responses are received (S3806, S3807).

Upon receiving all the old-command responses, the host 3 executes processing in order to request closure of the old secret using session (S3808). The host 3 issues a request to the storage 1 to close the old secret using session (S3809). The storage 1 closes the old secret using session in accordance with the close request from the host 3 and reports the fact that this session is closed to the host 3 (S3810).

Upon confirming closure of the old secret using session, the host 3 issues a request to the storage 1 to open a new secret using session (S3811). The storage 1 opens the new secret using session in accordance with the request to open the session from the host 3 and issues a response to the effect that the session has been opened to the host 3 (S3812).

When the new secret using session has been opened, the host 3 reads the new commands stored in the command buffer 331 in order and transmits the new commands to the storage 1 via the new secret using session (S3813). Upon completing the processing of the new commands, the storage 1 sends back a response to the host 3 (S3814).

Figure 42:
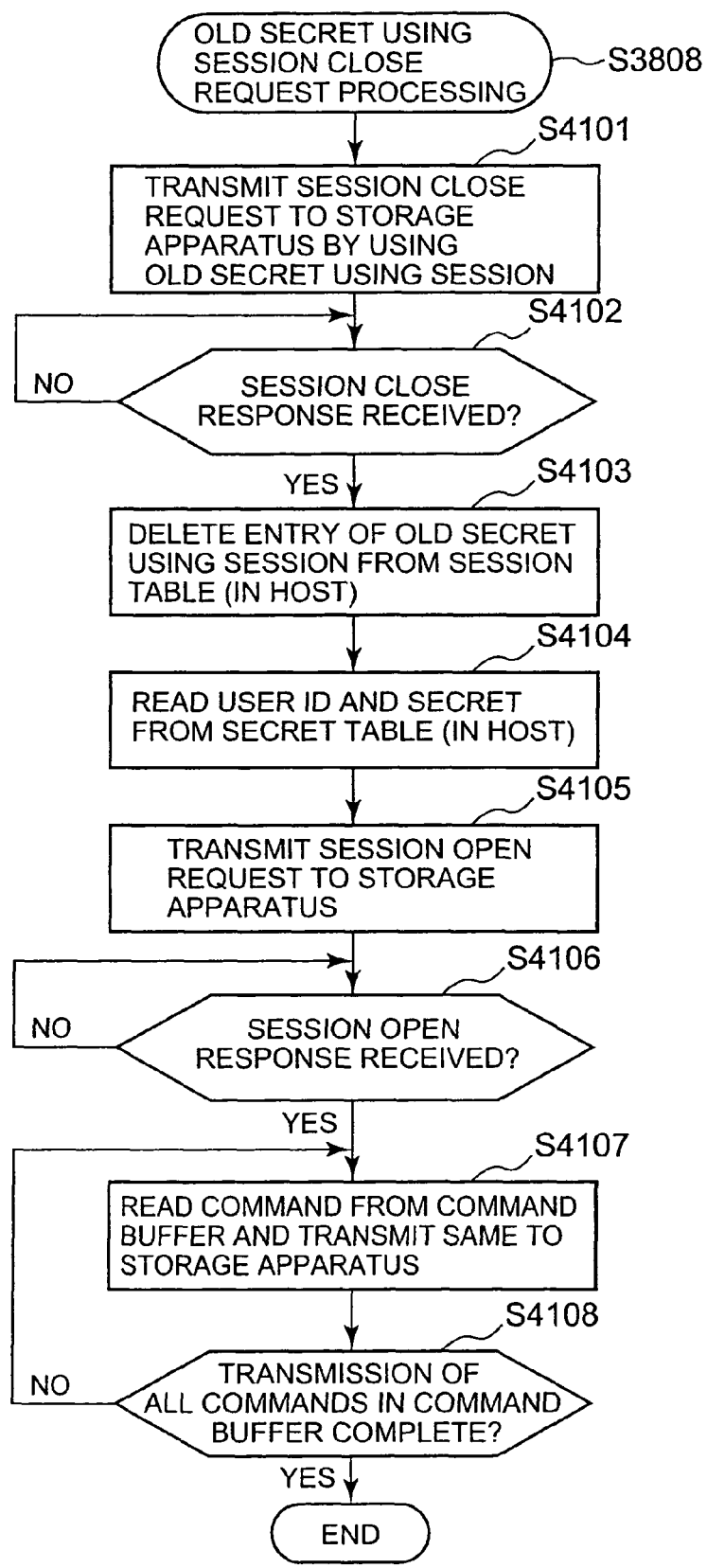
FIG. 42 is a flowchart that shows processing to request closure of an old secret using session.

FIG. 42 is a flowchart that shows the details of the processing to request closure of the old secret using session (S3808). The host 3 transmits the closure of the old secret using session to the storage 1 (S4101).

Upon receiving a response to the effect that the session is closed from the storage 1 (S4102:YES), the host 3 deletes entries of the old secret using session form the session table 321 shown in FIG. 38 (S4103).

The host 3 reads the user ID and secret from the secret table 322 shown in FIG. 38 (S4104). The secret read from the secret table 322 in S4104 is updated to the new secret in S3804 of FIG. 39.

The host 3 issues a request to the storage 1 to open a session on the basis of the new secret or the like read from the secret table 322 (S4105). Further, upon receiving a response to the effect that the session has been opened from the storage 1 (S4106:YES), the host 3 reads commands stored in the command buffer 331 and transmits same to the storage 1 (S4107). The host 3 repeats S4107 until all the commands stored in the command buffer 331 have been transmitted to the storage 1 via the new secret using session (S4108).

This embodiment, which is constituted in this way, also affords the same effects as those of the first embodiment. In addition, in this embodiment, because a new secret using session is opened after receiving all the old command-related responses and new commands in a temporarily suspended state are transmitted to the storage 1, the control structure can be simplified.

Further, the present invention is not limited to the above embodiments. A person skilled in the art is able to perform a variety of additions and modifications and so forth within the scope of the present invention.

For example, when there is a large number of outstanding commands (the number of old commands being executed) during a secret update, there is the possibility of time being required until the host 3 receives all the responses related to the outstanding old commands. As a result, there is also a risk of an increase in the time to completion of the secret update. In order to solve this problem, the host 3 is able to perform the following processing.

(a) Host 3 checks the number of outstanding commands of the old secret using session after performing secret update processing; (b) the host 3 judges whether the number of outstanding commands exceeds the preset threshold value and, when the number of outstanding commands exceeds the threshold value, the host 3 stores new commands in the command buffer 331 in the main memory 301 without transmitting the new commands to the storage 1; and (c) thereafter, the host 3 transmits new commands stored in the command buffer 331 to the storage 1 when the number of outstanding commands is below the threshold value. Thus, the time to completion of the secret update can also be shortened by suppressing an increase in the load of the storage 1.

What is claimed is:

1. A computer system that connects a first computer device and a second computer device so that the first and second computer devices are capable of bi-directional communication, wherein the second computer device judges whether the first computer device has legitimate access rights on the basis of authentication information received from the first computer device and, when the first computer device has legitimate access rights, permits usage of the second computer device by the first computer device, a session manager for managing a session configured in a path that connects the first and second computer devices is provided, the session manager updates the authentication information while maintaining the session between the first and second computer devices by executing data processing that is in the course of execution before the update of the authentication information is requested via a first session that is provided in the path and which uses pre-update authentication information and by executing data processing that is produced after the update of the authentication information is requested via a second session that is provided in the path and which uses updated authentication information; wherein the first computer device includes:

a first communication port for connecting to the second computer device;

a first communication controller for communicating with the second computer device by using a path that is configured between the first computer device and the second computer device via the first communication port;

a first session manager for managing, via the first communication controller, a data transfer that uses the session configured in the path;

a first session table that associates and manages the session configured in the path and identification information that indicates the number of commands being executed that use the session and a classification of whether the configured session is the first session or the second session; and a first authentication information management table that manages pre-update authentication information and updated authentication information, and the second computer device including:

a second communication port that is connected via the path to the first communication port;

a second communication controller for communicating with the first computer device via the second communication port;

a second session manager for managing data transfers using the session via the second communication controller;

a second session table that associates and manages the session configured in the path and identification information indicating a classification of whether the session is the first session or the second session; and a second authentication information management table that manages pre-update authentication information and updated authentication information, and wherein, when the updated authentication information is input to the first computer device and the second computer device respectively, the updated authentication information is stored in each of the first authentication information management table and the second authentication information management table;

the first session manager issues a request to the second session manager to open the second session that uses the updated authentication information;

the second session manager opens the second session and registers information related to the opened second session in the second session table when authentication of the updated authentication information contained in the request from the first session manager is successful;

the first session manager registers information related to the opened second session in the first session table when the opening of the second session is confirmed;

the first session manager transmits a new command newly issued after the second session is opened to the second computer device via the second session;

the second session manager transmits a response to the old command received from the first computer device prior to the opening of the second session to the first computer device via the first session;

the first session manager issues a request to the second session manager to close the first session when all the old command-related responses are received from the second computer device; and the second session manager closes the first session in accordance with the first session close request received from the first session manager.

2. The computer system according to claim 1, wherein the session manager (1) configures a first session that uses pre-update authentication information and a second session that uses updated authentication information between the first and second computer devices;

(2) performs data processing in the course of execution before the update of the authentication information by using the first session and performs new data processing after the update of the authentication information by using the second session; and (3) closes the first session when the data processing in the course of execution before the update of the authentication information is complete.

3. The computer system according to claim 1, wherein the first and second sessions are each provided on the same path that connects the first and second computer devices.

4. The computer system according to claim 1, wherein the authentication information includes user identification information for identifying users and updatable password information that is associated with the user identification information.

5. The computer system according to claim 1, wherein the first computer device is a host computer and the second computer device is a storage apparatus that provides the host computer with a storage area.

6. The computer system according to claim 1, wherein the first computer device is a storage apparatus and the second computer device is another storage apparatus that provides the storage apparatus with a storage area.

7. The computer system according to claim 2, wherein a third computer device for reporting the updated authentication information to the first and second computer devices respectively is connected to the first and second computer devices respectively so as to be capable of bi-directional communication; and, when the updated authentication information is reported by the third computer device to the first and second computer devices respectively, the processes (1) to (3) are executed.

8. The computer system according to claim 2, wherein the processes (1) to (3) are executed as a result of one of the first computer device and the second computer device reporting the updated authentication information to the other computer device.

9. The computer system according to claim 1, wherein a plurality of paths are provided between the first computer device and the second computer device; and the first and second sessions are provided in each of the plurality of paths.

10. The computer system according to claim 2, wherein a plurality of paths are provided between the first computer device and the second computer device; and the processes (1) to (3) are executed by selecting paths among the plurality of paths in order starting with the path for which the time to completion of the data processing being executed is smallest.

11. The computer system according to claim 10, wherein paths are selected among the plurality of paths in order starting with the path with the smallest number of commands being executed.

12. The computer system according to claim 2, wherein a plurality of paths are provided between the first computer device and the second computer device; and, after configuring the first and second sessions in all of the plurality of paths by executing the process (1) for each of the plurality of paths, the process (2) and the process (3) are executed in parallel with respect to the plurality of paths.

13. The computer system according to claim 2, wherein a fourth computer device for managing the authentication information is connected so as to be capable of bidirectional communication to at least the second computer device; and when the updated authentication information is reported by the first computer device, the second computer device issues an inquiry to the fourth computer device as to whether the updated authentication information reported by the first computer device is correct and, when the fourth computer device responds to the effect that the updated authentication information is correct, the processes (1) to (3) are executed.

14. The computer system according to claim 1, wherein the session manager closes the first session after the data processing that uses the first session is complete and then configures the second session in the path and, when a request to execute new data processing is received during the execution of data processing that uses the first session, the request to execute the new data processing is suspended and, after configuring the second session, the suspended execution request is processed by using the second session.

\* \* \* \* \*